(12) United States Patent
Shartle et al.

(10) Patent No.: US 11,654,431 B2
(45) Date of Patent: May 23, 2023

(54) SYSTEMS, DEVICES AND METHODS FOR MICROFLUIDIC ANALYSIS

(71) Applicant: ZOETIS SERVICES LLC, Parsippany, NJ (US)

(72) Inventors: Robert Justice Shartle, Livermore, CA (US); Sherb M. Edmondson, Jr., Sequim, WA (US); Bob Larson, Fremont, CA (US)

(73) Assignee: Zoetis Services LLC, Parsippany, NJ (US)

( * ) Notice: Subject to any disclaimer, the term of this patent is extended or adjusted under 35 U.S.C. 154(b) by 0 days.

(21) Appl. No.: 16/591,814

(22) Filed: Oct. 3, 2019

(65) Prior Publication Data

US 2020/0030797 A1    Jan. 30, 2020

Related U.S. Application Data

(63) Continuation of application No. PCT/US2018/028855, filed on Apr. 23, 2018.
(Continued)

(51) Int. Cl.
*B01L 3/00*        (2006.01)

(52) U.S. Cl.
CPC . *B01L 3/502715* (2013.01); *B01L 2300/0627* (2013.01); *B01L 2300/0681* (2013.01);
(Continued)

(58) Field of Classification Search
CPC .. B01L 3/502715; B01L 3/5027; B01L 3/502; B01L 3/50; B01L 2300/0627;
(Continued)

(56) References Cited

U.S. PATENT DOCUMENTS

| | | | |
|---|---|---|---|
| 2002/0119536 A1 | 8/2002 | Stern | |
| 2003/0054652 A1* | 3/2003 | Beebe | B81C 1/00119 438/694 |

(Continued)

FOREIGN PATENT DOCUMENTS

| | | |
|---|---|---|
| CN | 1 595 149 | 3/2005 |
| CN | 105 363 505 | 3/2016 |

(Continued)

OTHER PUBLICATIONS

PCT International Search Report and Written Opinion, International Application No. PCT/US2018/28855, International Filing Date Apr. 23, 2018, dated Jul. 6, 2018.

(Continued)

*Primary Examiner* — Christine T Mui
(74) *Attorney, Agent, or Firm* — Scott C. Mayhew

(57) ABSTRACT

Described herein are various inventions and embodiments thereof, directed to systems, devices, and methods for analysis of a biofluid, as well as controlling a biofluid analysis system using a microfluidic device. Embodiments of biofluid analysis systems disclosed herein may provide analysis of a biofluid to identify and characterize one or more analytes. An apparatus may include a first layer defining a first opening and a second opening. The first layer may be substantially transparent. A second layer may be coupled to the first layer and define a microfluidic channel that establishes a fluid communication path between the first opening and the second opening. At least a portion of the second layer may be substantially opaque.

18 Claims, 26 Drawing Sheets

Related U.S. Application Data

(60) Provisional application No. 62/488,377, filed on Apr. 21, 2017.

(52) U.S. Cl.
CPC ... *B01L 2300/0861* (2013.01); *B01L 2300/12* (2013.01); *B01L 2300/165* (2013.01); *B01L 2300/168* (2013.01)

(58) Field of Classification Search
CPC ..... B01L 2300/0681; B01L 2300/0861; B01L 2300/12; B01L 2300/165; B01L 2300/168
USPC ......................................................... 422/400
See application file for complete search history.

(56) References Cited

U.S. PATENT DOCUMENTS

| | | |
|---|---|---|
| 2005/0239210 A1 | 10/2005 | Iida |
| 2006/0057245 A1* | 3/2006 | Haupt ................. B29C 45/2628 425/589 |
| 2006/0254916 A1 | 11/2006 | Hernandez et al. |
| 2007/0072290 A1 | 3/2007 | Hvichia |
| 2009/0299545 A1 | 12/2009 | Quan et al. |
| 2010/0266450 A1 | 10/2010 | Wimberger-Friedl et al. |
| 2010/0301022 A1 | 12/2010 | Rickwood et al. |
| 2011/0243813 A1 | 10/2011 | Jackinsky et al. |
| 2014/0045186 A1 | 2/2014 | Gubatayao et al. |
| 2016/0256869 A1 | 9/2016 | Ayliffe |

FOREIGN PATENT DOCUMENTS

| | | |
|---|---|---|
| CN | 105 536 895 | 5/2016 |
| EP | 0479231 A1 | 4/1992 |

OTHER PUBLICATIONS

PCT International Preliminary Report on Patentability, International Application No. PCT/US2018/28855, International Filing Date Apr. 23, 2018, dated Oct. 31, 2019.
KIPO Notice of Preliminary Rejection, Non-English. Korean Patent Application No. 10-2019-7030779.
KIPO Notice of Preliminary Rejection, English Translation. Korean Patent Application No. 10-2019-7030779.
Supplementary Partial European Search Report, Application No. EP18787864, Date of completion of search Dec. 9, 2020.
Provisional Opinion Accompanying the European Partial Search Report, Application No. EP18787864, Filing Date Apr. 23, 2018.

* cited by examiner

SYSTEMS, DEVICES AND METHODS FOR MICROFLUIDIC ANALYSIS

CROSS-REFERENCE TO RELATED APPLICATIONS

This application is a continuation of International Application No. PCT/US2018/028855, filed Apr. 23, 2018, which claims the benefit of U.S. Provisional Application Ser. No. 62/488,377, filed Apr. 21, 2017, both of which are expressly incorporated herein by reference in their entirety.

BACKGROUND

Analysis of biofluids from a subject may be used as a diagnostic tool for disease and to monitor subject health. For example, analysis of a subject's urine sample (i.e., urinalysis) may be used to diagnose a disease (e.g., diabetes) and/or used to identify one or more sediments within the sample. Some microscopy-based sediment analysis systems may generate a set of images used to identify one or more sediments. However, these systems require a well-mixed sample that may result in cell loss (e.g., centrifuged sample) and may require one or more dilutions, thereby increasing the time and skill level needed to operate these systems. Therefore, additional devices, systems, and methods for performing biofluid analysis may be desirable.

SUMMARY

In general, an apparatus is provided, including a first layer defining a first opening and a second opening, the first layer being substantially transparent. A second layer may be coupled to the first layer. The second layer may define a microfluidic channel that establishes a fluid communication path between the first opening and the second opening, at least a portion of the second layer being substantially opaque.

In some embodiments, the first layer may be substantially transparent to at least one of ultraviolet light, visible light, and near-infrared light. In some embodiments, the microfluidic channel may be linear relative to a longitudinal axis of the apparatus. In some embodiments, the microfluidic channel may be curved relative to a longitudinal axis of the apparatus. In some embodiments, the microfluidic channel may be parallel and offset from a central longitudinal plane of the apparatus. In some embodiments, the microfluidic channel may be defined along a central longitudinal plane of the apparatus. In some embodiments, a height of the microfluidic channel may decrease continuously from the first opening to the second opening.

In some embodiments, a side of the microfluidic channel formed in the second layer may define a set of steps such that a height of the microfluidic channel decreases in a step-wise manner from the first opening to the second opening. In some of these embodiments, a height of each step of the set of steps of the microfluidic channel may be from about 0.1 mm to about 0.9 mm. In some of these embodiments, the first opening may be configured to receive a fluid. At least one step of the set of steps of the microfluidic channel may be configured to separate one or more components from the fluid. In some of these embodiments, the first opening may be configured to receive a fluid, and each step of the set of steps of the microfluidic channel may be configured to separate one or more components from the fluid.

In some embodiments, the first opening may be larger than the second opening. In some embodiments, a reagent may be coupled to a side of the microfluidic channel. In some embodiments, the microfluidic channel may be composed of a hydrophilic material. In some embodiments, the microfluidic channel may include a hydrophilic coating. In some embodiments, the first layer and the second layer may be composed of one or more of acrylic, polycarbonate, cyclic olefin copolymers (COC), and polyester.

In some embodiments, the microfluidic channel may include a filter configured to separate one or more components from a fluid received in the microfluidic channel. In some embodiments, the microfluidic channel may be a first channel of a set of channels. In some embodiments, the second opening may be one opening of a set of openings. In some embodiments, the first opening may be at a proximal end of the first layer and the second opening is at a distal end of the first layer. In some embodiments, the second layer may include between about 0.01% to about 1.0% by weight of at least one of carbon black and a laser absorbing dye. In some embodiments, the microfluidic channel may define a volume of between about 1 µL and about 1 mL. For example, the microfluidic channel may define a volume of between about 5 µL and about 200 µL. As another example, the microfluidic channel may define a volume of between about 10 µL and about 50 µL.

In some embodiments, the apparatus may be configured to receive urine. In some embodiments, the apparatus may be configured to receive one or more analytes including one or more of red blood cells, white blood cells, white blood cell clumps, hyaline casts, pathological casts, squamous epithelial cells, non-squamous epithelial cells, bacteria, yeast, crystals, calcium-oxolate monohydrate, calcium-oxolate, dehydrate, uric acid, triple photosphate, mucus, and sperm. In some embodiments, the apparatus may include one or more fiducials configured to indicate a position of the microfluidic channel.

In some embodiments, a biofluid analysis system may automatically process and analyze the sample on the microfluidic device to analyze and/or measure biofluid characteristics including, but not limited to, refractive index and osmolality, and one or more analytes in a biofluid (e.g., urine) including red blood cells, white blood cells, white blood cell clumps, hyaline casts, pathological casts, squamous epithelial cells, non-squamous epithelial cells, bacteria, yeast, crystals, calcium-oxolate monohydrate, calcium-oxolate dehydrate, uric acid, triple photosphate, mucus, and sperm. In some embodiments, a biofluid analysis system is provided, including an assembly, a radiation source, detector, and a controller.

An assembly may be configured to hold an apparatus. The apparatus may include a first layer defining a first opening and a second opening, the first layer being substantially transparent. A second layer may be coupled to the first layer and define a microfluidic channel that establishes a fluid communication path between the first opening and the second opening. At least a portion of the second layer may be substantially opaque. The apparatus may be configured to receive a fluid. A radiation source may be configured to emit a first light signal to illuminate the microfluidic channel. A detector may be configured to receive a second light signal. The second light signal may be generated in response to the illumination of the microfluidic channel using the first light signal. A controller may be coupled to the detector and include a processor and memory. The controller may be configured to receive signal data corresponding to the second light signal received by the detector, generate analyte data using the signal data, and identify one or more analytes of the fluid using the analyte data.

In some embodiments, the analyte may include at least one of red blood cells, white blood cells, white blood cell clumps, hyaline casts, pathological casts, squamous epithelial cells, non-squamous epithelial cells, bacteria, yeast, crystals, calcium-oxalate monohydrate, calcium-oxalate, dehydrate, uric acid, triple photosphate, mucus, and sperm.

In some embodiments, the assembly may include a platform configured to hold the apparatus and move the apparatus with at least two degrees of freedom. In some embodiments, the radiation source may include one or more of a light emitting diode, laser, microscope, and optical sensor. In some embodiments, the apparatus may include at least one fiducial configured to indicate a position of the microfluidic channel. The detector may be configured to image the at least one fiducial. In some embodiments, an input device may be coupled to the controller, the input device configured to control movement of the assembly.

Also described here are embodiments corresponding to biofluid analysis methods. In general, these methods may include the steps of applying a urine sample to an apparatus including a first layer defining a first opening and a second opening, the first layer being substantially transparent. A second layer may be coupled to the first layer and define a microfluidic channel that establishes a fluid communication path between the first opening and the second opening, at least a portion of the second layer being substantially opaque. A first light signal may be emitted to illuminate the microfluidic channel. A second light beam may be received at a detector. The second light beam may be generated in response to the illumination of the microfluidic channel using the first light signal. Analyte data may be generated from the detector. One or more analytes of the urine sample may be identified from the analyte data.

In some embodiments, the analyte may include at least one of red blood cells, white blood cells, white blood cell clumps, hyaline casts, pathological casts, squamous epithelial cells, non-squamous epithelial cells, bacteria, yeast, crystals, calcium-oxalate monohydrate, calcium-oxalate, dehydrate, uric acid, triple photosphate, mucus, and sperm. In some embodiments, a reagent may be applied to the microfluidic channel.

Also described herein are embodiments corresponding to methods of manufacturing an apparatus. In general, these methods may include the steps of forming a first layer defining a first opening and a second opening, the first layer being substantially transparent, and forming a second layer defining a microfluidic channel, at least a portion of the second layer being substantially opaque. The first layer may be bonded to the second layer such that the microfluidic channel establishes a fluid communication path between the first opening and the second opening.

In some embodiments, a hydrophilic treatment may be applied to the microfluidic channel. In some embodiments, the first layer and the second layer may be formed using one or more of die cutting, extrusion, and injection molding. In some embodiments, first layer and the second layer may be bonded using one or more of adhesives, ultrasonic welding, laser welding, and solvent bonding. In some of these embodiments, the laser welding may include 940 nm laser diode light. In some embodiments, at least one of the first layer and second layer may include at least one of PMMA and polycarbonate.

These and other embodiments, advantages, and objects of the present disclosure will be even better understood with reference to the detailed description.

BRIEF DESCRIPTION OF THE DRAWINGS

FIG. 1A is an exploded perspective view and FIG. 1B is an assembled perspective view.

FIG. 2A is an exploded perspective view and FIG. 2B is an assembled perspective view.

FIG. 3A is an exploded perspective view and FIG. 3B is an assembled perspective view.

FIG. 4A is an exploded perspective view and FIG. 4B is an assembled perspective view.

FIG. 5A is an exploded perspective view and FIG. 5B is an assembled perspective view.

FIG. 6A is an exploded perspective view, FIG. 6B is an assembled perspective view, FIG. 6C is another perspective view, and FIG. 6D is a perspective cross-sectional view.

FIG. 7A is an exploded perspective view, FIG. 7B is an assembled perspective view, FIG. 7C is another perspective view, and FIG. 7D is a perspective cross-sectional view.

FIG. 8A is an exploded perspective view and FIG. 8B is an assembled perspective view.

FIG. 10A is a perspective view and FIG. 10B is another perspective view.

DETAILED DESCRIPTION

Figure 1A:
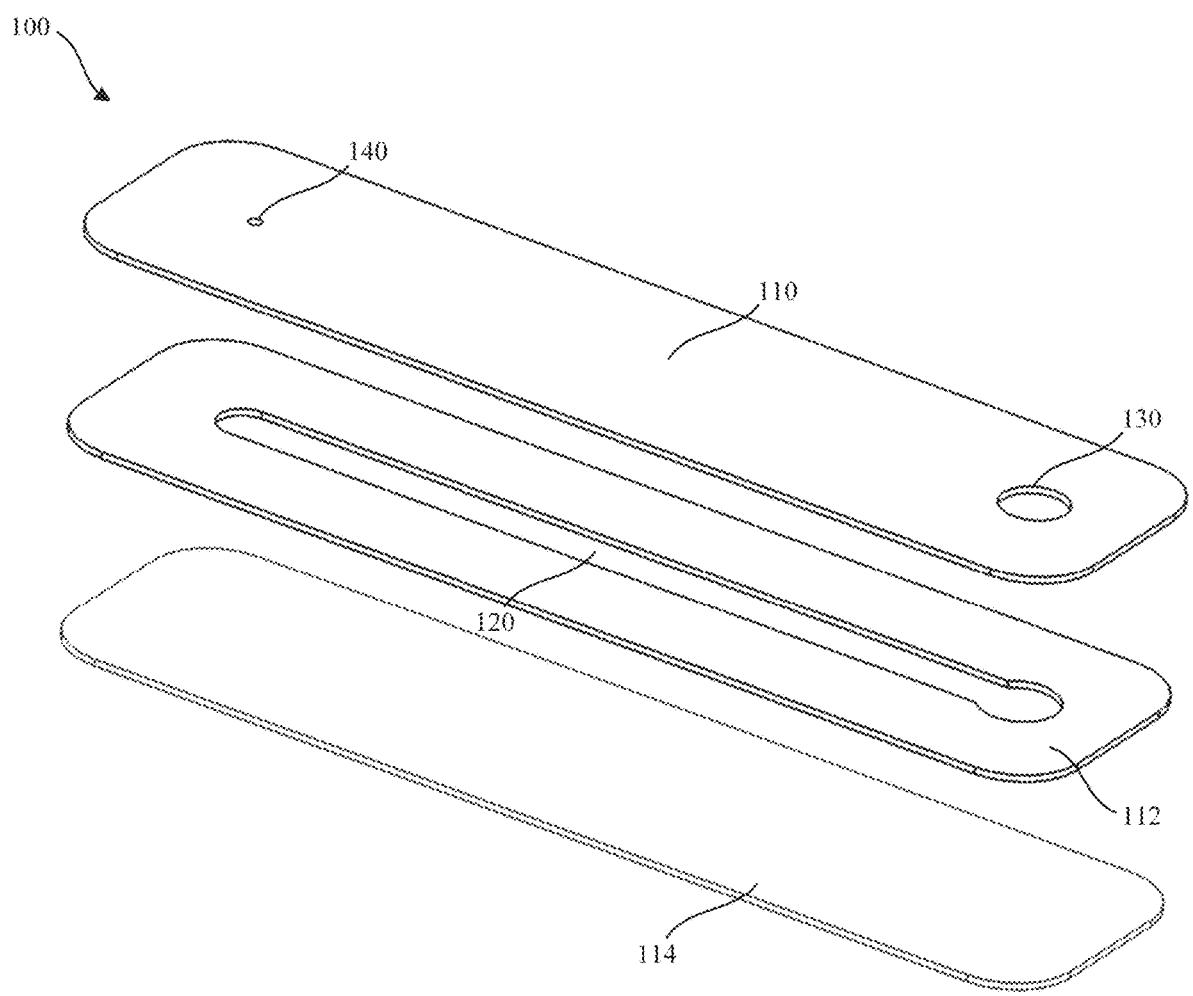
FIGS. 1A-1B are illustrative views of a microfluidic device, according to embodiments.

Described herein are inventions and embodiments of microfluidic devices, biofluid analysis systems, as well as methods for identification and analysis of analytes from a biofluid such as urine and methods of manufacturing a microfluidic device. These systems and methods may be used to characterize and/or quantitate a sample and permit evaluation of subject health and/or diagnosis of a condition.

Generally, the systems and methods described herein may include a biofluid analysis system configured to image, analyze, and characterize a sample placed on a microfluidic device. The microfluidic device may be configured as a dry or wet disposable sensor depending on the analyte(s) to be measured and may use just a small volume of biofluid (e.g., about 10 µL).

In some embodiments, a biofluid analysis system provides analysis of a sample (e.g., biofluid, urine) placed on a microfluidic device in order to identify and characterize one or more analytes. For example, a user may apply a small amount of a biofluid into an opening a microfluidic device (e.g., transparent microfluidic device). In some embodiments, the microfluidic device may be configured to separate different analytes along a length of a microfluidic channel of the microfluidic device. A radiation source (e.g., light source, illumination source) may then be used to direct a light beam at a transparent portion of the microfluidic device including one or more microfluidic channels. A detector (e.g., optical sensor) may be used to receive the light passed through the microfluidic device and receive a signal from the light beam. The detector may be configured to generate analyte data which, in some embodiments, may then be used to identify and/or characterize one or more analytes of the sample. The sample may include, for example, urine that may contain one or more of red blood cells, white blood cells, white blood cell clumps, hyaline casts, pathological casts, squamous epithelial cells, non-squamous epithelial cells, bacteria, yeast, crystals, calcium-oxalate monohydrate, calcium-oxalate dehydrate, uric acid, triple photosphate, mucus, and sperm, combinations thereof, and the like.

I. Devices

Described herein are devices that may be used in some embodiments of the various systems described. A microfluidic device as described herein may include a set of transparent microfluidic channels that extend along a length of the microfluidic device. A sample may be input at a first end of the set of microfluidic channels through a first opening. The sample input into the microfluidic device may flow through the set of microfluidic channels through capillary action. An outlet (e.g., vent) may be provided at a second end of the set of microfluidic channels and be configured to vent air out of the microfluidic device as the set of microfluidic channels are filled with the sample. In some embodiments, the microfluidic channels may be treated and/or be formed of a hydrophilic material. In some embodiments, one or more substances (e.g., reagents) may be applied to the microfluidic device to aid identification and/or analysis of one or more specific analytes.

Each of the microfluidic apparatuses (100, 200, 300, 400, 500, 600, 700, 800, 900, 1000) described in detail herein may receive a sample including, but not limited to, urine. The apparatus may be configured to be used with a biofluid analysis system to identify and analyze characteristics including, but not limited to, refractive index and osmolality, as well as one or more analytes in the urine including red blood cells, white blood cells, white blood cell clumps, hyaline casts, pathological casts, squamous epithelial cells, non-squamous epithelial cells, bacteria, yeast, crystals, calcium-oxalate monohydrate, calcium-oxalate dehydrate, uric acid, triple photosphate, mucus, sperm, combinations thereof, and the like.

Figure 1B:
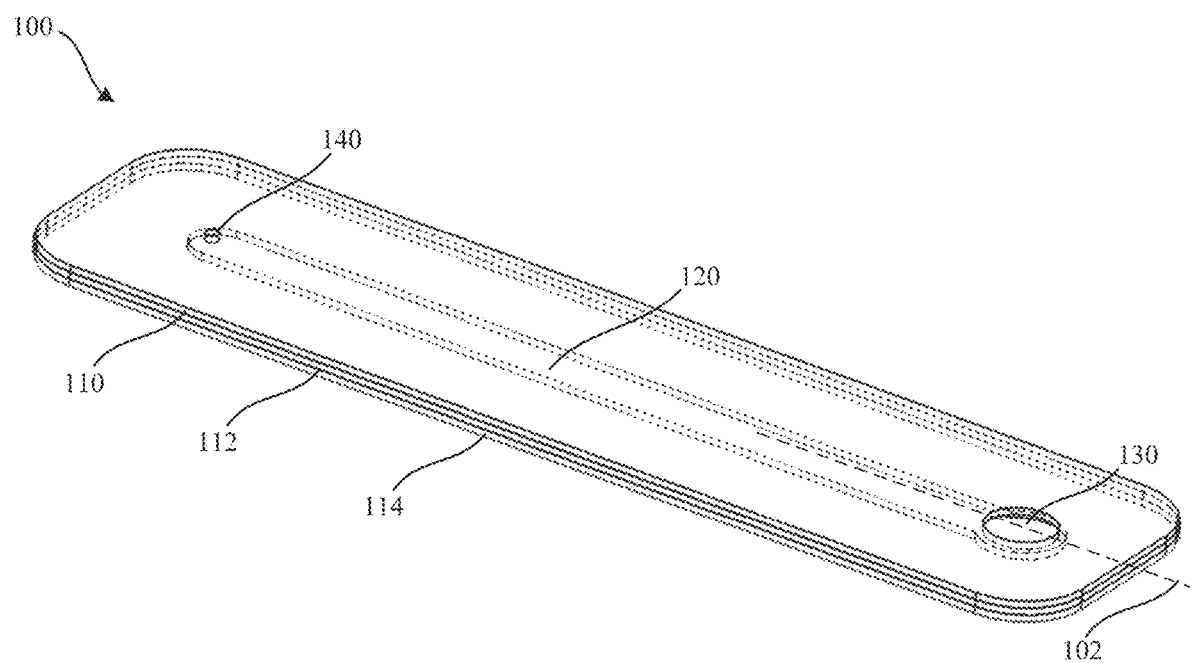

FIG. 1A is an exploded perspective view of an illustrative example of a microfluidic device (100), according to some embodiments. The microfluidic device (100) may include a first layer (110) (e.g., cover, top portion) including a first opening (130) (e.g., proximal opening) and a second opening (140) (e.g., distal opening), a second layer (112) (e.g., channel layer, middle portion) including a microfluidic channel (120), and a third layer (114) (e.g., base, substrate, bottom portion). In some embodiments, each of the layers (110, 112, 114) may generally form an elongate rectangular structure where the layers may be configured to be assembled one on top of the other into a unitary structure, as shown in FIG. 1B. The first layer (110) may be substantially transparent while at least a portion of the second layer (112) may be substantially opaque. As used herein, transparency may include light transmission of about 10% or more through a substrate while opaqueness may include light transmission of about 10% or less through the substrate. For example, acrylic may be considered transparent as it provides about 90% UV wavelength transmission. Most plastics are transparent and plastics that may be formed using laser welding may retain their transparency. In the assembled configuration of FIG. 1B, the microfluidic channel (120) may be coupled between the first opening (130) and the second opening (140). The second layer (112) may be coupled to the first layer (110) such that the microfluidic channel establishes a fluid communication path between the first opening (130) and the second opening (140). In some embodiments, the microfluidic device (100) may have a length of between about 1 mm and about 100 mm, a width of between about 1 mm and about 50 mm, and a thickness of between about 1 mm and about 10 mm, including all values and sub ranges in-between.

The device (100) may include a transparent portion along a length of the microfluidic channel (120). The transparent portion may be configured to provide high transmission and minimal birefringence. As a practical matter, birefringence is always present due to residual stress and cannot be eliminated completely. For example, the transparent portion may include the microfluidic channel (120) of the second layer (112) and the regions of the first layer (110) and the third layer (114) overlying (i.e., directly above and below) the microfluidic channel (120). However, the transparent portion need not necessarily be perpendicular to a plane of the microfluidic device so long as a light beam may pass through the microfluidic channel (120) and be received by a detector (e.g., optical sensor). The transparent portion may be substantially transparent to at least one of ultraviolet light, visible light, and near-infrared light. In some embodiments, one or more additional regions of the device (100) may be transparent. As another example, substantially the entire device (100) may be transparent. The device (100) may be formed by, for example, one or more of acrylic, polycarbonate, cyclic olefin copolymers (COC), and polyester.

In some embodiments, the device (100) may be formed out of a transparent polymer such as acrylic, polycarbonate, combinations thereof, and the like. In some embodiments, the device (100) may include between about 0.01% to about 1.0% by weight of at least one of carbon black and a laser absorbing dye. For example, the second layer (112) may include between about 0.1% to about 1.0% by weight or between about 0.2% to about 0.3% by weight of at least one of carbon black and a laser absorbing dye. In some embodiments, the microfluidic channel (120) may be formed using low surface energy plastics such as polycarbonate, COC, and polyester that may enhance hydrophilic properties of the microfluidic channel (120). Additionally or alternatively, the microfluidic channel (120) may undergo hydrophilic treatment to enhance capillary fill in order to increase the surface energy and wettability of the sample. For example, microfluidic channels can be plasma etched using oxygen plasma. Alternatively, hydrophilic polymer (e.g., PVP, PEG, surfactant) coatings can be applied to the microfluidic channels using coating solutions, or chemical vapor deposition. In some embodiments, one or more substances (e.g., reagent) may be disposed in the microfluidic channel to facilitate sample analysis. For example, the reagents may include lysing agents and/or contrast agents. Lysing agents may lyse specific cell types such as red blood cells. Contrast agents (e.g., staining agents) may include nuclear, cytoplasm, and mitochondria (e.g., antibody and antibody conjugates including fluorescent dyes) corresponding to specific cellular antigens. For example, one or more substances may be disposed at specific regions of the microfluidic channel (120) (e.g., proximal end) or throughout a length of the microfluidic channel (120).

In some embodiments, the first layer (110) may cover one side of the microfluidic channel (120) when assembled as shown in FIG. 1B. The first layer (110) may have the same or different thickness as the second layer (112) and/or third layer (114). Each layer may have a thickness between about 25 μm and 2 mm. For example, each layer may have a thickness between about 25 μm and about 1 mm. In FIGS. 1A-1B, each layer has a substantially equal thickness. The plane formed by the first layer (110) may correspond to a first longitudinal side of the device (100) while a plane formed by the third layer (114) may correspond to a second longitudinal side of the device (100). The first and second longitudinal sides may be provided on opposite sides of the second layer (112). In FIG. 1B, the microfluidic channel (120) may be about equidistant to the first longitudinal side and the second longitudinal side. That is, the microfluidic channel (120) may be defined along a central longitudinal plane of the apparatus. The microfluidic channel (120) may be arranged substantially parallel to the first longitudinal side.

In some embodiments, the microfluidic channel (120) of the second layer (112) may have a length of between about 1 mm and about 50 mm, a depth of between about 50 μm and about 5000 μm, and a width of between about 50 μm and about 5000 μm. In FIG. 1B, the microfluidic channel (120) may be linear relative to a longitudinal axis (102) of the microfluidic device (100). However, in other variations, the microfluidic channel (120) may be curved relative to a longitudinal axis (102) of the microfluidic device (100). For example, the microfluidic channel (120) may have a generally serpentine shape.

The first opening (130) of the first layer (110) may be configured to receive a sample, such as from a pipette. The first opening (130) may have any suitable shape and/or size to receive the sample. In FIGS. 1A-1B, the first opening (130) may be provided at a proximal end of the device (100) and may be fluidically connected to a first end of the microfluidic channel (120). In some embodiments, the first opening (130) may have a diameter of between about 5000 μm and about 2 mm.

The second opening (140) of the first layer (110) may include an outlet (e.g., vent) configured to naturally vent gas (e.g., air) as the microfluidic channel (120) is filled with a fluid. In FIGS. 1A-1B, the second opening (140) may be provided at a distal end of the device (100) and may be fluidically connected to a second end of the microfluidic channel (120). In some embodiments, the second opening (140) may have a diameter of between about 10 μm and about 50 μm. In some embodiments, the first opening (130) and the second opening (140) may be spaced apart by between about 1 mm and about 100 mm. As shown in FIGS. 1A-1B, the first opening (130) may be larger than the second opening (140). Although FIGS. 1A-1B illustrate a single first opening (130) and a single second opening (140), the microfluidic device (100) may have a set of first openings (130) and a set of second openings (140).

In some embodiments, the microfluidic device (100) may include a set of fiducials (not shown) that may be imaged and/or otherwise detected by an optical detector of a biofluid analysis system. For example, a set of fiducials (e.g., colored/opaque points, ruler, slits, landmarks, markers) may be disposed at predetermined intervals along a length of the microfluidic channel (120) to aid image analysis. In some embodiments, the microfluidic channel (120) may include one or more filters (not shown) configured to separate analytes within the sample based on size.

Although the device (100) shown in FIGS. 1A-1B includes three layers, it should be appreciated that the microfluidic device (100) may be formed using more or less layers. In some embodiments, the device (100) may include a generally curved portion, as described in more detail with respect to FIG. 9, where a set of microfluidic channels may follow a curved shape of a housing.

In some embodiments, the third layer (114) and the second layer (120) may be formed using a die cut extruded film, and the first layer (11) may be formed using injection molding. In some embodiments, the second layer (112) may be bonded to the first layer (110) and third layer (114) using one or more of ultrasonic welding, laser welding, adhesives, and/or solvent bonding.

As described in more detail herein, the microfluidic device (100) may be coupled to a microfluidic device case (e.g., sample holder, consumable, disposable) to aid in one or more of handling, tracking, and identification of a sample applied to the microfluidic device. For example, the microfluidic device case may include a grip portion for a user to grasp without touching the microfluidic device and potentially affecting the optical qualities of the microfluidic device. The microfluidic device case may be configured to hold the microfluidic device at a fixed position relative to the microfluidic device case.

In some embodiments, a third layer (114) of the microfluidic device (100) may be placed on a flat, horizontal surface to permit a sample (not shown) to be input into the microfluidic channel (120) through the first opening (130) (e.g., sample port, biofluid input). The sample may include, but is not limited to, urine, whole blood, plasma, serum, combinations thereof, and the like. The sample may flow through the microfluidic channel (120) using capillary action from a proximal to distal end of the microfluidic channel (120). As the microfluidic channel (120) fills with sample, gas (e.g., air) within the microfluidic channel may vent from the microfluidic device (100) through the second opening (140). In some embodiments, the first opening (130) may be coupled to at least one micropump configured to supply a continuous flow of the sample to the microfluidic device (100).

In some embodiments, the sample may be detected (e.g., imaged) as the microfluidic channel (120) is being filled and/or after a predetermined amount of time. For example, analytes (e.g., sediments, particulate matter) of the sample having a specific gravity greater than one may be allowed to settle within the microfluidic channel (120) over one or more regions of the third layer (114). This may aid image analysis of the sample so long as particle concentration of the sample is dilute enough to avoid superimposed particles. In some embodiments, analysis (e.g., image analysis) of a sample having high particle concentration, may be performed before one or more analytes settle within the microfluidic channel (120). For example, analytes including red blood cells, platelets, white blood cells, and uric acid may be analyzed. Red blood cells may have a concentration of about 5 teracells/L, platelets may have a concentration of about 0.3 teracells/L, white blood cells may have a concentration of about 7 gigacells/L, and uric acid may have a concentration of about 100 μmol/L. In some embodiments, a single particle may be analyzed in a sample, such as a single crystal. Additionally or alternatively, ultrasonic vibration may be applied to the microfluidic device (100) periodically to reduce settling and maintain suspension of one or more analytes.

In some embodiments, the microfluidic device (100) may be disposed between a radiation source and an optical detector. For example, the sample may be imaged using a radiation source facing an exposed side of the first layer (110) and an optical detector facing the exposed side of the third layer (114). As described in more detail herein, detector data may be used to generate analyte data that may be used to identify one or more analytes and/or sample attributes including, but not limited to, refractive index and osmolality.

Figure 2A:
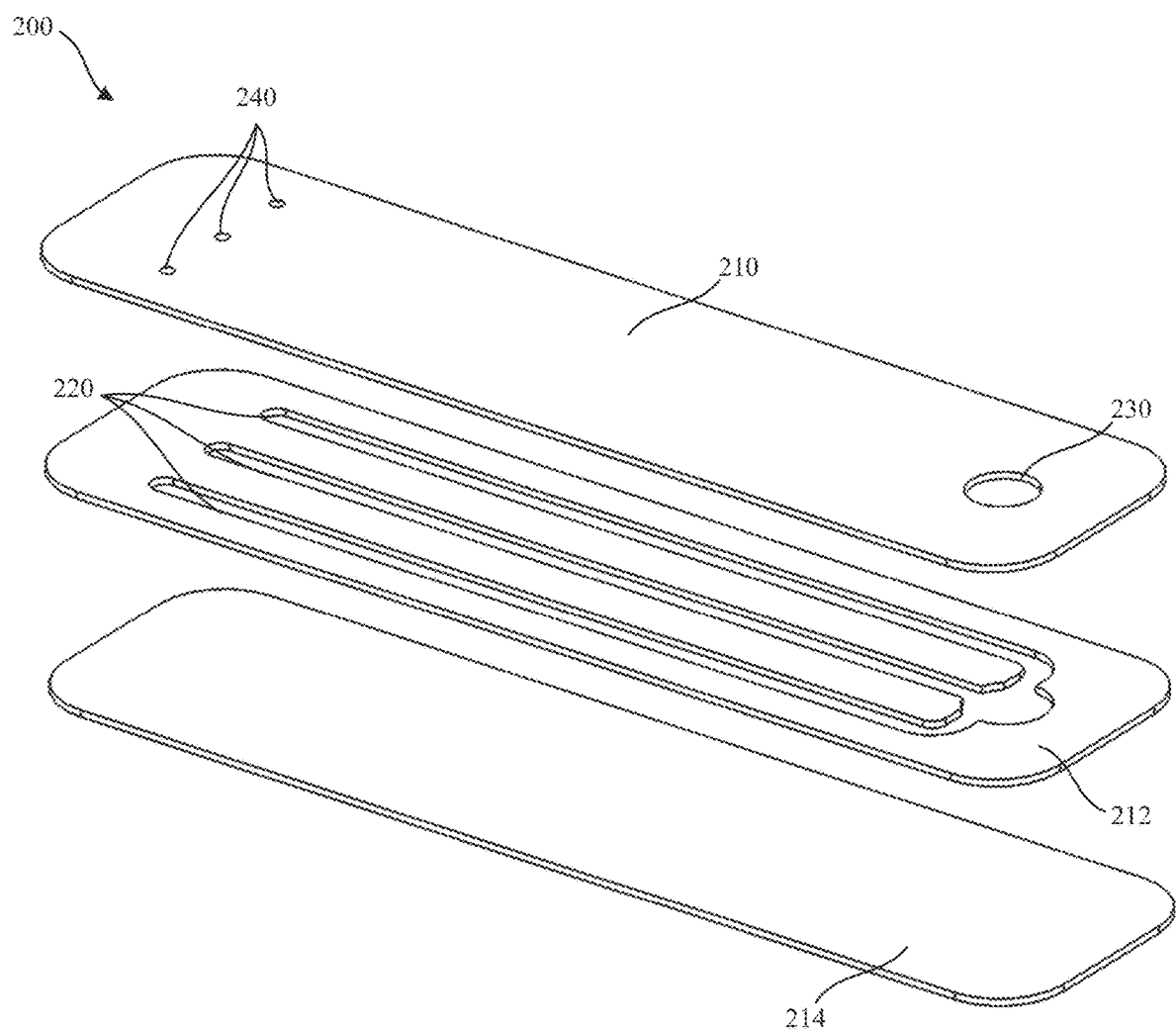
FIGS. 2A-2B are illustrative views of a microfluidic device, according to other embodiments.
Figure 2B:
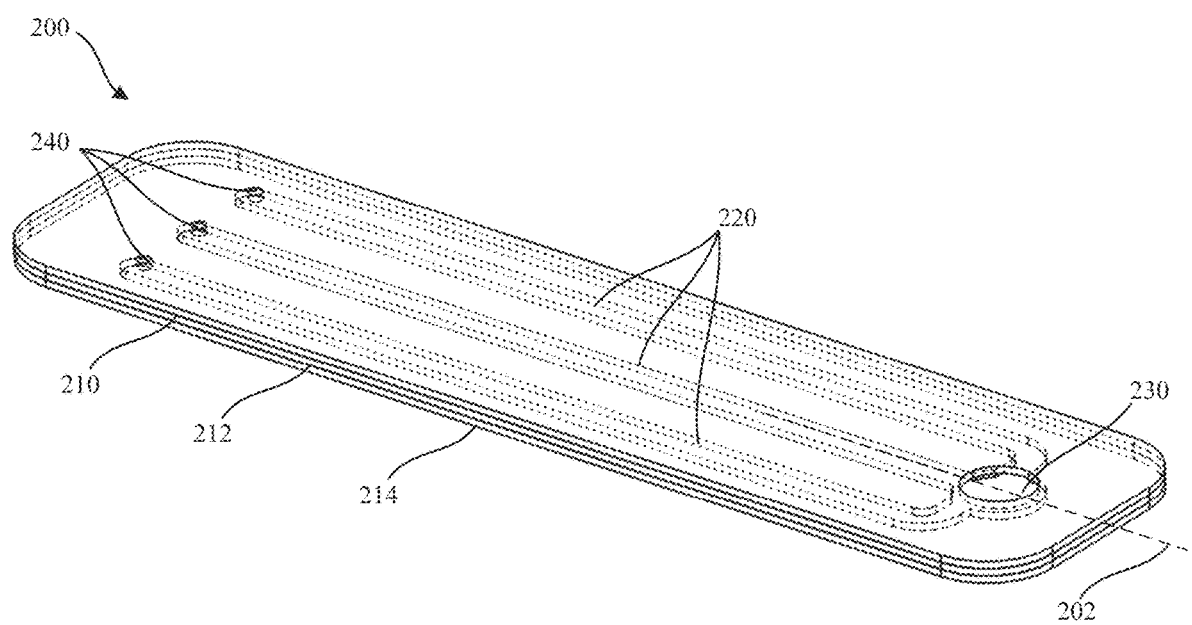

FIG. 2A is an exploded perspective view of an illustrative example of a microfluidic device (200), according to some embodiments. The microfluidic device (200) may include a first layer (210) (e.g., cover, top portion) including a first opening (230) (e.g., proximal opening) and a set of second openings (240) (e.g., distal opening), a second layer (212) (e.g., channel layer, middle portion) including a set of microfluidic channels (220), and a third layer (214) (e.g., base, substrate, bottom portion). In some embodiments, each of the layers (210, 212, 214) may generally form an elongate rectangular structure where the layers may be configured to be assembled one on top of the other into a unitary structure, as shown in FIG. 2B. The first layer (210) may be substantially transparent while at least a portion of the second layer (112) may be substantially opaque. In the assembled configuration of FIG. 2B, the set of microfluidic channels (220) may be coupled between the first opening (230) and the set of second openings (240). The set of microfluidic channels (220) may include a first channel, second channel, and third channel of a set of channels (220). The set of second openings (240) may include a first opening, second opening, and third opening of a set of openings (240). The second layer (112) may be coupled to the first layer (110) such that the microfluidic channel (220) establishes a fluid communication path between the first opening (230) and the second opening (240). In FIGS. 2A-2B, the set of microfluidic channels (220) may include three parallel channels, although more or less channels may be provided. This allows for separation of the sample and/or parallel analysis of the sample. For example, a first reagent and a second reagent may be disposed in respective microfluidic channels (220) to facilitate analysis of different analytes of the sample. Additionally or alternatively, identical parallel channels may improve a quality of sample analysis. In some embodiments, the microfluidic device (210) may have a length of between about 1 mm and about 100 mm, a width of between about 1 mm and about 50 mm, and a thickness of between about 1 mm and about 10 mm.

The device (200) may include a transparent portion along a length of the set of microfluidic channels (220). The transparent portion may be configured to provide high transmission and minimal birefringence. For example, the transparent portion may include the set of microfluidic channels (220) of the second layer (212) and the regions of the first layer (210) and the third layer (214) overlying (i.e., directly above and below) the set of microfluidic channels (220). However, the transparent portion need not necessarily be perpendicular to a plane of the microfluidic device so long as a light beam may pass through the set of microfluidic channels (220) and be received by a detector (e.g., optical sensor). The transparent portion may be substantially transparent to at least one of ultraviolet light, visible light, and near-infrared light. In some embodiments, one or more additional regions of the device (200) may be transparent. As another example, substantially the entire device (200) may be transparent. The device (200) may be formed by, for example, one or more of acrylic, polycarbonate, cyclic olefin copolymers (COC), and polyester.

In some embodiments, the device (200) may be formed out of a transparent polymer such as acrylic, polycarbonate, combinations thereof, and the like. In some embodiments, the device (200) may include between about 0.01% to about 1.0% by weight of at least one of carbon black and a laser absorbing dye. For example, a layer may include between about 0.1% to about 1.0% by weight or between about 0.2% to about 0.3% by weight of at least one of carbon black and a laser absorbing dye. In some embodiments, the set of microfluidic channel (220) may be formed using low surface energy plastics such as polycarbonate, COC, and polyester that may enhance hydrophilic properties of the set of microfluidic channels (220). Additionally or alternatively, one or more of the set of microfluidic channels (220) may undergo hydrophilic treatment to enhance capillary fill in order to increase the surface energy and wettability of the sample. For example, hydrophilic polymers (e.g., PVP, PEG, surfactant) may be applied to microfluidic channel using plasma-etched vapor deposition (e.g., chemical). In some embodiments, one or more substances (e.g., reagent) may be disposed in the set of microfluidic channels (220) to facilitate sample analysis. For example, the reagents may include lysing agents and/or contrast agents. Lysing agents may lyse specific cell types such as red blood cells. Contrast agents (e.g., staining agents) may include nuclear, cytoplasm, and mitochondria (e.g., antibody and antibody conjugates including fluorescent dyes) corresponding to specific cellular antigens. For example, one or more substances may be disposed at specific regions of the set of microfluidic channels (220) (e.g., proximal end) or throughout a length of the set of microfluidic channels (220).

In some embodiments, the first layer (210) may cover one side of the set of microfluidic channels (220) when assembled as shown in FIG. 2B. The first layer (210) may have the same or different thickness as the second layer (212) and/or third layer (214). In FIGS. 2A-2B, each layer has a substantially equal thickness. Each layer may have a thickness between about 25 μm and 2 mm. For example, each layer may have a thickness between about 25 μm and about 1 mm. The plane formed by the first layer (210) may correspond to a first longitudinal side of the device (200) while a plane formed by the third layer (214) may correspond to a second longitudinal side of the device (200). The first and second longitudinal sides may be provided on opposite sides of the second layer (212). In FIG. 2B, the set of microfluidic channels (220) may be about equidistant to the first longitudinal side and the second longitudinal side. That is, the microfluidic channel (220) may be defined along a central longitudinal plane of the apparatus. The set of microfluidic channels (220) may be arranged substantially parallel to the first longitudinal side.

In some embodiments, the set of microfluidic channels (120) of the second layer (212) may have a length of between about 1 mm and about 50 mm, a depth of between about 50 μm and about 5000 μm, and a width of between about 50 μm and about 5000 μm. In FIG. 2B, the microfluidic channel (220) may be linear relative to a longitudinal axis (202) of the microfluidic device (200). However, the microfluidic channel (220) may be curved relative to a longitudinal axis (202) of the microfluidic device (200). For example, the microfluidic channel (220) may have a generally serpentine shape.

The first opening (230) of the first layer (210) may be configured to receive a sample, such as from a pipette. The first opening (230) may include any suitable shape and/or size to receive the sample. In FIGS. 2A-2B, the first opening (230) may be provided at a proximal end of the device (200) and may be fluidically connected to a first end of the set of microfluidic channels (220). In some embodiments, the first opening (230) may have a diameter of between about 5000 µm and about 2 mm.

The set of second openings (240) of the first layer (210) may include an outlet (e.g., vent) configured to naturally vent gas (e.g., air) as the set of microfluidic channels (220) are filled with a fluid. In FIGS. 2A-2B, the set of second openings (240) may be provided at a distal end of the housing (2102) and may be fluidically connected to a second end of the microfluidic channel (220). In some embodiments, the set of second openings (240) may have a diameter of between about 10 µm and about 50 µm. In some embodiments, the first opening (230) and the set of second openings (240) may be spaced apart by between about 1 mm and about 100 mm. Although FIGS. 2A-2B illustrate a single first opening (230), the microfluidic device (100) may include a set of first openings (230) and a set of second openings (240).

In some embodiments, the microfluidic device (200) may include a set of fiducials (not shown) that may be imaged and/or otherwise detected by an optical detector of a biofluid analysis system. For example, a set of fiducials may be disposed at predetermined intervals along a length of the set of microfluidic channels (220) to aid image analysis. In some embodiments, the microfluidic channel (220) may include one or more filters (not shown) configured to separate analytes within the sample based on size.

Although the device (200) shown in FIGS. 2A-2B includes three layers, it should be appreciated that the microfluidic device (200) may be formed using more or less layers. In some embodiments, the device (200) may include a generally curved portion, as described in more detail with respect to FIG. 9, where a set of microfluidic channels may follow a curved shape of a housing.

In some embodiments, the third layer (214) and the second layer (212) may be formed using a die cut extruded film, and the first layer (210) may be formed using injection molding. In some embodiments, the second layer (212) may be bonded to the first layer (210) and third layer (214) using one or more of ultrasonic welding, laser welding, adhesives, and/or solvent bonding.

As described in more detail herein, the microfluidic device (200) may be coupled to a microfluidic device case (e.g., sample holder, consumable, disposable) to aid in one or more of handling, tracking, and identification of a sample applied to the microfluidic device. For example, the microfluidic device case may include a grip portion for a user to grasp without touching the microfluidic device and potentially affecting the optical qualities of the microfluidic device. The microfluidic device case may be configured to hold the microfluidic device at a fixed position relative to the microfluidic device case.

In some embodiments, a third layer (214) of the microfluidic device (200) may be placed on a flat, horizontal surface to permit a sample (not shown) to be input into the microfluidic channel (220) through the first opening (230) (e.g., sample port, biofluid input). The sample may include, but is not limited to, urine, whole blood, plasma, serum, combinations thereof, and the like. The sample may flow through the microfluidic channel (220) using capillary action from a proximal end to distal end of the microfluidic channel (220). As the microfluidic channel (220) fills with sample, gas (e.g., air) within the microfluidic channel may vent from the microfluidic device (200) through the set of second openings (240). In some embodiments, the first opening (230) may be coupled to at least one micropump configured to supply a continuous flow of the sample to the microfluidic device (200).

In some embodiments, the sample may be detected (e.g., imaged) as the microfluidic channel (220) is being filled and/or after a predetermined amount of time. For example, analytes (e.g., sediments, particulate matter) of the sample having a specific gravity greater than one may be allowed to settle within the microfluidic channel (220) over one or more regions of the third layer (214). This may aid image analysis of the sample so long as particle concentration of the sample is dilute enough to avoid superimposed particles. In some embodiments, analysis (e.g., image analysis) of a sample having high particle concentration, may be performed before one or more analytes settle within the microfluidic channel (220). For example, analytes including red blood cells, platelets, white blood cells, and uric acid may be analyzed. Red blood cells may have a concentration of about 5 teracells/L, platelets may have a concentration of about 0.3 teracells/L, white blood cells may have a concentration of about 7 gigacells/L, and uric acid may have a concentration of about 100 µmol/L. In some embodiments, a single particle may be analyzed in a sample, such as a single crystal. Additionally or alternatively, ultrasonic vibration may be applied to the microfluidic device (200) periodically to reduce settling and maintain suspension of one or more analytes.

In some embodiments, the microfluidic device (200) may be disposed between a radiation source and an optical detector. For example, the sample may be imaged using a radiation source facing an exposed side of the first layer (210) and an optical detector facing an exposed side of the third layer (214). As described in more detail herein, detector data may be used to generate analyte data that may be used to identify one or more analytes and/or sample attributes including, but not limited to, refractive index and osmolality.

Figure 3A:
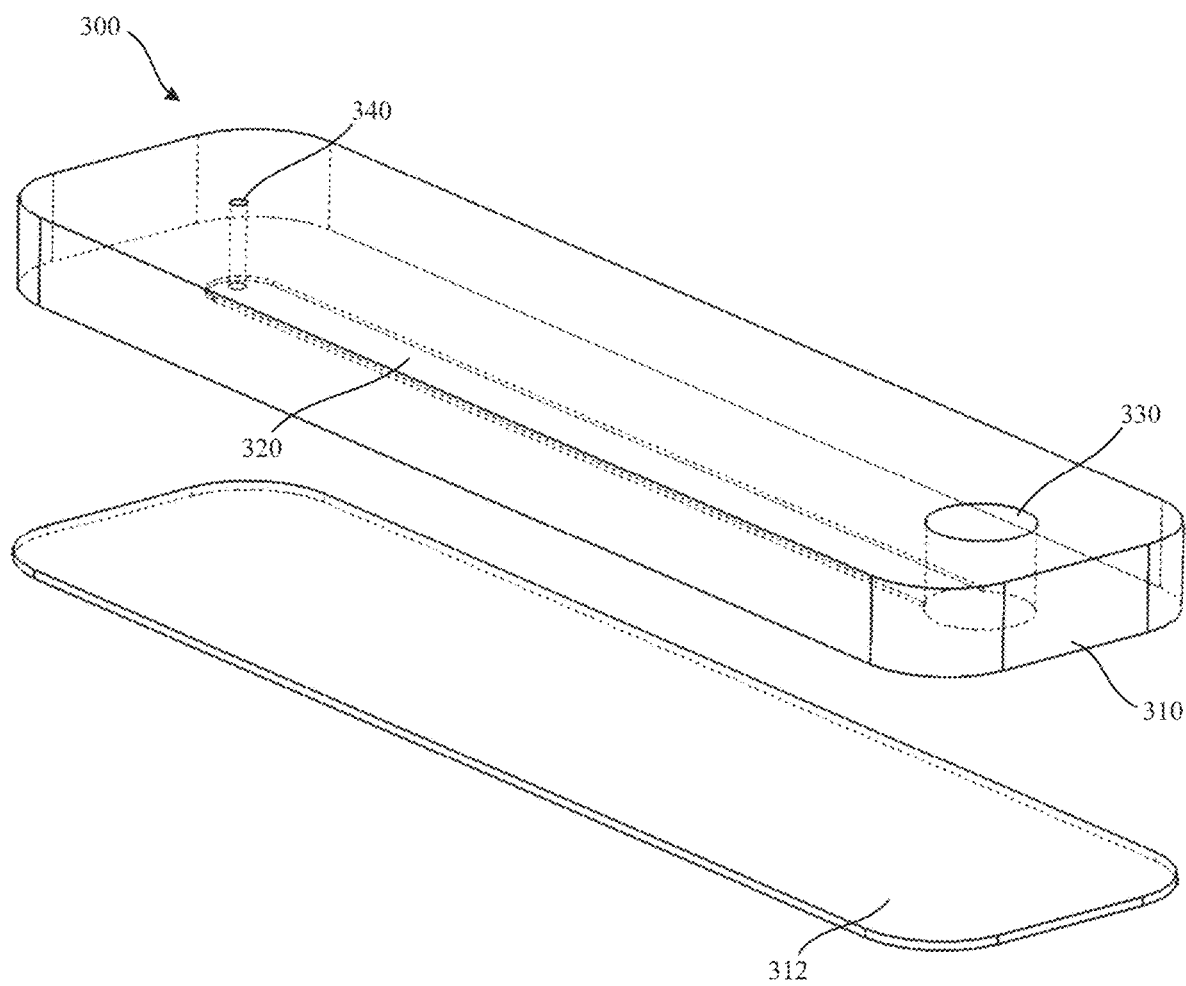
FIGS. 3A-3B are illustrative views of a microfluidic device, according to other embodiments.
Figure 3B:
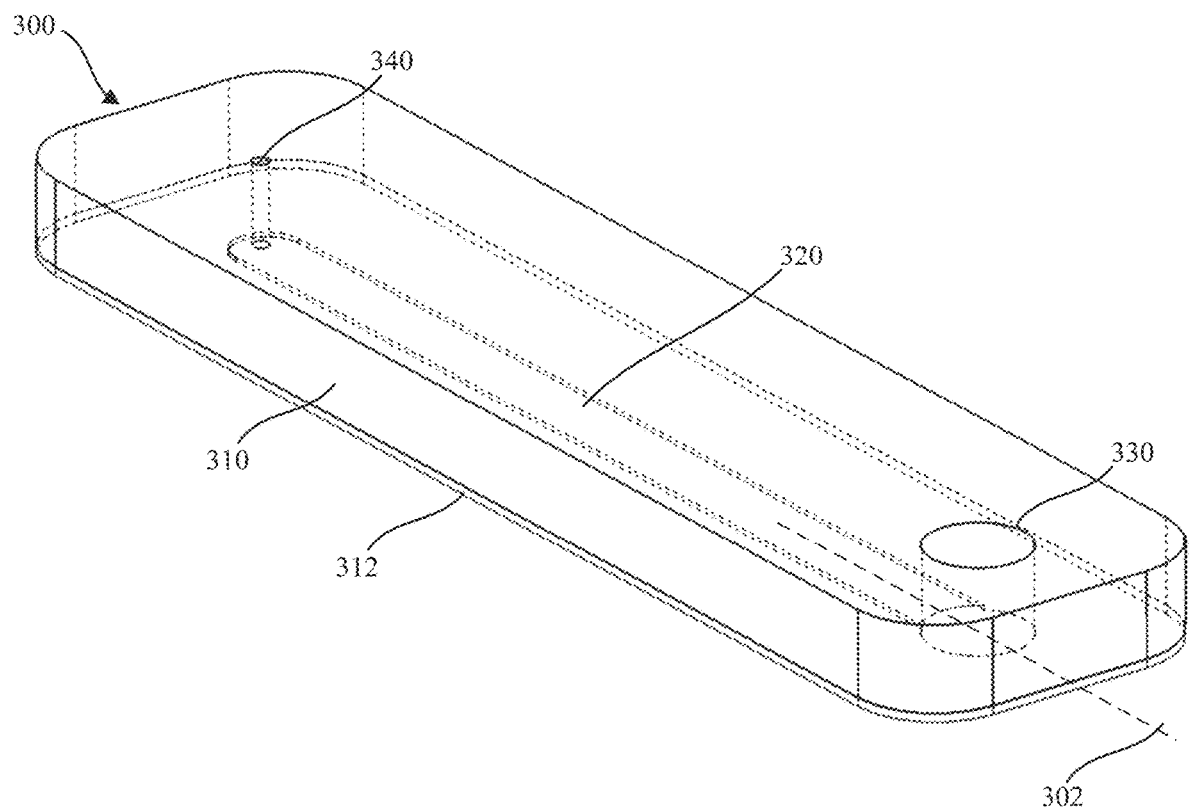

FIG. 3A is an exploded perspective view of an illustrative example of a microfluidic device (300), according to some embodiments. The microfluidic device (300) may include a first layer (310) (e.g., channel layer, top portion, cover) including a microfluidic channel (320), a first opening (330) (e.g., proximal opening), and a second opening (340) (e.g., distal opening) and a second layer (312) (e.g., base, substrate, bottom portion). In some embodiments, each of the layers (310, 312) may generally form an elongate rectangular structure where the layers may be configured to be assembled one on top of the other into a unitary structure, as shown in FIG. 3B. The first layer (310) or the second layer (320) may be substantially transparent while the other of at least a portion of the second layer (312) and first layer (310) may be substantially opaque. In the assembled configuration of FIG. 3B, the microfluidic channel (320) may be coupled between the first opening (330) and the second opening (340). The second layer (312) may be coupled to the first layer (310) such that the microfluidic channel establishes a fluid communication path between the first opening (330) and the second opening (340). In some embodiments, the microfluidic device (300) may have a length of between about 1 mm and about 100 mm, a width of between about 1 mm and about 50 mm, and a thickness of between about 1 mm and about 10 mm.

The device (300) may include a transparent portion along a length of the microfluidic channel (320). The transparent portion may be configured to provide high transmission and minimal birefringence. For example, the transparent portion may include the microfluidic channel (320) of the first layer (310) and the regions of the second layer (312) overlying (i.e., directly below) the microfluidic channel (320). However, the transparent portion need not necessarily be perpendicular to a plane of the microfluidic device so long as a light beam may pass through the microfluidic channel (320) and be received by a detector (e.g., optical sensor). The transparent portion may be substantially transparent to at least one of ultraviolet light, visible light, and near-infrared light. In some embodiments, one or more additional regions of the device (300) may be transparent. As another example, substantially the entire device (300) may be transparent. The device (300) may be formed by, for example, one or more of acrylic, polycarbonate, cyclic olefin copolymers (COC), and polyester.

In some embodiments, the device (300) may be formed out of a transparent polymer such as acrylic, polycarbonate, combinations thereof, and the like. In some embodiments, the device (300) may include between about 0.01% to about 1.0% by weight of at least one of carbon black and a laser absorbing dye. For example, the second layer may include between about 0.1% to about 1.0% by weight or between about 0.2% to about 0.3% by weight of at least one of carbon black and a laser absorbing dye. In some embodiments, the microfluidic channel (320) may be formed using low surface energy plastics such as polycarbonate, COC, and polyester that may enhance hydrophilic properties of the microfluidic channel (320). Additionally or alternatively, the microfluidic channel (320) may undergo hydrophilic treatment to enhance capillary fill in order to increase the surface energy and wettability of the sample. For example, hydrophilic polymers (e.g., PVP, PEG, surfactant) may be applied to microfluidic channel using plasma-etched vapor deposition (e.g., chemical). In some embodiments, one or more substances (e.g., reagent) may be disposed in the microfluidic channel (320) to facilitate sample analysis. For example, the reagents may include lysing agents and/or contrast agents. Lysing agents may lyse specific cell types such as red blood cells. Contrast agents (e.g., staining agents) may include nuclear, cytoplasm, and mitochondria (e.g., antibody and antibody conjugates including fluorescent dyes) corresponding to specific cellular antigens. For example, one or more substances may be disposed at specific regions of the microfluidic channel (320) (e.g., proximal end) or throughout a length of the microfluidic channel (320).

In some embodiments, the first layer (310) may cover one side of the microfluidic channel (320) when assembled as shown in FIG. 3B. The first layer (310) may have a different thickness than the second layer (312). The first layer (310) may have a thickness between about 0.5 mm and about 2 mm and the second layer (312) may have a thickness between about 25 μm and about 0.5 mm. In FIGS. 3A-3B, the second layer (312) is thinner than the first layer (310). In FIG. 3B, the microfluidic channel (320) may be closer to the second layer (312) than an inlet of the first and second openings (330, 340). The microfluidic channel (320) may be arranged substantially parallel to a plane of the first layer (310) and/or parallel and offset from a central longitudinal plane of the microfluidic device (300).

In some embodiments, the microfluidic channel (320) of the first layer (310) may have a length of between about 1 mm and about 50 mm, a depth of between about 50 μm and about 5000 μm, and a width of between about 50 μm and about 5000 μm. In FIG. 3B, the microfluidic channel (320) may be linear relative to a longitudinal axis (302) of the microfluidic device (300). However, in other variations, the microfluidic channel (320) may be curved relative to a longitudinal axis (302) of the microfluidic device (300). For example, the microfluidic channel (320) may include a generally serpentine shape.

The first opening (330) of the first layer (310) may be configured to receive a sample, such as from a pipette. The first opening (330) may include any suitable shape and/or size to receive the sample. In FIGS. 3A-3B, the first opening (330) may be provided at a proximal end of the device (300) and may be fluidically connected to a first end of the microfluidic channel (320). In some embodiments, the first opening (330) may have a diameter of between about 5000 μm and about 2 mm.

The second opening (340) of the second layer (312) may include an outlet (e.g., vent) configured to naturally vent gas (e.g., air) as the microfluidic channel (320) is filled with a fluid. In FIGS. 3A-3B, the second opening (340) may be provided at a distal end of the device (300) and may be fluidically connected to a second end of the microfluidic channel (320). In some embodiments, the second opening (340) may have a diameter of between about 10 μm and about 50 μm. In some embodiments, the first opening (330) and the second opening (340) may be spaced apart by between about 1 mm and about 100 mm. Although FIGS. 3A-3B illustrate a single first opening (330) and a single second opening (340), the microfluidic device (300) may include a set of first openings (330) and a set of second openings (340).

In some embodiments, the microfluidic device (300) may include a set of fiducials (not shown) that may be imaged and/or otherwise detected by an optical detector of a biofluid analysis system. For example, a set of fiducials (e.g., colored/opaque points, ruler, slits, landmarks, markers) may be disposed at predetermined intervals along a length of the microfluidic channel (320) to aid image analysis. In some embodiments, the microfluidic channel (320) may include one or more filters (not shown) configured to separate analytes within the sample based on size.

Although the device (300) shown in FIGS. 3A-3B includes two layers, it should be appreciated that the microfluidic device (300) may be formed using more or less layers. In some embodiments, the device (300) may include a generally curved portion, as described in more detail with respect to FIG. 9, where a set of microfluidic channels may follow a curved shape of a housing.

In some embodiments, the first layer (310) and the second layer (320) may be formed using a die cut extruded film or injection molding. For example, the second layer (312) may be formed of a die cut extruded film while first layer (310) may be injection molded. In some embodiments, the second layer (312) may be bonded to the first layer (310) using one or more of ultrasonic welding, laser welding, adhesives, and/or solvent bonding.

As described in more detail herein, the microfluidic device (300) may be coupled to a microfluidic device case (e.g., sample holder, consumable, disposable) to aid in one or more of handling, tracking, and identification of a sample applied to the microfluidic device. For example, the microfluidic device case may include a grip portion for a user to grasp without touching the microfluidic device and potentially affecting the optical qualities of the microfluidic device. The microfluidic device case may be configured to hold the microfluidic device at a fixed position relative to the microfluidic device case.

In some embodiments, a second layer (312) of the microfluidic device (300) may be placed on a flat, horizontal surface to permit a sample (not shown) to be input into the microfluidic channel (320) through the first opening (330) (e.g., sample port, biofluid input). The sample may include, but is not limited to, urine, whole blood, plasma, serum, combinations thereof, and the like. The sample may flow through the microfluidic channel (320) using capillary action from a proximal to distal end of the microfluidic channel (320). As the microfluidic channel (320) fills with sample, gas (e.g., air) within the microfluidic channel may vent from the microfluidic device (300) through the second opening (340). In some embodiments, the first opening (330) may be coupled to at least one micropump configured to supply a continuous flow of the sample to the microfluidic device (300).

In some embodiments, the sample may be detected (e.g., imaged) as the microfluidic channel (320) is being filled and/or after a predetermined amount of time. For example, analytes (e.g., sediments, particulate matter) of the sample having a specific gravity greater than one may be allowed to settle within the microfluidic channel (320) over one or more regions of the second layer (312). This may aid image analysis of the sample so long as particle concentration of the sample is dilute enough to avoid superimposed particles. In some embodiments, analysis (e.g., image analysis) of a sample having high particle concentration, may be performed before one or more analytes settle within the microfluidic channel (320). For example, analytes including red blood cells, platelets, white blood cells, and uric acid may be analyzed. Red blood cells may have a concentration of about 5 teracells/L, platelets may have a concentration of about 0.3 teracells/L, white blood cells may have a concentration of about 7 gigacells/L, and uric acid may have a concentration of about 100 μmol/L. In some embodiments, a single particle may be analyzed in a sample, such as a single crystal. Additionally or alternatively, ultrasonic vibration may be applied to the microfluidic device (300) periodically to reduce settling and maintain suspension of one or more analytes.

In some embodiments, the microfluidic device (300) may be disposed between a radiation source and an optical detector. For example, the sample may be imaged using a radiation source facing an exposed side of the first layer (310) and an optical detector facing an exposed side of the second layer (312) such that the detector is closer to the microfluidic channel (320). As described in more detail herein, detector data may be used to generate analyte data that may be used to identify one or more analytes and/or sample attributes including, but not limited to, refractive index and osmolality.

Figure 4A:
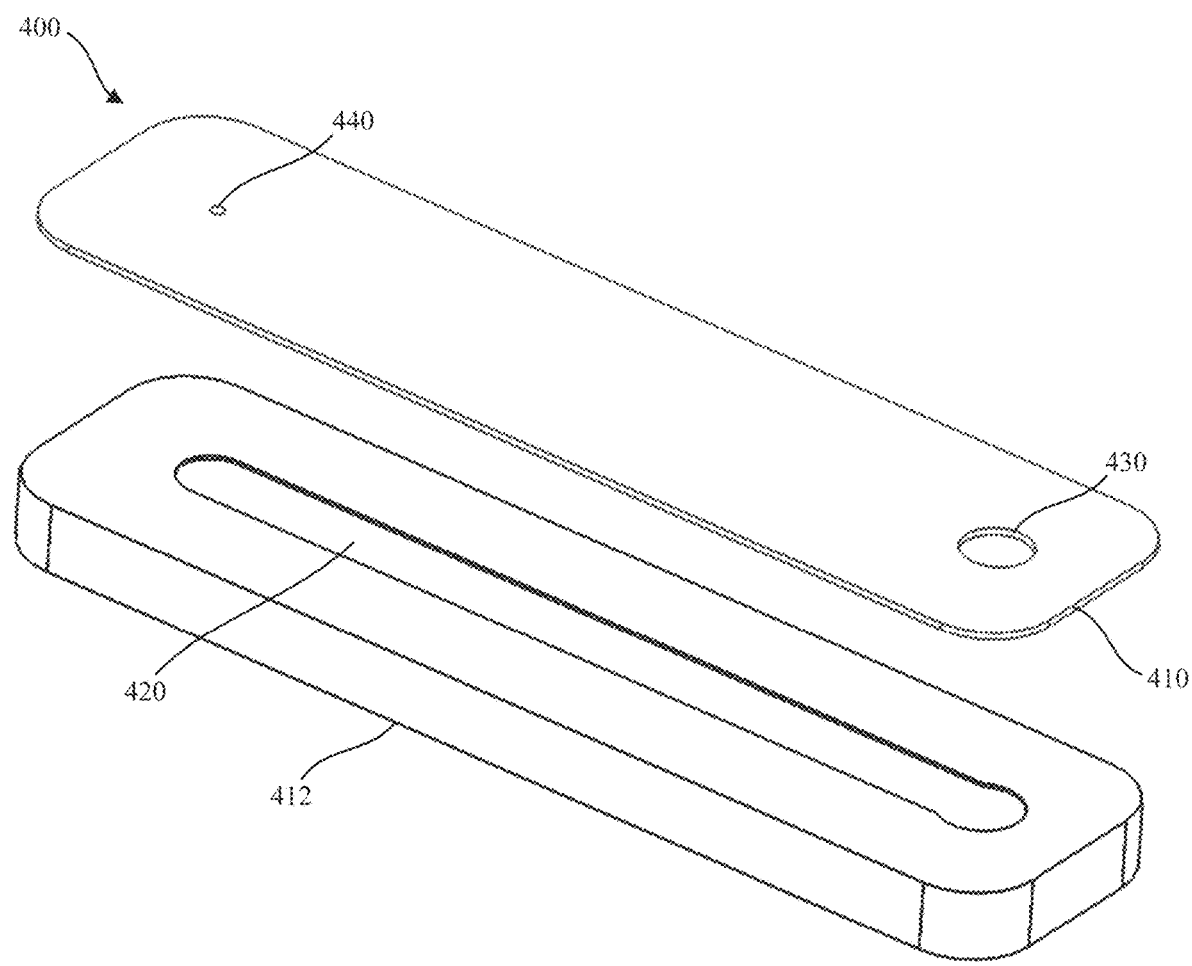
FIGS. 4A-4B are illustrative views of a microfluidic device, according to other embodiments.
Figure 4B:
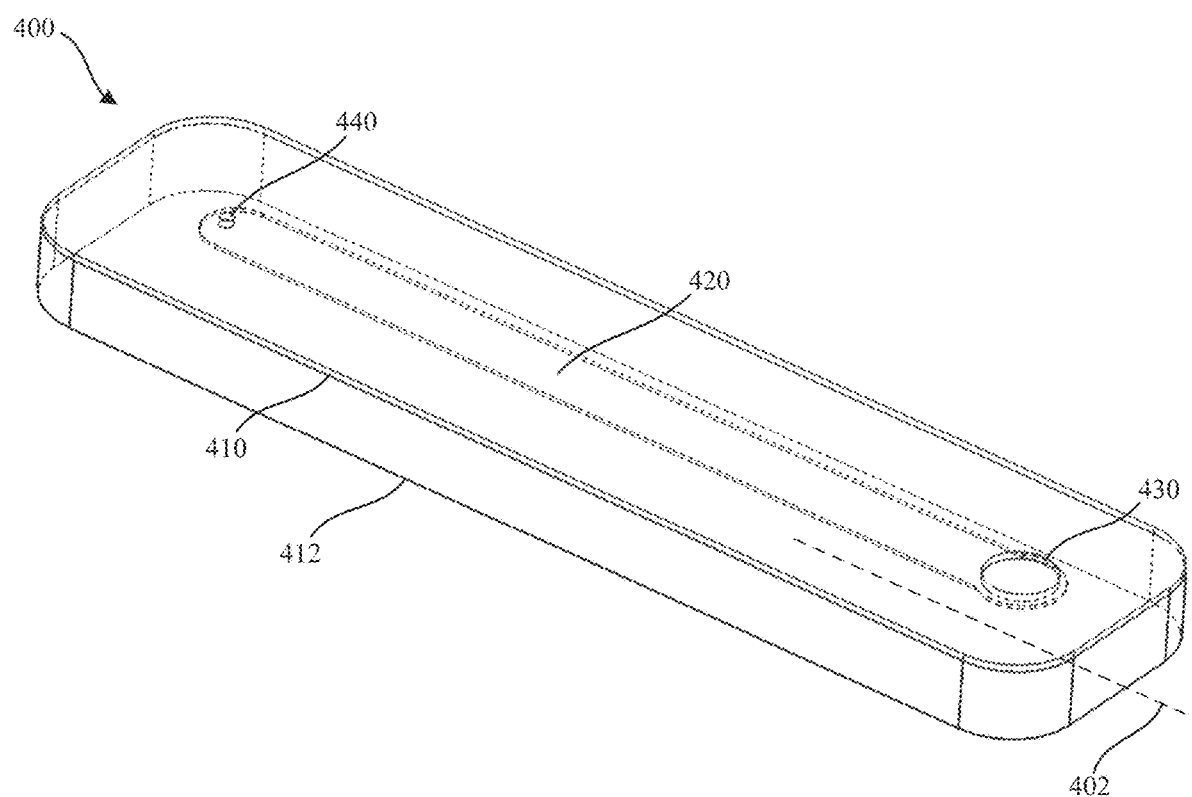

FIG. 4A is an exploded perspective view of an illustrative example of a microfluidic device (400), according to some embodiments. The microfluidic device (400) may include a first layer (410) (e.g., top portion, cover) including a first opening (430) (e.g., proximal opening) and a second opening (440) (e.g., distal opening) and a second layer (412) (e.g., base, channel layer, substrate, bottom portion) including a microfluidic channel (420). In some embodiments, each of the layers (410, 412) may generally form an elongate rectangular structure where the layers may be configured to be assembled one on top of the other into a unitary structure, as shown in FIG. 4B. The first layer (410) or the second layer (420) may be substantially transparent while the other of at least a portion of the second layer (412) or first layer (410) may be substantially opaque. In the assembled configuration of FIG. 4B, the microfluidic channel (420) may be coupled between the first opening (430) and the second opening (440). The second layer (412) may be coupled the first layer (410) such that the microfluidic channel (420) establishes a fluid communication path between the first opening (430) and the second opening (440). In some embodiments, the microfluidic device (400) may have a length of between about 1 mm and about 100 mm, a width of between about 1 mm and about 50 mm, and a thickness of between about 1 mm and about 10 mm.

The device (400) may include a transparent portion along a length of the microfluidic channel (420). The transparent portion may be configured to provide high transmission and minimal birefringence. For example, the transparent portion may include the microfluidic channel (420) of the second layer (412) and the regions of the first layer (410) overlying (i.e., directly above) the microfluidic channel (420). However, the transparent portion need not necessarily be perpendicular to a plane of the microfluidic device so long as a light beam may pass through the microfluidic channel (420) and be received by a detector (e.g., optical sensor). The transparent portion may be substantially transparent to at least one of ultraviolet light, visible light, and near-infrared light. In some embodiments, one or more additional regions of the device (400) may be transparent. As another example, substantially the entire device (400) may be transparent. The device (400) may be formed by, for example, one or more of acrylic, polycarbonate, cyclic olefin copolymers (COC), and polyester.

In some embodiments, the device (400) may be formed out of a transparent polymer such as acrylic, polycarbonate, combinations thereof, and the like. In some embodiments, the device (400) may include between about 0.01% to about 1.0% by weight of at least one of carbon black and a laser absorbing dye. For example, a layer may include between about 0.1% to about 1.0% by weight or between about 0.2% to about 0.3% by weight of at least one of carbon black and a laser absorbing dye. In some embodiments, the microfluidic channel (420) may be formed using low surface energy plastics such as polycarbonate, COC, and polyester that may enhance hydrophilic properties of the microfluidic channel (420). Additionally or alternatively, the microfluidic channel (420) may undergo hydrophilic treatment to enhance capillary fill in order to increase the surface energy and wettability of the sample. For example, hydrophilic polymers (e.g., PVP, PEG, surfactant) may be applied to microfluidic channel using plasma-etched vapor deposition (e.g., chemical). In some embodiments, one or more substances (e.g., reagent) may be disposed in the microfluidic channel to facilitate sample analysis. For example, the reagents may include lysing agents and/or contrast agents. Lysing agents may lyse specific cell types such as red blood cells. Contrast agents (e.g., staining agents) may include nuclear, cytoplasm, and mitochondria (e.g., antibody and antibody conjugates including fluorescent dyes) corresponding to specific cellular antigens. For example, one or more substances may be disposed at specific regions of the microfluidic channel (420) (e.g., proximal end) or throughout a length of the microfluidic channel (420).

In some embodiments, the first layer (410) may cover one side of the microfluidic channel (420) when assembled as shown in FIG. 4B. The first layer (410) may have a different thickness than the second layer (412). The second layer (412) may have a thickness between about 0.5 mm and about 2 mm and the first layer (410) may have a thickness between about 25 μm and about 0.5 mm. In FIGS. 4A-4B, the second layer (412) is thicker than the first layer (410). In FIG. 4B, the microfluidic channel (420) may be closer to the first layer (410) than a bottom surface of the second layer (412). The microfluidic channel (420) may be arranged substantially parallel to a plane of the first layer (410). That is, the microfluidic channel (420) may be parallel and offset from a central longitudinal plane of the apparatus.

In some embodiments, the microfluidic channel (420) of the first layer (412) may have a length of between about 1 mm and about 50 mm, a depth of between about 50 μm and about 5000 μm, and a width of between about 50 μm and about 5000 μm. In FIG. 4B, the microfluidic channel (420) may be linear relative to a longitudinal axis (402) of the microfluidic device (400). However, in other variations, the microfluidic channel (420) may have be curved relative to a longitudinal axis (402) of the microfluidic device (400). For example, the microfluidic channel (420) may include a generally serpentine shape.

The first opening (430) of the first layer (410) may be configured to receive a sample, such as from a pipette. The first opening (430) may include any suitable shape and/or size to receive the sample. In FIGS. 4A-4B, the first opening (430) may be provided at a proximal end of the device (400) and may be fluidically connected to a first end of the microfluidic channel (420). In some embodiments, the first opening (430) may have a diameter of between about 5000 μm and about 2 mm.

The second opening (440) of the first layer (410) may include an outlet configured to naturally vent gas (e.g., air) as the microfluidic channel (420) is filled with a fluid. In FIGS. 4A-4B, the second opening (440) may be provided at a distal end of the device (400) and may be fluidically connected to a second end of the microfluidic channel (420). In some embodiments, the second opening (440) may have a diameter of between about 10 μm and about 50 μm. In some embodiments, the first opening (430) and the second opening (440) may be spaced apart by between about 1 mm and about 100 mm. Although FIGS. 4A-4B illustrate a single first opening (430) and a single second opening (440), the microfluidic device (400) may include a set of first openings (430) and a set of second openings (440).

In some embodiments, the microfluidic device (400) may include a set of fiducials (not shown) that may be imaged and/or otherwise detected by an optical detector of a biofluid analysis system. For example, a set of fiducials (e.g., colored/opaque points, ruler, slits, landmarks, markers) may be disposed at predetermined intervals along a length of the microfluidic channel (420) to aid image analysis. In some embodiments, the microfluidic channel (420) may include one or more filters (not shown) configured to separate analytes within the sample based on size.

Although the device (400) shown in FIGS. 4A-4B includes two layers, it should be appreciated that the microfluidic device (400) may be formed using more or less layers. In some embodiments, the device (400) may include a generally curved portion, as described in more detail with respect to FIG. 9, where a set of microfluidic channels may follow a curved shape of a housing.

In some embodiments, the first layer (410) and the second layer (420) may be formed using a die cut extruded film or injection molding. In some embodiments, the second layer (412) may be bonded to the first layer (410) using one or more of ultrasonic welding, laser welding, adhesives, and/or solvent bonding.

As described in more detail herein, the microfluidic device (400) may be coupled to a microfluidic device case (e.g., sample holder, consumable, disposable) to aid in one or more of handling, tracking, and identification of a sample applied to the microfluidic device. For example, the microfluidic device case may include a grip portion for a user to grasp without touching the microfluidic device and potentially affecting the optical qualities of the microfluidic device. The microfluidic device case may be configured to hold the microfluidic device at a fixed position relative to the microfluidic device case.

In some embodiments, a second layer (412) of the microfluidic device (400) may be placed on a flat, horizontal surface to permit a sample (not shown) to be input into the microfluidic channel (420) through the first opening (430) (e.g., sample port, biofluid input). The sample may include, but is not limited to, urine, whole blood, plasma, serum, combinations thereof, and the like. The sample may flow through the microfluidic channel (420) using capillary action from a proximal to distal end of the microfluidic channel (420). As the microfluidic channel (420) fills with sample, gas (e.g., air) within the microfluidic channel may vent from the microfluidic device (400) through the second opening (440). In some embodiments, the first opening (430) may be coupled to at least one micropump configured to supply a continuous flow of the sample to the microfluidic device (400).

In some embodiments, the sample may be detected (e.g., imaged) as the microfluidic channel (420) is being filled and/or after a predetermined amount of time. For example, analytes (e.g., sediments, particulate matter) of the sample having a specific gravity greater than one may be allowed to settle within the microfluidic channel (420) over one or more regions of the second layer (412). This may aid image analysis of the sample so long as particle concentration of the sample is dilute enough to avoid superimposed particles. In some embodiments, analysis (e.g., image analysis) of a sample having high particle concentration, may be performed before one or more analytes settle within the microfluidic channel (420). For example, analytes including red blood cells, platelets, white blood cells, and uric acid may be analyzed. Red blood cells may have a concentration of about 5 teracells/L, platelets may have a concentration of about 0.3 teracells/L, white blood cells may have a concentration of about 7 gigacells/L, and uric acid may have a concentration of about 100 μmol/L. In some embodiments, a single particle may be analyzed in a sample, such as a single crystal. Additionally or alternatively, ultrasonic vibration may be applied to the microfluidic device (400) periodically to reduce settling and maintain suspension of one or more analytes.

In some embodiments, the microfluidic device (400) may be disposed between a radiation source and an optical detector. For example, the sample may be imaged using a radiation source facing an exposed side of the second layer (412) and an optical detector facing the exposed side of the first layer (410) such that the detector is closer to the microfluidic channel (420). As described in more detail herein, detector data may be used to generate analyte data that may be used to identify one or more analytes and/or sample attributes including, but not limited to, refractive index and osmolality.

Figure 5A:
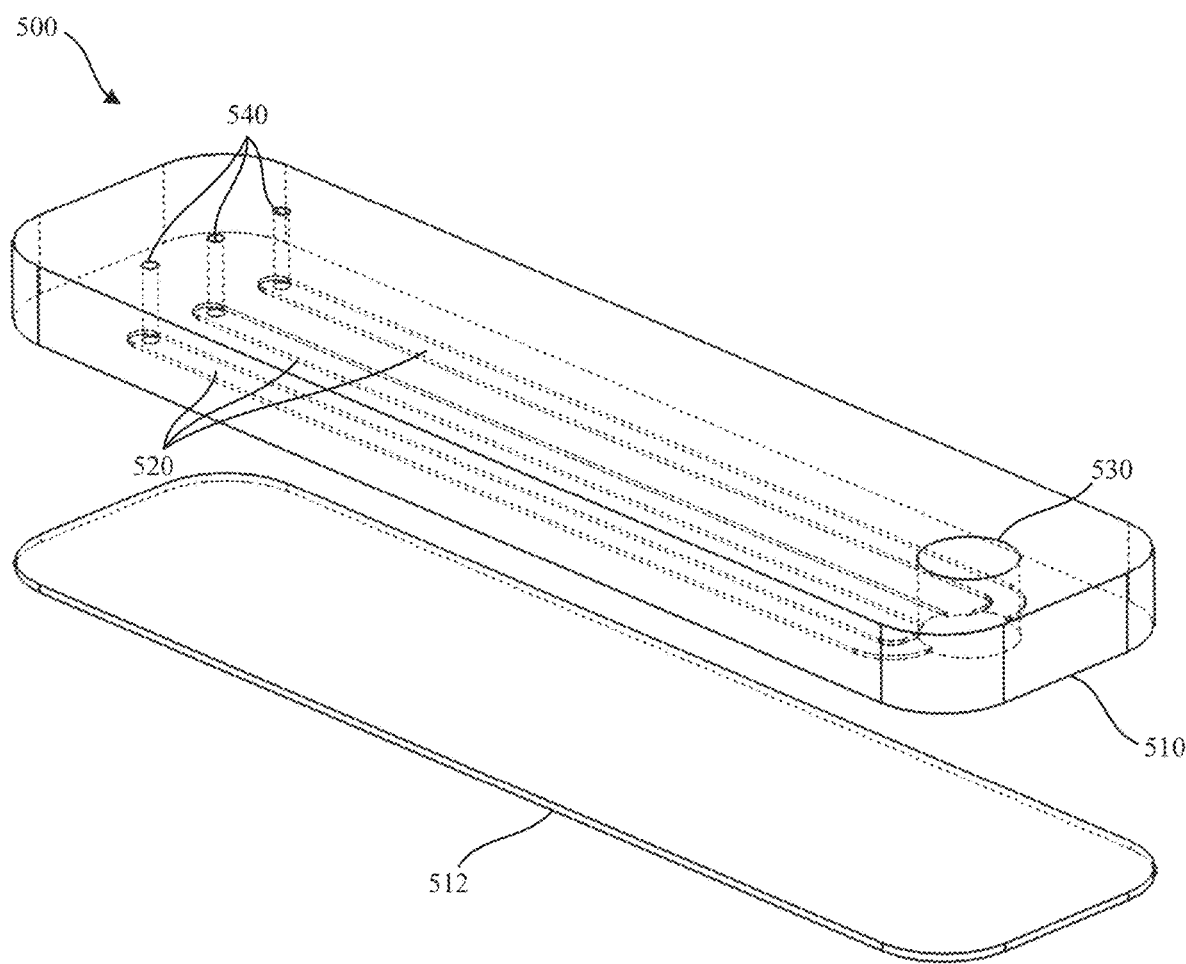
FIGS. 5A-5B are illustrative views of a microfluidic device, according to other embodiments.
Figure 5B:
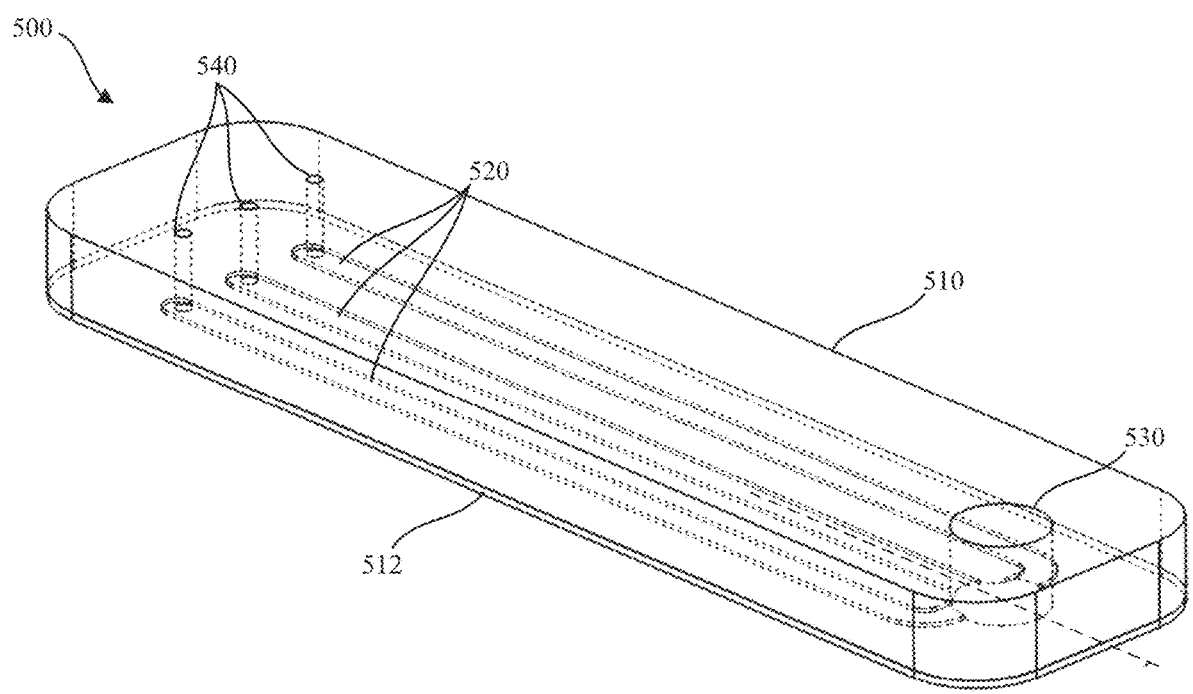

FIG. 5A is an exploded perspective view of an illustrative example of a microfluidic device (500), according to some embodiments. The microfluidic device (500) may include a first layer (510) (e.g., channel layer, top portion, cover) including a set of microfluidic channels (520), a first opening (530) (e.g., proximal opening), and a set of second openings (540) (e.g., distal opening) and a second layer (512) (e.g., base, substrate, bottom portion). In some embodiments, each of the layers (510, 512) may generally form an elongate rectangular structure where the layers may be configured to be assembled one on top of the other into a unitary structure, as shown in FIG. 5B. The first layer (510) or the second layer (510) may be substantially transparent while the other of at least a portion of the second layer (512) or first layer (510) may be substantially opaque. In the assembled configuration of FIG. 5B, the set of microfluidic channels (520) may be fluidically coupled to establish a fluid communication path between the first opening (530) and the set of second openings (540). The set of microfluidic channels (520) may include a first channel, second channel, and third channel of a set of channels (520). The set of second openings (540) may include a first opening, second opening, and third opening of a set of openings (540). In some embodiments, the microfluidic device (500) may have a length of between about 1 mm and about 100 mm, a width of between about 1 mm and about 50 mm, and a thickness of between about 1 mm and about 10 mm.

The device (500) may include a transparent portion along a length of the microfluidic channels (520). The transparent portion may be configured to provide high transmission and minimal birefringence. For example, the transparent portion may include the set of microfluidic channel (520) of the second layer (512) and the regions of the first layer (510) overlying (i.e., directly below) the set of microfluidic channels (520). However, the transparent portion need not necessarily be perpendicular to a plane of the microfluidic device so long as a light beam may pass through the set of microfluidic channels (520) and be received by a detector (e.g., optical sensor). The transparent portion may be substantially transparent to at least one of ultraviolet light, visible light, and near-infrared light. In some embodiments, one or more additional regions of the device (500) may be transparent. As another example, substantially the entire device (500) may be transparent. The device (500) may be formed by, for example, one or more of acrylic, polycarbonate, cyclic olefin copolymers (COC), and polyester.

In some embodiments, the device (500) may be formed out of a transparent polymer such as acrylic, polycarbonate, combinations thereof, and the like. In some embodiments, the device (500) may include between about 0.01% to about 1.0% by weight of at least one of carbon black and a laser absorbing dye. For example, a layer may include between about 0.1% to about 1.0% by weight or between about 0.2% to about 0.3% by weight of at least one of carbon black and a laser absorbing dye. In some embodiments, the set of microfluidic channels (520) may be formed using low surface energy plastics such as polycarbonate, COC, and polyester that may enhance hydrophilic properties of the set of microfluidic channels (520). Additionally or alternatively, the set of microfluidic channels (520) may undergo hydrophilic treatment to enhance capillary fill in order to increase the surface energy and wettability of the sample. For example, hydrophilic polymers (e.g., PVP, PEG, surfactant) may be applied to microfluidic channel using plasma-etched vapor deposition (e.g., chemical). In some embodiments, one or more substances (e.g., reagent) may be disposed in each of the microfluidic channels to facilitate sample analysis. For example, the reagents may include lysing agents and/or contrast agents. Lysing agents may lyse specific cell types such as red blood cells. Contrast agents (e.g., staining agents) may include nuclear, cytoplasm, and mitochondria (e.g., antibody and antibody conjugates including fluorescent dyes) corresponding to specific cellular antigens. For example, one or more substances may be disposed at specific regions of the set of microfluidic channels (520) (e.g., proximal end) or throughout a length of the set of microfluidic channels (520). A set of microfluidic channels (520) allows a larger volume of biofluid to be analyzed and allows independent flow of biofluid through the set of microfluidic channels (520).

In some embodiments, the first layer (510) may cover one side of the set of microfluidic channels (520) when assembled as shown in FIG. 5B. The first layer (510) may have a different thickness than the second layer (512). In FIGS. 5A-5B, the second layer (512) is thicker than the first layer (510). The first layer (510) may have a thickness between about 0.5 mm and about 2 mm and the second layer (512) may have a thickness between about 25 µm and about 0.5 mm. In FIG. 5B, the set of microfluidic channels (520) may be closer to the first layer (510) than an inlet of the first and second openings (530, 540). The set of microfluidic channels (520) may be arranged substantially parallel to a plane of the first layer (510).

In some embodiments, the set of microfluidic channels (520) of the second layer (512) may have a length of between about 1 mm and about 50 mm, a depth of between about 50 µm and about 5000 µm, and a width of between about 50 µm and about 5000 µm. In FIG. 5B, the set of microfluidic channels (520) may be linear. However, the set of microfluidic channels (520) may have one or more curved portions. For example, the set of microfluidic channels (520) may include a generally serpentine shape.

The first opening (530) of the second layer (512) may be configured to receive a sample, such as from a pipette. The first opening (530) may include any suitable shape and/or size to receive the sample. In FIGS. 5A-5B, the first opening (530) may be provided at a proximal end of the device (500) and may be fluidically connected to a first end of the set of microfluidic channels (520). In some embodiments, the first opening (530) may have a diameter of between about 5000 µm and about 2 mm.

The set of second openings (540) of the second layer (512) may include an outlet configured to naturally vent gas (e.g., air) as the set of microfluidic channels (520) is filled with a fluid. In FIGS. 5A-5B, the second opening (540) may be provided at a distal end of the device (500) and may be fluidically connected to a second end of the set of microfluidic channels (520). In some embodiments, the set of second openings (540) may have a diameter of between about 10 µm and about 50 µm. In some embodiments, the first opening (530) and the set of second openings (540) may be spaced apart by between about 1 mm and about 100 mm. Although FIGS. 5A-5B illustrate a single first opening (530) and a set of 3 second openings (540), the microfluidic device (500) may include a set of first openings (530) and a set of second openings (540).

In some embodiments, the microfluidic device (500) may include a set of fiducials (not shown) that may be imaged and/or otherwise detected by an optical detector of a biofluid analysis system. For example, a set of fiducials (e.g., colored/opaque points, ruler, slits, landmarks, markers) may be disposed at predetermined intervals along a length of the set of microfluidic channels (520) to aid image analysis. In some embodiments, the set of microfluidic channels (520) may include one or more filters (not shown) configured to separate analytes within the sample based on size.

Although the device (500) shown in FIGS. 5A-5B includes two layers, it should be appreciated that the microfluidic device (500) may be formed using more or less layers. In some embodiments, the device (500) may include a generally curved portion, as described in more detail with respect to FIG. 9, where a set of microfluidic channels may follow a curved shape of a housing.

In some embodiments, the first layer (510) and the second layer (512) may be formed using a die cut extruded film or injection molding. For example, the first layer (510) may be formed of a die cut extruded film while second layer (512) may be injection molded. In some embodiments, the second layer (512) may be bonded to the first layer (510) using one or more of ultrasonic welding, laser welding, adhesives, and/or solvent bonding.

As described in more detail herein, the microfluidic device (500) may be coupled to a microfluidic device case (e.g., sample holder, consumable, disposable) to aid in one or more of handling, tracking, and identification of a sample applied to the microfluidic device. For example, the microfluidic device case may include a grip portion for a user to grasp without touching the microfluidic device and potentially affecting the optical qualities of the microfluidic device. The microfluidic device case may be configured to hold the microfluidic device at a fixed position relative to the microfluidic device case.

In some embodiments, a first layer (510) of the microfluidic device (500) may be placed on a flat, horizontal surface to permit a sample (not shown) to be input into the set of microfluidic channels (520) through the first opening (530) (e.g., sample port, biofluid input). The sample may include, but is not limited to, urine, whole blood, plasma, serum, combinations thereof, and the like. The sample may flow through the set of microfluidic channels (520) using capillary action from a proximal to distal end of the set of microfluidic channels (520). As the set of microfluidic channels (520) fills with sample, gas (e.g., air) within the set of microfluidic channels (520) may vent from the microfluidic device (500) through the second opening (540). In some embodiments, the first opening (530) may be coupled to at least one micropump configured to supply a continuous flow of the sample to the microfluidic device (500).

In some embodiments, the sample may be detected (e.g., imaged) as the set of microfluidic channels (520) are being filled and/or after a predetermined amount of time. For example, analytes (e.g., sediments, particulate matter) of the sample having a specific gravity greater than one may be allowed to settle within the set of microfluidic channels (520) over one or more regions of the first layer (510). This may aid image analysis of the sample so long as particle concentration of the sample is dilute enough to avoid superimposed particles. In some embodiments, analysis (e.g., image analysis) of a sample having high particle concentration, may be performed before one or more analytes settle within the set of microfluidic channels (520). For example, analytes including red blood cells, platelets, white blood cells, and uric acid may be analyzed. Red blood cells may have a concentration of about 5 teracells/L, platelets may have a concentration of about 0.3 teracells/L, white blood cells may have a concentration of about 7 gigacells/L, and uric acid may have a concentration of about 100 μmol/L. In some embodiments, a single particle may be analyzed in a sample, such as a single crystal. Additionally or alternatively, ultrasonic vibration may be applied to the microfluidic device (500) periodically to reduce settling and maintain suspension of one or more analytes.

In some embodiments, the microfluidic device (500) may be disposed between the radiation source and the optical detector. For example, the sample may be imaged using a radiation source facing an exposed side of the second layer (512) and an optical detector facing an exposed side of the first layer (510) such that the detector is closer to the set of microfluidic channels (520). As described in more detail herein, detector data may be used to generate analyte data that may be used to identify one or more analytes and/or sample attributes including, but not limited to, refractive index and osmolality. Although the set of microfluidic channels (520) shown in FIGS. 5A-5B includes three channels, it should be appreciated that the microfluidic device (500) may be formed using more or less channels.

Figure 6A:
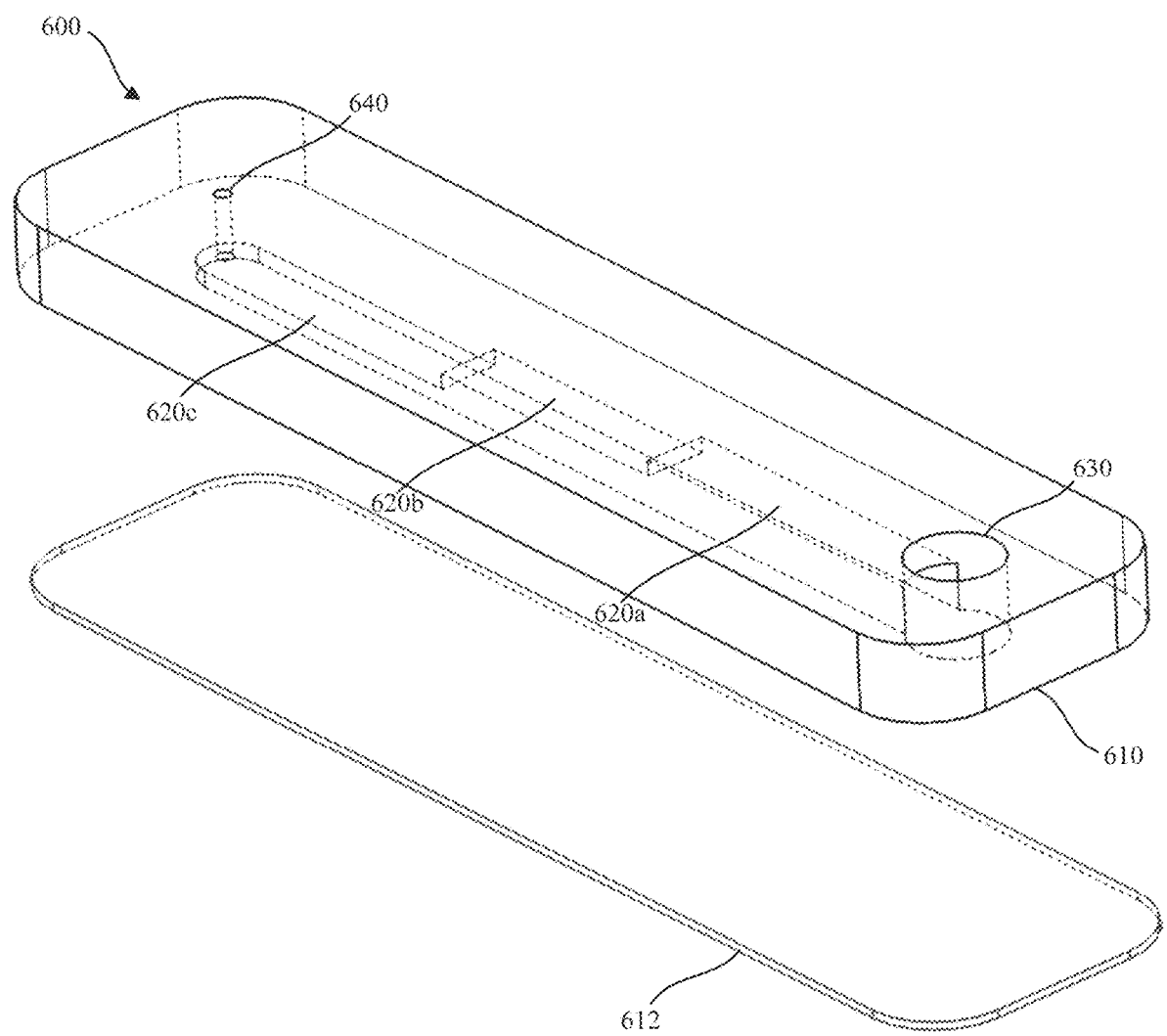
FIGS. 6A-6D are illustrative views of a microfluidic device, according to other embodiments.
Figure 6B:
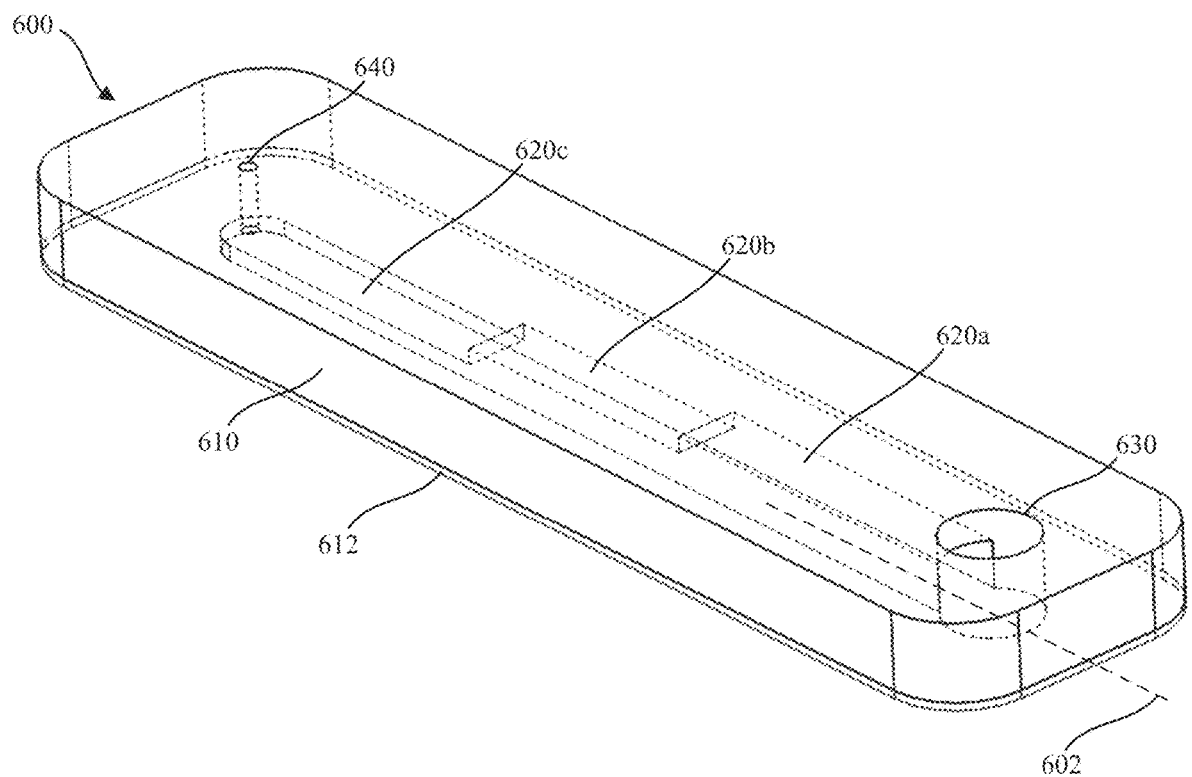

FIG. 6A is an exploded perspective view of an illustrative example of a microfluidic device (600), according to some embodiments. The microfluidic device (600) may include a first layer (610) (e.g., channel layer, top portion, cover) including a microfluidic channel (620) including a set of step regions (620a, 620b, 620c) having a set of corresponding heights, a first opening (630) (e.g., proximal opening), and a second opening (640) (e.g., distal opening) and a second layer (612) (e.g., base, substrate, bottom portion). In some embodiments, each of the layers (610, 612) may generally form an elongate rectangular structure where the layers may be configured to be assembled one on top of the other into a unitary structure, as shown in FIG. 6B. The first layer (610) or the second layer (612) may be substantially transparent while the other of at least a portion of the second layer (612) and first layer (610) may be substantially opaque. In the assembled configuration of FIG. 6B, the microfluidic channel (620) having a set of step regions (620a, 620b, 620c) may be coupled between the first opening (630) and the second opening (640). The second layer (612) may be coupled to the first layer (610) such that the microfluidic channel (620) establishes a fluid communication path between the first opening (630) and the second opening (640). In some embodiments, the microfluidic device (600) may have a length of between about 1 mm and about 100 mm, a width of between about 1 mm and about 50 mm, and a thickness of between about 1 mm and about 10 mm.

Figure 6C:
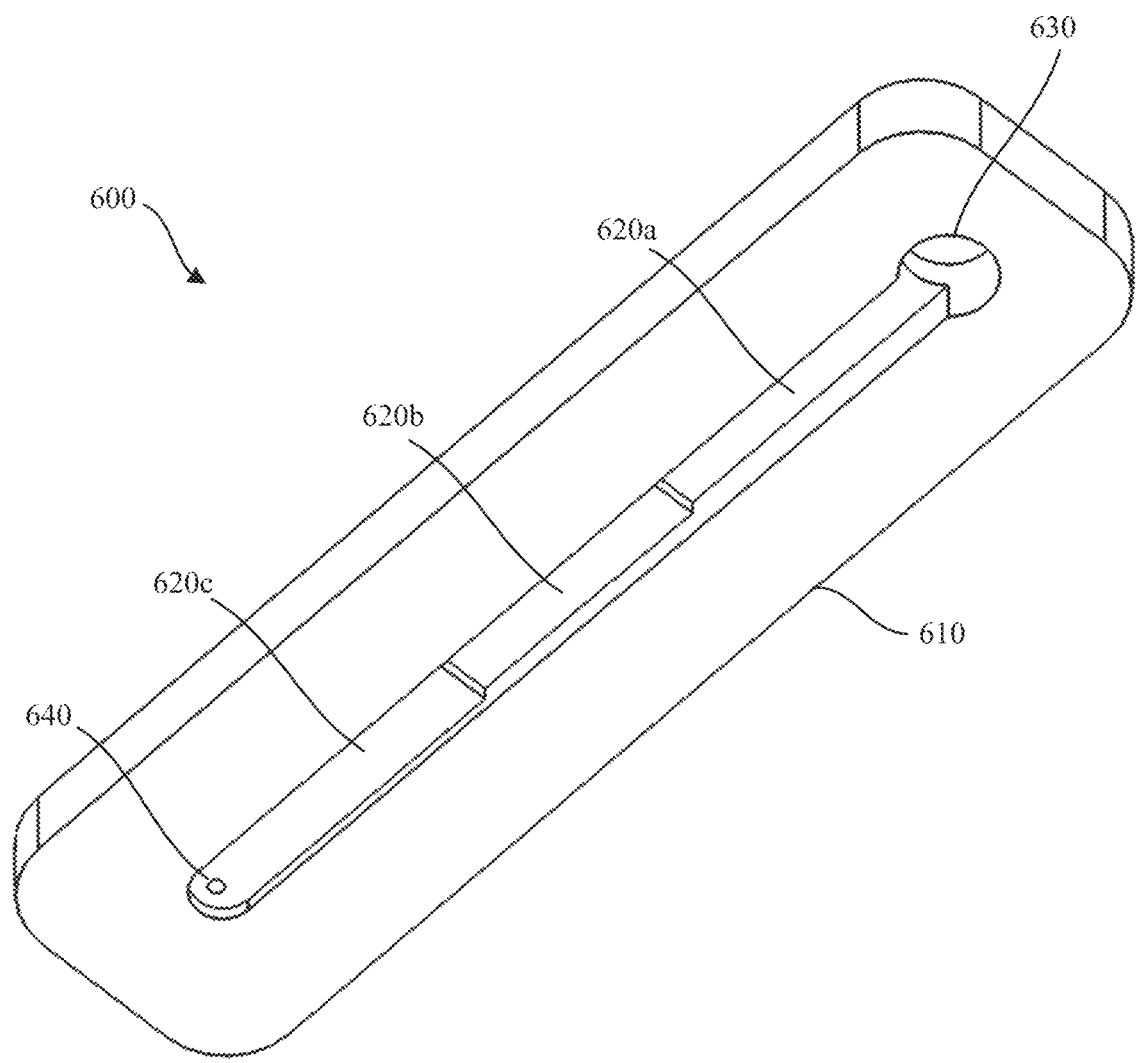
Figure 6D:
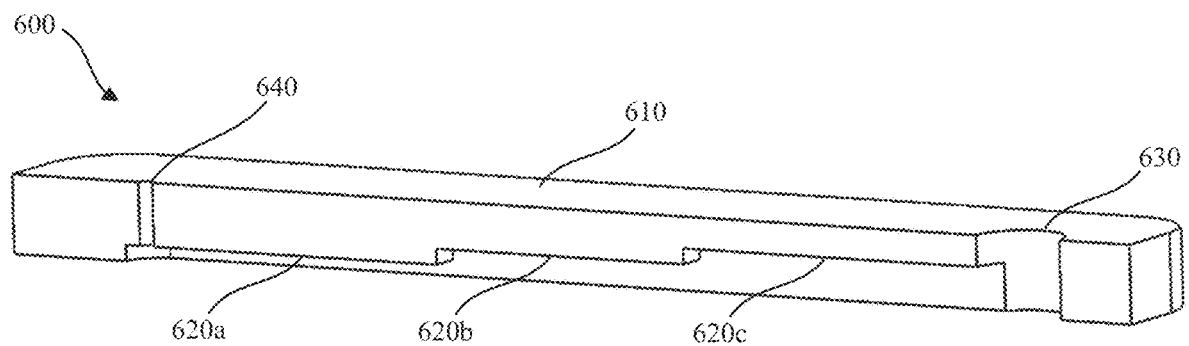

As shown in FIGS. 6C-6D, the microfluidic channel (620) may define a set of steps (620a, 620b, 620c) such that a height of the microfluidic channel (620) decreases in a step-wise manner from the first opening (630) to the second opening (640). That is, a volume of each step may decrease from the first opening (630) to the second opening (640). In some embodiments, a height of each step of the set of steps (620a, 620b, 620c) may be from about 0.1 mm to about 0.9 mm. For example, a height of the first step (620a) may be about 0.9 mm, a height of the second step (620b) may be about 0.4 mm, and a height of the third step (620c) may be about 0.1 mm.

The device (600) may include a transparent portion along a length of the microfluidic channel (620). The transparent portion may be configured to provide high transmission and minimal birefringence. For example, the transparent portion may include the microfluidic channel (620) of the first layer (610) and the regions of the second layer (612) overlying (i.e., directly below) the microfluidic channel (620). However, the transparent portion need not necessarily be perpendicular to a plane of the microfluidic device so long as a light beam may pass through the microfluidic channel (620) and be received by a detector (e.g., optical sensor). The transparent portion may be substantially transparent to at least one of ultraviolet light, visible light, and near-infrared light. In some embodiments, one or more additional regions of the device (600) may be transparent. As another example, substantially the entire device (600) may be transparent. The device (600) may be formed by, for example, one or more of acrylic, polycarbonate, cyclic olefin copolymers (COC), and polyester.

In some embodiments, the device (600) may be formed out of a transparent polymer such as acrylic, polycarbonate, combinations thereof, and the like. In some embodiments, the device (600) may include between about 0.01% to about 1.0% by weight of at least one of carbon black and a laser absorbing dye. For example, a layer may include between about 0.1% to about 1.0% by weight or between about 0.2% to about 0.3% by weight of at least one of carbon black and a laser absorbing dye. In some embodiments, the microfluidic channel (620) may be formed using low surface energy plastics such as polycarbonate, COC, and polyester that may enhance hydrophilic properties of the microfluidic channel (620). Additionally or alternatively, one or more regions (620a, 620b, 620c) of the microfluidic channel (620) may undergo hydrophilic treatment to enhance capillary fill in order to increase the surface energy and wettability of the sample. For example, hydrophilic polymers (e.g., PVP, PEG, surfactant) may be applied to microfluidic channel using plasma-etched vapor deposition (e.g., chemical). In some embodiments, one or more substances (e.g., reagents) may be disposed in one or more regions of the microfluidic channel (620) to facilitate sample analysis. For example, the reagents may include lysing agents and/or contrast agents. Lysing agents may lyse specific cell types such as red blood cells. Contrast agents (e.g., staining agents) may include nuclear, cytoplasm, and mitochondria (e.g., antibody and antibody conjugates including fluorescent dyes) corresponding to specific cellular antigens. For example, one or more substances may be disposed at specific regions (620a, 620b, 620c) of the microfluidic channel (620) (e.g., proximal end) or throughout a length of the microfluidic channel (620).

In some embodiments, the second layer (612) may cover one side of the microfluidic channel (620) when assembled as shown in FIG. 6B. The first layer (610) may have a different thickness than the second layer (612). In FIGS. 6A-6B, the first layer (610) is thicker than the second layer (612). The first layer (610) may have a thickness between about 0.5 mm and about 2 mm and the second layer (612) may have a thickness between about 25 μm and about 0.5 mm. In FIG. 6B, the microfluidic channel (620) may decrease in height from the first opening (630) to the second opening (640). The microfluidic channel (620) may be arranged substantially parallel to a plane of the second layer (612).

In some embodiments, the microfluidic channel (620) of the first layer (610) may have a length of between about 1 mm and about 50 mm, a depth of between about 50 μm and about 5000 μm, and a width of between about 50 μm and about 5000 μm. In FIG. 6B, the microfluidic channel (620) may be linear relative to a longitudinal axis (602) of the microfluidic device (100). However, in other variations, the microfluidic channel (620) may be curved relative to a longitudinal axis (602) of the microfluidic device (600). For example, the microfluidic channel (620) may include a generally serpentine shape. The regions (620a, 620b, 620c) of the microfluidic channel (620) may include about the same length or have different lengths. The first region (620a) may have a height about three times that of the third region (620c) and the second region (620b) may have a height about three times that of the third region (620c). The microfluidic channel (620) may have a constant width or may have a width that varies per region (620a, 620b, 620c).

The first opening (630) of the first layer (610) may be configured to receive a sample, such as from a pipette. The first opening (630) may include any suitable shape and/or size to receive the sample. In FIGS. 6A-6B, the first opening (630) may be provided at a proximal end of the device (600) and may be fluidically connected to a first end of the microfluidic channel (620). In some embodiments, the first opening (630) may have a diameter of between about 5000 μm and about 2 mm.

The second opening (640) of the first layer (610) may include an outlet configured to naturally vent gas (e.g., air) as the microfluidic channel (620) is filled with a fluid. In FIGS. 6A-6B, the second opening (640) may be provided at a distal end of the device (600) and may be fluidically connected to a second end of the microfluidic channel (620). In some embodiments, the second opening (640) may have a diameter of between about 10 μm and about 50 μm. In some embodiments, the first opening (630) and the second opening (640) may be spaced apart by between about 1 mm and about 100 mm. Although FIGS. 6A-6B illustrate a single first opening (630) and a single second opening (640), the microfluidic device (600) may include a set of first openings (630) and a set of second openings (640).

In some embodiments, the microfluidic device (600) may include a set of fiducials (not shown) that may be imaged and/or otherwise detected by an optical detector of a biofluid analysis system. For example, a set of fiducials (e.g., colored/opaque points, ruler, slits, landmarks, markers) may be disposed at predetermined intervals along a length of the microfluidic channel (620) to aid image analysis. For example, each region (620a, 620b, 620c) of the microfluidic channel (620) may include a corresponding fiducial. In some embodiments, the microfluidic channel (620) may include one or more filters (not shown) configured to separate analytes within the sample based on size. For example, a filter may be provided between each region (620a, 620b, 620c) of the microfluidic channel (620).

Although the device (600) shown in FIGS. 6A-6B includes two layers, it should be appreciated that the microfluidic device (600) may be formed using more or less layers. In some embodiments, the device (600) may include a generally curved portion, as described in more detail with respect to FIG. 9, where a set of microfluidic channels may follow a curved shape of a housing.

In some embodiments, the first layer (610) and the second layer (612) may be formed using a die cut extruded film or injection molding. For example, the first layer (610) may be formed of a die cut extruded film while second layer (612) may be injection molded. In some embodiments, the second layer (612) may be bonded to the first layer (610) using one or more of ultrasonic welding, laser welding, adhesives, and/or solvent bonding.

As described in more detail herein, the microfluidic device (600) may be coupled to a microfluidic device case (e.g., sample holder, consumable, disposable) to aid in one or more of handling, tracking, and identification of a sample applied to the microfluidic device. For example, the microfluidic device case may include a grip portion for a user to grasp without touching the microfluidic device and potentially affecting the optical qualities of the microfluidic device. The microfluidic device case may be configured to hold the microfluidic device at a fixed position relative to the microfluidic device case.

In some embodiments, a second layer (612) of the microfluidic device (600) may be placed on a flat, horizontal surface to permit a sample (not shown) to be input into the microfluidic channel (620) through the first opening (630) (e.g., sample port, biofluid input). The sample may include, but is not limited to, urine, whole blood, plasma, serum, combinations thereof, and the like. The sample may flow through the microfluidic channel (620) using capillary action from a proximal to distal end of the microfluidic channel (620). As the microfluidic channel (620) fills with sample, gas (e.g., air) within the microfluidic channel may vent from the microfluidic device (600) through the second opening (640). In some embodiments, the first opening (630) may be coupled to at least one micropump configured to supply a continuous flow of the sample to the microfluidic device (600).

In some embodiments, the sample may be detected (e.g., imaged) as the microfluidic channel (620) is being filled and/or after a predetermined amount of time. For example, analytes (e.g., sediments, particulate matter) of the sample having a specific gravity greater than one may be allowed to settle within the microfluidic channel (620) over one or more regions of the second layer (612). This may aid image analysis of the sample so long as particle concentration of the sample is dilute enough to avoid superimposed particles. In some embodiments, analysis (e.g., image analysis) of a sample having high particle concentration, may be performed before one or more analytes settle within the microfluidic channel (620). For example, analytes including red blood cells, platelets, white blood cells, and uric acid may be analyzed. Red blood cells may have a concentration of about 5 teracells/L, platelets may have a concentration of about 0.3 teracells/L, white blood cells may have a concentration of about 7 gigacells/L, and uric acid may have a concentration of about 100 µmol/L. In some embodiments, a single particle may be analyzed in a sample, such as a single crystal. Additionally or alternatively, ultrasonic vibration may be applied to the microfluidic device (600) periodically to reduce settling and maintain suspension of one or more analytes.

In some embodiments, at least one step of the set of steps (620a, 620b, 620c) of the microfluidic channel (620) may be configured to separate one or more components (e.g. species) from the sample due to the change in height between steps. Varying step heights may allow imaging of settled analytes (e.g., particulate matter) while minimizing the likelihood of superimposed particles. For example, a high concentration species may be imaged in the third step region (620c) having a lower height/volume than other step regions (620b, 620a) in order to reduce the likelihood of superimposed particles after settling. Similarly, a low concentration species may be imaged in the first step region (620a) having a higher height/volume that may increase particle superposition and aid detection in image analysis.

In some embodiments, the microfluidic device (600) may be disposed between the radiation source and the optical detector. For example, the sample may be imaged using a radiation source facing an exposed side of the first layer (610) and an optical detector facing an exposed side of the second layer (612) such that the detector is closer to the microfluidic channel (620). As described in more detail herein, detector data may be used to generate analyte data that may be used to identify one or more analytes and/or sample attributes including, but not limited to, refractive index and osmolality.

Figure 7A:
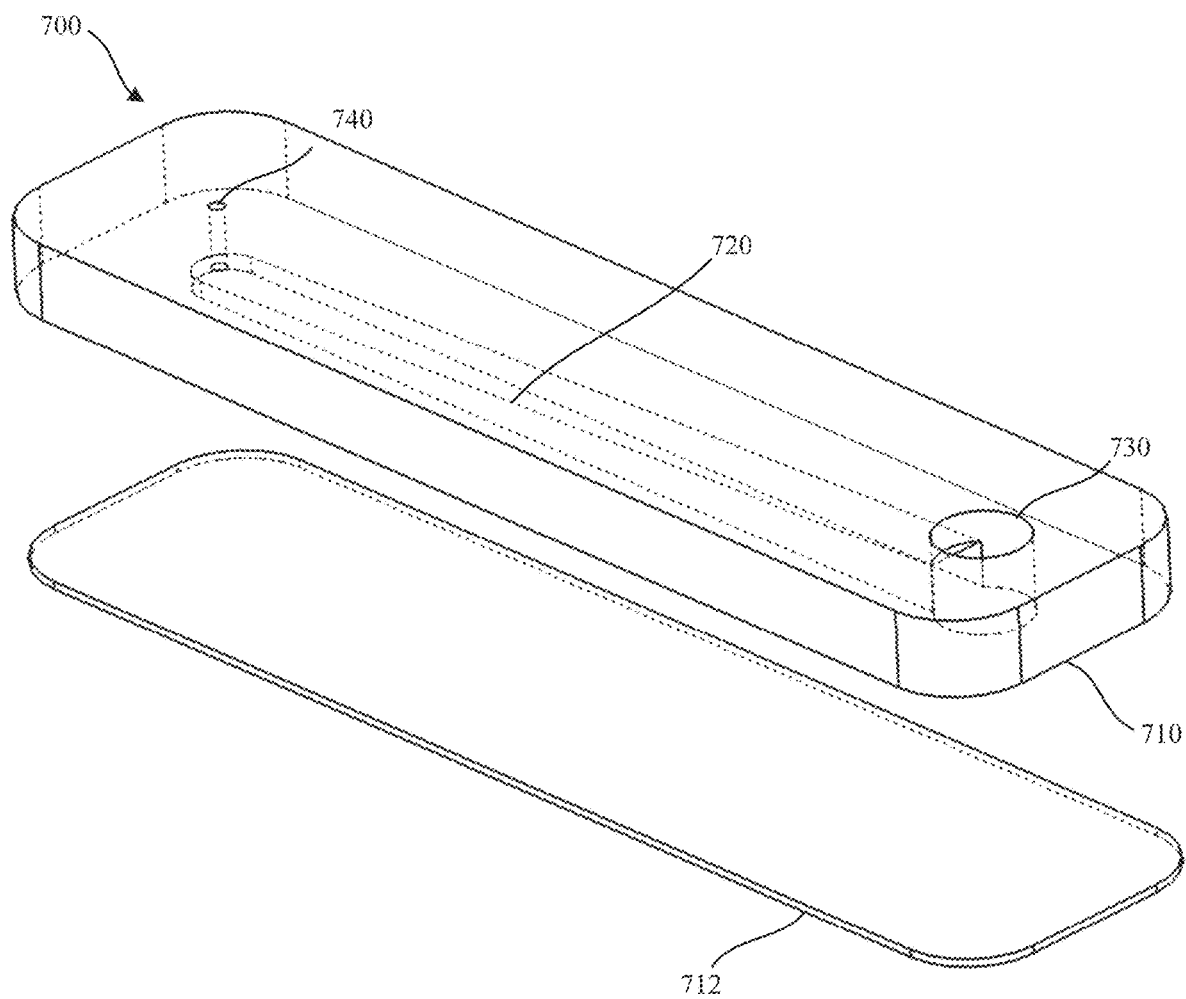
FIGS. 7A-7D are illustrative views of a microfluidic device, according to other embodiments.
Figure 7B:
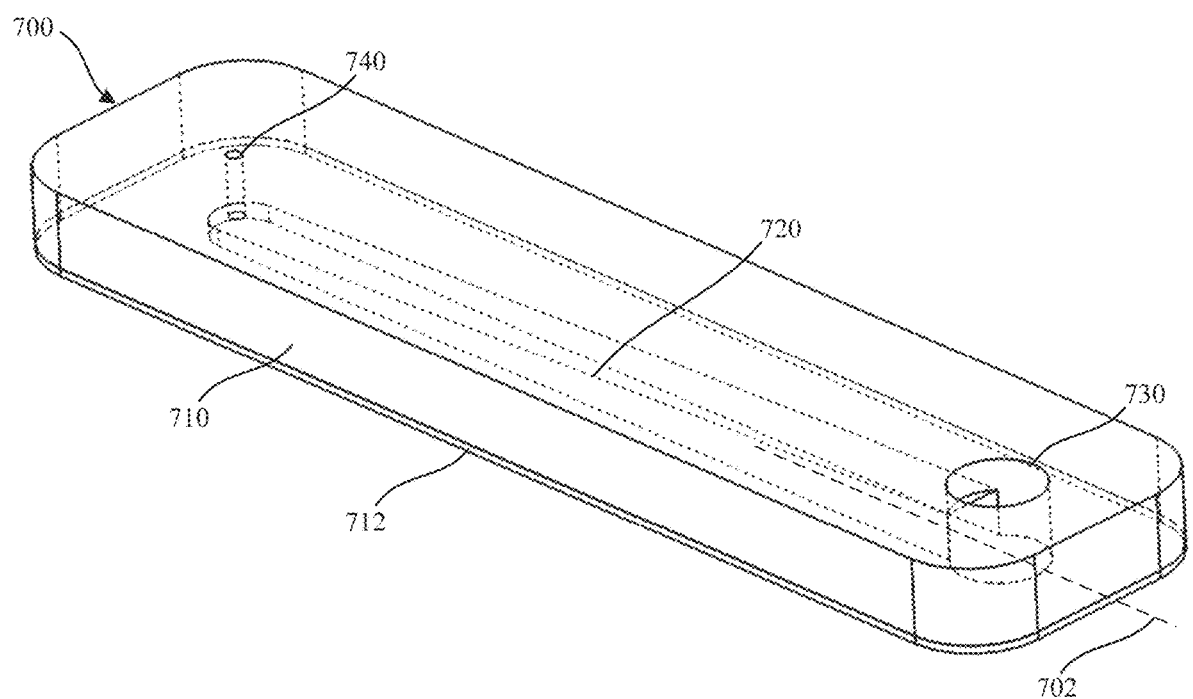
Figure 7C:
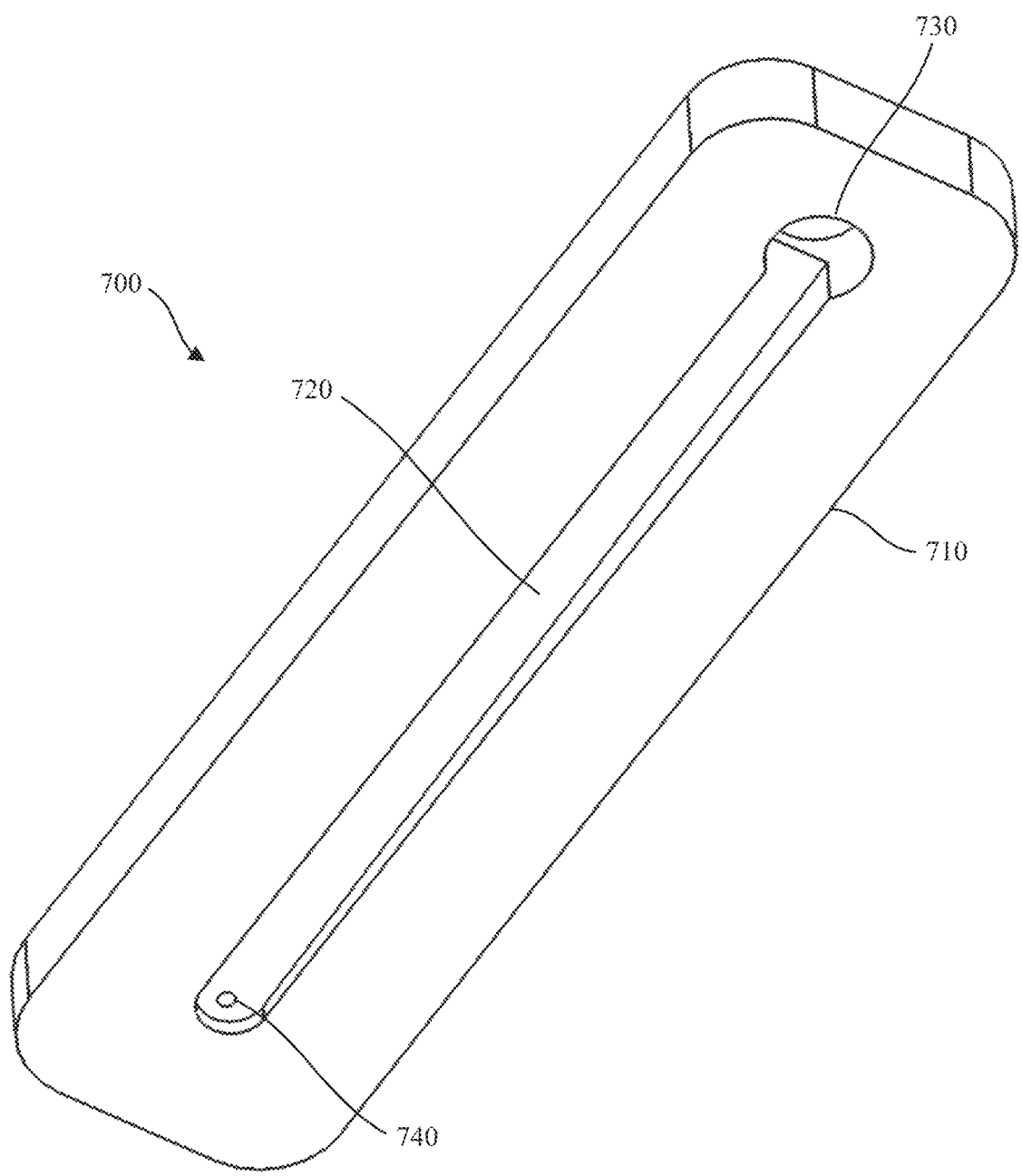
Figure 7D:
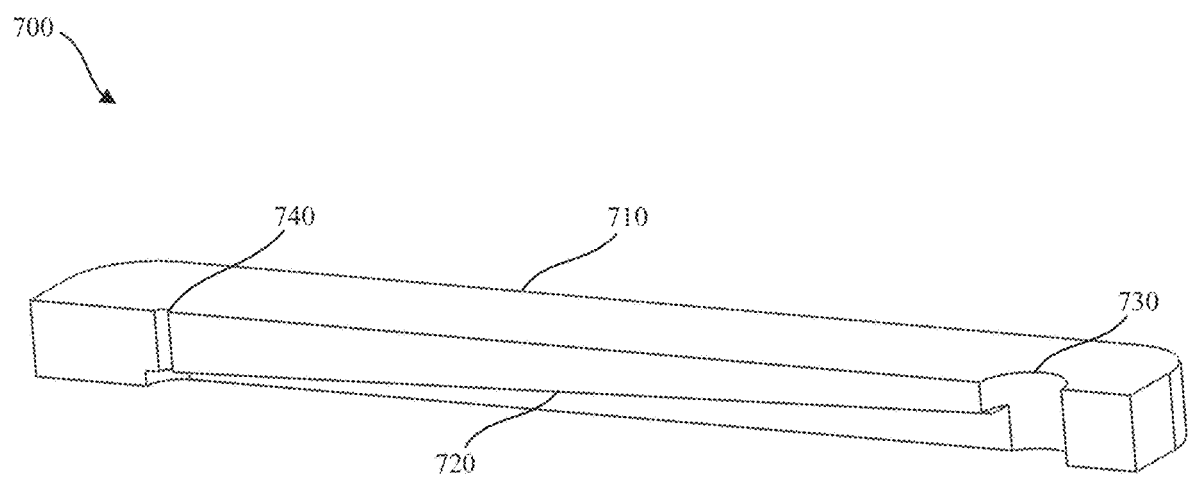

FIG. 7A is an exploded perspective view of an illustrative example of a microfluidic device (700), according to some embodiments. The microfluidic device (700) may include a first layer (710) (e.g., channel layer, top portion, cover) including a microfluidic channel (720), a first opening (730) (e.g., proximal opening), and a second opening (740) (e.g., distal opening) and a second layer (712) (e.g., base, substrate, bottom portion). The microfluidic channel (720) has a continuously decreasing height from the first opening (730) to the second opening (740). In some embodiments, each of the layers (710, 712) may generally form an elongate rectangular structure where the layers may be configured to be assembled one on top of the other into a unitary structure, as shown in FIG. 7B. The first layer (710) or the second layer (712) may be substantially transparent while the other of at least a portion of the second layer (712) and first layer (710) may be substantially opaque. In the assembled configuration of FIG. 7B, the microfluidic channel (720) having a continuously decreasing height may be coupled between the first opening (730) and the second opening (740). In some embodiments, a slope of the microfluidic channel (720) may be between about 0.01 and about 0.1. The second layer (712) may be coupled to the first layer (710) such that the microfluidic channel (720) establishes a fluid communication path between the first opening (730) and the second opening (740). In some embodiments, the microfluidic device (700) may have a length of between about 1 mm and about 100 mm, a width of between about 1 mm and about 50 mm, and a thickness of between about 1 mm and about 10 mm. A height of the microfluidic channel (720) may vary continuously between about 0.1 mm and about 0.9 mm. For example, as shown in FIGS. 7C-7D, the microfluidic channel (720) may have a continuously decreasing height from the first opening (730) to the second opening (740). That is, a volume of the channel (720) may decrease from the first opening (730) to the second opening (740). In some embodiments, the microfluidic channel (720) may have a set of regions along its length. Each region may have a slope different from an adjacent region of the channel (720). For example, the microfluidic channel (720) may include a set of four regions with each region having decreasing slope from the first opening (730) to the second opening (740). In some embodiments, the set of regions may include some regions having a fixed height and other regions having a non-zero slope. For example, a first region of the channel (720) including the first opening (730) may have a slope of about 0.1 while a second region of the channel (720) including the second opening (740) may have a slope of zero and a height of about 0.1 mm.

The device (700) may include a transparent portion along a length of the microfluidic channel (720). The transparent portion may be configured to provide high transmission and minimal birefringence. For example, the transparent portion may include the microfluidic channel (720) of the first layer (710) and the regions of the second layer (712) overlying (i.e., directly below) the microfluidic channel (720). However, the transparent portion need not necessarily be perpendicular to a plane of the microfluidic device so long as a light beam may pass through the microfluidic channel (720) and be received by a detector (e.g., optical sensor). The transparent portion may be substantially transparent to at least one of ultraviolet light, visible light, and near-infrared light. In some embodiments, one or more additional regions of the device (700) may be transparent. As another example, substantially the entire device (700) may be transparent. The device (700) may be formed by, for example, one or more of acrylic, polycarbonate, cyclic olefin copolymers (COC), and polyester.

In some embodiments, the device (700) may be formed out of a transparent polymer such as acrylic, polycarbonate, combinations thereof, and the like. In some embodiments, the device (700) may include between about 0.01% to about 1.0% by weight of at least one of carbon black and a laser absorbing dye. For example, a layer may include between about 0.1% to about 1.0% by weight or between about 0.2% to about 0.3% by weight of at least one of carbon black and a laser absorbing dye. In some embodiments, the microfluidic channel (720) may be formed using low surface energy plastics such as polycarbonate, COC, and polyester that may enhance hydrophilic properties of the microfluidic channel (720). Additionally or alternatively, one or more portions of the microfluidic channel (720) may undergo hydrophilic treatment to enhance capillary fill in order to increase the surface energy and wettability of the sample. For example, hydrophilic polymers (e.g., PVP, PEG, surfactant) may be applied to microfluidic channel using plasma-etched vapor deposition (e.g., chemical). In some embodiments, one or more substances (e.g., reagents) may be disposed in one or more regions of the microfluidic channel (720) to facilitate sample analysis. For example, the reagents may include lysing agents and/or contrast agents. Lysing agents may lyse specific cell types such as red blood cells. Contrast agents (e.g., staining agents) may include nuclear, cytoplasm, and mitochondria (e.g., antibody and antibody conjugates including fluorescent dyes) corresponding to specific cellular antigens. For example, one or more substances may be disposed at specific regions of the microfluidic channel (720) (e.g., proximal end) or throughout a length of the microfluidic channel (720).

In some embodiments, the second layer (712) may cover one side of the microfluidic channel (720) when assembled as shown in FIG. 7B. The first layer (710) may have a different thickness than the second layer (712). In FIGS. 7A-7B, the first layer (710) is thicker than the second layer (712). The first layer (710) may have a thickness between about 0.5 mm and about 2 mm and the second layer (712) may have a thickness between about 25 µm and about 0.5 mm. In FIG. 7B, the microfluidic channel (720) may decrease in height from the first opening (730) to the second opening (740). The microfluidic channel (720) may be arranged substantially parallel to a plane of the second layer (712).

In some embodiments, the microfluidic channel (720) of the first layer (710) may have a length of between about 1 mm and about 50 mm, a depth of between about 50 µm and about 5000 µm, and a width of between about 50 µm and about 5000 µm. In FIG. 7B, the microfluidic channel (720) may be linear relative to a longitudinal axis (702) of the microfluidic device (700). However, in other variations, the microfluidic channel (720) may be curved relative to a longitudinal axis (702) of the microfluidic device (700). For example, the microfluidic channel (720) may include a generally serpentine shape. In some embodiments, the biofluid channel (720) may have a set of stepped regions where at least one of the stepped regions has a continuously variable height that may have a slope different than a slope of another stepped region. The microfluidic channel (720) may have a constant width or may have a width that varies per region (720a, 720b, 720c).

The first opening (730) of the first layer (710) may be configured to receive a sample, such as from a pipette. The first opening (730) may include any suitable shape and/or size to receive the sample. In FIGS. 7A-7D, the first opening (730) may be provided at a proximal end of the device (700) and may be fluidically connected to a first end of the microfluidic channel (720). In some embodiments, the first opening (730) may have a diameter of between about 5000 µm and about 2 mm.

The second opening (740) of the first layer (710) may include an outlet configured to naturally vent gas (e.g., air) as the microfluidic channel (720) is filled with a fluid. In FIGS. 7A-7D, the second opening (740) may be provided at a distal end of the device (700) and may be fluidically connected to a second end of the microfluidic channel (720). In some embodiments, the second opening (740) may have a diameter of between about 10 µm and about 50 µm. In some embodiments, the first opening (730) and the second opening (740) may be spaced apart by between about 1 mm and about 100 mm. Although FIGS. 7A-7D illustrate a single first opening (730) and a single second opening (740), the microfluidic device (700) may include a set of first openings (730) and a set of second openings (740).

In some embodiments, the microfluidic device (700) may include a set of fiducials (not shown) that may be imaged and/or otherwise detected by an optical detector of a biofluid analysis system. For example, a set of fiducials (e.g., colored/opaque points, ruler, slits, landmarks, markers) may be disposed at predetermined intervals along a length of the microfluidic channel (720) to aid image analysis. For example, predetermined heights of the microfluidic channel (720) may include a corresponding fiducial. In some embodiments, the microfluidic channel (720) may include one or more filters (not shown) configured to separate analytes within the sample based on size. For example, a filter may be provided at predetermined heights of the microfluidic channel (720).

Although the device (700) shown in FIGS. 7A-7D includes two layers, it should be appreciated that the microfluidic device (700) may be formed using more or less layers. In some embodiments, the device (700) may include a generally curved portion, as described in more detail with respect to FIG. 9, where a set of microfluidic channels may follow a curved shape of a housing.

In some embodiments, the first layer (710) and the second layer (712) may be formed using a die cut extruded film or injection molding. For example, the second layer (712) may be formed of a die cut extruded film while first layer (710) may be injection molded. In some embodiments, the second layer (712) may be bonded to the first layer (710) using one or more of ultrasonic welding, laser welding, adhesives, and/or solvent bonding.

As described in more detail herein, the microfluidic device (700) may be coupled to a microfluidic device case (e.g., sample holder, consumable, disposable) to aid in one or more of handling, tracking, and identification of a sample applied to the microfluidic device. For example, the microfluidic device case may include a grip portion for a user to grasp without touching the microfluidic device and potentially affecting the optical qualities of the microfluidic device. The microfluidic device case may be configured to hold the microfluidic device at a fixed position relative to the microfluidic device case.

In some embodiments, a second layer (712) of the microfluidic device (700) may be placed on a flat, horizontal surface to permit a sample (not shown) to be input into the microfluidic channel (720) through the first opening (730) (e.g., sample port, biofluid input). The sample may include, but is not limited to, urine, whole blood, plasma, serum, combinations thereof, and the like. The sample may flow through the microfluidic channel (720) using capillary action from a proximal to distal end of the microfluidic channel (720). As the microfluidic channel (720) fills with sample, gas (e.g., air) within the microfluidic channel may vent from the microfluidic device (700) through the second opening (740). In some embodiments, the first opening (730) may be coupled to at least one micropump configured to supply a continuous flow of the sample to the microfluidic device (700).

In some embodiments, the sample may be detected (e.g., imaged) as the microfluidic channel (720) is being filled and/or after a predetermined amount of time. For example, analytes (e.g., sediments, particulate matter) of the sample having a specific gravity greater than one may be allowed to settle within the microfluidic channel (720) over one or more regions of the second layer (712). This may aid image analysis of the sample so long as particle concentration of the sample is dilute enough to avoid superimposed particles. In some embodiments, analysis (e.g., image analysis) of a sample having high particle concentration, may be performed before one or more analytes settle within the microfluidic channel (720). For example, analytes including red blood cells, platelets, white blood cells, and uric acid may be analyzed. Red blood cells may have a concentration of about 5 teracells/L, platelets may have a concentration of about 0.3 teracells/L, white blood cells may have a concentration of about 7 gigacells/L, and uric acid may have a concentration of about 100 µmol/L. In some embodiments, a single particle may be analyzed in a sample, such as a single crystal. Additionally or alternatively, ultrasonic vibration may be applied to the microfluidic device (700) periodically to reduce settling and maintain suspension of one or more analytes.

In some embodiments, a continuously decreasing height of the microfluidic channel (720) may be configured to separate one or more components (e.g. analytes, species) from the sample due to the change in height. Varying channel heights may allow imaging of settled analytes (e.g., particulate matter) while minimizing the likelihood of superimposed particles. For example, a high concentration species may be imaged in a distal region of the channel (720) having a lower height/volume than a proximal region in order to reduce the likelihood of superimposed particles after settling. Similarly, a low concentration species may be imaged in the proximal region having a higher height/volume that may increase particle superposition and aid detection in image analysis. In this manner, the microfluidic device (700) may aid analysis of a set of components of a sample throughout a length of the microfluidic device (700).

In some embodiments, the microfluidic device (700) may be disposed between the radiation source and the optical detector. For example, the sample may be imaged using a radiation source facing an exposed side of the first layer (710) and an optical detector facing an exposed side of the second layer (712) such that the detector is closer to the microfluidic channel (720). As described in more detail herein, detector data may be used to generate analyte data that may be used to identify one or more analytes and/or sample attributes including, but not limited to, refractive index and osmolality.

Figure 8A:
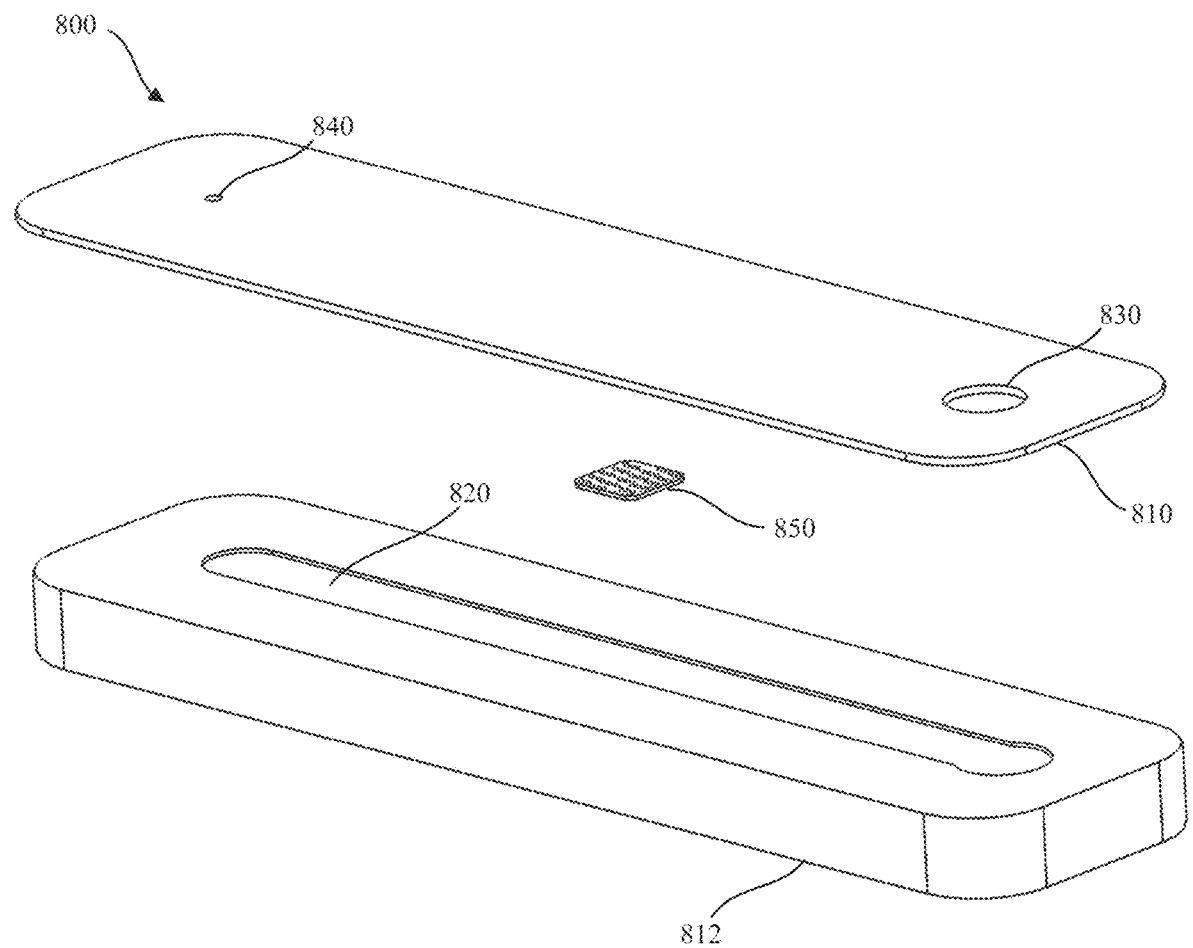
FIGS. 8A-8B are illustrative views of a microfluidic device, according to other embodiments.
Figure 8B:
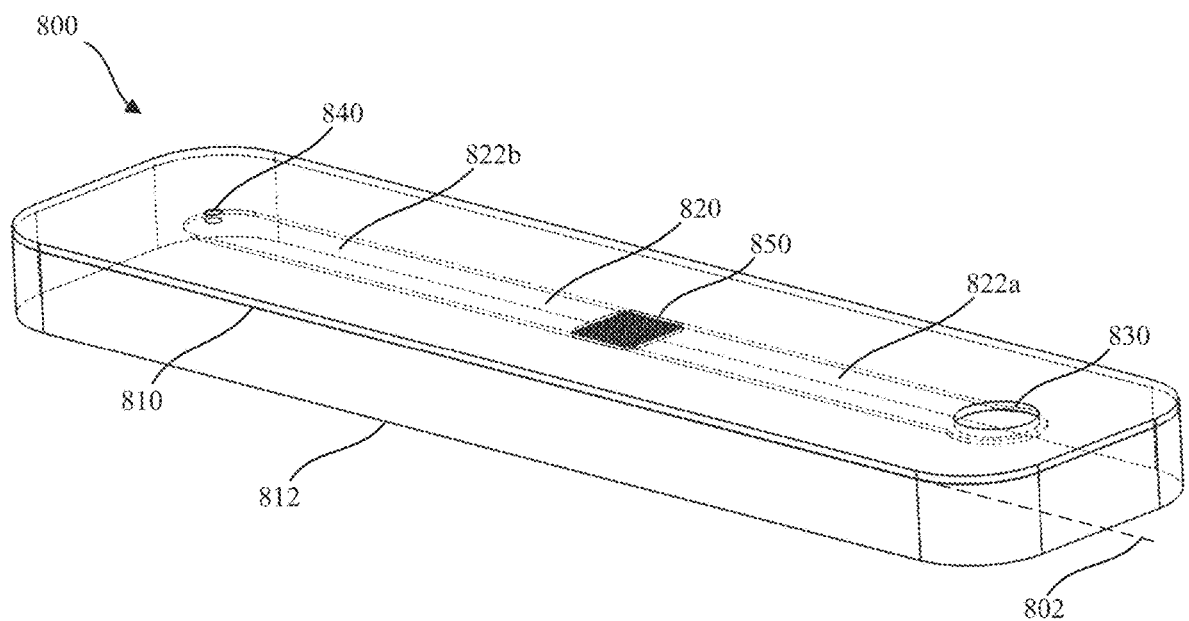

FIG. 8A is an exploded perspective view of an illustrative example of a microfluidic device (800), according to some embodiments. The microfluidic device (800) may include a first layer (810) (e.g., top portion, cover) including a first opening (830) (e.g., proximal opening) and a second opening (840) (e.g., distal opening) and a second layer (812) (e.g., base, channel layer, substrate, bottom portion) including a microfluidic channel (820) and a filter (850). In some embodiments, each of the layers (810, 812) may generally form an elongate rectangular structure where the layers may be configured to be assembled one on top of the other into a unitary structure, as shown in FIG. 8B. The first layer (810) or the second layer (820) may be substantially transparent while the other of at least a portion of the second layer (812) or first layer (810) may be substantially opaque. In the assembled configuration of FIG. 8B, the microfluidic channel (820) may be coupled between the first opening (830) and the second opening (840). The second layer (812) may be coupled the first layer (810) such that the microfluidic channel (820) establishes a fluid communication path between the first opening (830) and the second opening (840). In some embodiments, the microfluidic device (800) may have a length of between about 1 mm and about 100 mm, a width of between about 1 mm and about 50 mm, and a thickness of between about 1 mm and about 10 mm.

The device (800) may include a transparent portion along a length of the microfluidic channel (820). The transparent portion may be configured to provide high transmission and minimal birefringence. For example, the transparent portion may include the microfluidic channel (820) of the second layer (812) and the regions of the first layer (810) overlying (i.e., directly above) the microfluidic channel (820). However, the transparent portion need not necessarily be perpendicular to a plane of the microfluidic device so long as a light beam may pass through the microfluidic channel (820) and be received by a detector (e.g., optical sensor). The transparent portion may be substantially transparent to at least one of ultraviolet light, visible light, and near-infrared light. In some embodiments, one or more additional regions of the device (800) may be transparent. As another example, substantially the entire device (800) may be transparent. The device (800) may be formed by, for example, one or more of acrylic, polycarbonate, cyclic olefin copolymers (COC), and polyester.

In some embodiments, the device (800) may be formed out of a transparent polymer such as acrylic, polycarbonate, combinations thereof, and the like. In some embodiments, the device (800) may include between about 0.01% to about 1.0% by weight of at least one of carbon black and a laser absorbing dye. For example, a layer may include between about 0.1% to about 1.0% by weight or between about 0.2% to about 0.3% by weight of at least one of carbon black and a laser absorbing dye. In some embodiments, the microfluidic channel (820) may be formed using low surface energy plastics such as polycarbonate, COC, and polyester that may enhance hydrophilic properties of the microfluidic channel (820). Additionally or alternatively, the microfluidic channel (820) may undergo hydrophilic treatment to enhance capillary fill in order to increase the surface energy and wettability of the sample. For example, hydrophilic polymers (e.g., PVP, PEG, surfactant) may be applied to microfluidic channel using plasma-etched vapor deposition (e.g., chemical). In some embodiments, one or more substances (e.g., reagent) may be disposed in the microfluidic channel to facilitate sample analysis. For example, the reagents may include lysing agents and/or contrast agents. Lysing agents may lyse specific cell types such as red blood cells. Contrast agents (e.g., staining agents) may include nuclear, cytoplasm, and mitochondria (e.g., antibody and antibody conjugates including fluorescent dyes) corresponding to specific cellular antigens. For example, one or more substances may be disposed at specific regions of the microfluidic channel (820) (e.g., proximal end) or throughout a length of the microfluidic channel (820).

In some embodiments, the first layer (810) may cover one side of the microfluidic channel (820) when assembled as shown in FIG. 8B. The first layer (810) may have a different thickness than the second layer (812). In FIGS. 8A-8B, the second layer (812) is thicker than the first layer (810). The second layer (812) may have a thickness between about 0.5 mm and about 2 mm and the first layer (810) may have a thickness between about 25 µm and about 0.5 mm. In FIG. 8B, the microfluidic channel (820) may be closer to the first layer (810) than a bottom surface of the second layer (812). The microfluidic channel (820) may be arranged substantially parallel to a plane of the first layer (810). That is, the microfluidic channel (820) may be parallel and offset from a central longitudinal plane of the apparatus.

In some embodiments, the microfluidic channel (820) of the first layer (812) may have a length of between about 1 mm and about 50 mm, a depth of between about 50 μm and about 5000 μm, and a width of between about 50 μm and about 5000 μm. In FIG. 8B, the microfluidic channel (820) may be linear relative to a longitudinal axis (802) of the microfluidic device (800). However, in other variations, the microfluidic channel (820) may have be curved relative to a longitudinal axis (802) of the microfluidic device (800). For example, the microfluidic channel (820) may include a generally serpentine shape.

The first opening (830) of the first layer (810) may be configured to receive a sample such as from a pipette. The first opening (830) may include any suitable shape and/or size to receive the sample. In FIGS. 8A-8B, the first opening (830) may be provided at a proximal end of the device (800) and may be fluidically connected to a first end of the microfluidic channel (820). In some embodiments, the first opening (830) may have a diameter of between about 5000 μm and about 2 mm.

The second opening (840) of the first layer (810) may include an outlet configured to naturally vent gas (e.g., air) as the microfluidic channel (820) is filled with a fluid. In FIGS. 8A-8B, the second opening (840) may be provided at a distal end of the device (800) and may be fluidically connected to a second end of the microfluidic channel (820). In some embodiments, the second opening (840) may have a diameter of between about 10 μm and about 50 μm. In some embodiments, the first opening (830) and the second opening (840) may be spaced apart by between about 1 mm and about 100 mm. Although FIGS. 8A-8B illustrate a single first opening (830) and a single second opening (840), the microfluidic device (800) may include a set of first openings (830) and a set of second openings (840).

In some embodiments, the microfluidic device (800) may include a set of fiducials (not shown) that may be imaged and/or otherwise detected by an optical detector of a biofluid analysis system. For example, a set of fiducials (e.g., colored/opaque points, ruler, slits, landmarks, markers) may be disposed at predetermined intervals along a length of the microfluidic channel (820) to aid image analysis. In some embodiments, the microfluidic channel (820) may include one or more filters (850) configured to separate one or more components from a fluid received in the microfluidic channel (820). A filter (850) may be configured to separate analytes within the sample based on size. For example, the filter (850) may be configured to remove one or more species to aid imaging of a sample having a number of analytes.

In FIG. 8B, the filter (850) may be configured to separate a first region (822a) from a second region (822b) of the microfluidic channel (820). Accordingly, the filtered second region (822b) may include less analytes than the unfiltered first region (822a). In some embodiments, one or more reagents may be applied onto a side of the filter (850) and/or a sidewall of a second region (822b). This may facilitate assays on components of the fluid for the filtered portion of the sample.

Although the device (800) shown in FIGS. 8A-8B includes two layers, it should be appreciated that the microfluidic device (800) may be formed using more or less layers. In some embodiments, the device (800) may include a generally curved portion, as described in more detail with respect to FIG. 9, where a set of microfluidic channels may follow a curved shape of a housing.

In some embodiments, the first layer (810) and the second layer (820) may be formed using a die cut extruded film or injection molding. In some embodiments, the second layer (812) may be bonded to the first layer (810) using one or more of ultrasonic welding, laser welding, adhesives, and/or solvent bonding.

As described in more detail herein, the microfluidic device (800) may be coupled to a microfluidic device case (e.g., sample holder, consumable, disposable) to aid in one or more of handling, tracking, and identification of a sample applied to the microfluidic device. For example, the microfluidic device case may include a grip portion for a user to grasp without touching the microfluidic device and potentially affecting the optical qualities of the microfluidic device. The microfluidic device case may be configured to hold the microfluidic device at a fixed position relative to the microfluidic device case.

In some embodiments, a second layer (812) of the microfluidic device (800) may be placed on a flat, horizontal surface to permit a sample (not shown) to be input into the microfluidic channel (820) through the first opening (830) (e.g., sample port, biofluid input). The sample may include, but is not limited to, urine, whole blood, plasma, serum, combinations thereof, and the like. The sample may flow through the microfluidic channel (820) using capillary action from a proximal to distal end of the microfluidic channel (820). As the microfluidic channel (820) fills with sample, gas (e.g., air) within the microfluidic channel may vent from the microfluidic device (800) through the second opening (840). In some embodiments, the first opening (830) may be coupled to at least one micropump configured to supply a continuous flow of the sample to the microfluidic device (800).

In some embodiments, the sample may be detected (e.g., imaged) as the microfluidic channel (820) is being filled and/or after a predetermined amount of time. For example, analytes (e.g., sediments, particulate matter) of the sample having a specific gravity greater than one may be allowed to settle within the microfluidic channel (820) over one or more regions of the second layer (812). This may aid image analysis of the sample so long as particle concentration of the sample is dilute enough to avoid superimposed particles. In some embodiments, analysis (e.g., image analysis) of a sample having high particle concentration, may be performed before one or more analytes settle within the microfluidic channel (820). For example, analytes including red blood cells, platelets, white blood cells, and uric acid may be analyzed. Red blood cells may have a concentration of about 5 teracells/L, platelets may have a concentration of about 0.3 teracells/L, white blood cells may have a concentration of about 7 gigacells/L, and uric acid may have a concentration of about 100 μmol/L. In some embodiments, a single particle may be analyzed in a sample, such as a single crystal. Additionally or alternatively, ultrasonic vibration may be applied to the microfluidic device (800) periodically to reduce settling and maintain suspension of one or more analytes.

In some embodiments, the microfluidic device (800) may be disposed between a radiation source and an optical detector. For example, the sample may be imaged using a radiation source facing an exposed side of the second layer (812) and an optical detector facing the exposed side of the first layer (810) such that the detector is closer to the microfluidic channel (820). As described in more detail herein, detector data may be used to generate analyte data that may be used to identify one or more analytes and/or sample attributes including, but not limited to, refractive index and osmolality.

Figure 9A:
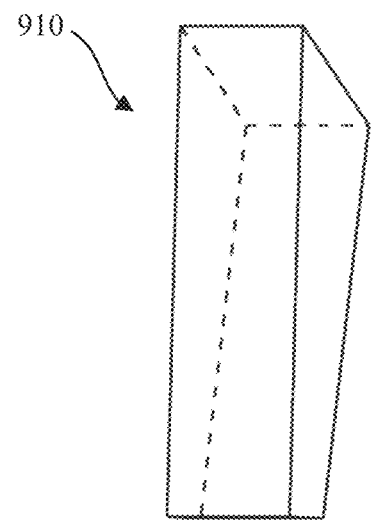
FIGS. 9A-9B are illustrative perspective views of a microfluidic device housing, according to other embodiments.
Figure 9B:
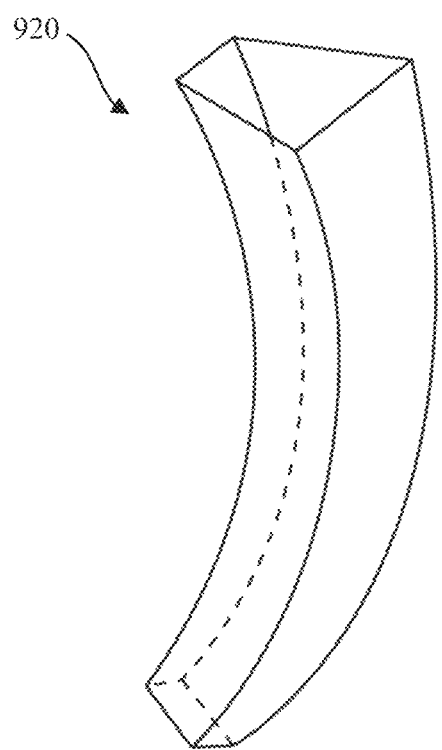

FIGS. 9A-9B are illustrative perspective views of microfluidic device housings. FIG. 9A is a perspective view of a microfluidic device housing (910) having a sloped surface. In some embodiments, a set of microfluidic channels (not shown) may follow the slope of the housing (910) such that the channels do not have a uniform depth, which may be useful in separating particles having different concentrations. A channel having a continuously varying slope may allow particles to be distributed even along a length of the channel and further allow image analysis continuously along a length of the channel. Additionally or alternatively, the set of microfluidic channels may have a zero-slope, stepped, curved, and/or serpentine shape. A serpentine shape may be useful in allowing a greater volume of sample to be analyzed. FIG. 9B is a perspective view of a microfluidic device housing (920) having a generally curved shape and a sloped surface. The curved housing (920) may be held in a cartridge having a curved shape such as within a disk or rotor. In some embodiments, a set of microfluidic channels (not shown) may follow the curvature of the housing (920) such that the channels are not linear, which may be useful in separating particles having different concentrations. Additionally or alternatively, the set of microfluidic channels may have a zero-slope, stepped, curved, and/or serpentine shape. Regardless of the shape of the housing (910, 920), the path length of the set of microfluidic channels may be continuously varied looking through the housing (910, 920).

II. Systems

Described herein are biofluid analysis systems that may include one or more of the components necessary to perform biofluid analysis using the devices according to various embodiments described herein. For example, the biofluid analysis systems described herein may automatically process and analyze a sample on the microfluidic device using a detector to identify and/or analyze one or more analytes. Generally, the biofluid analysis systems described herein may include one or more of a microfluidic device assembly, a radiation source, a detector, and a controller (including memory, a processor, and computer instructions). The radiation source may be configured to emit a light signal (e.g., light beam) and to illuminate a microfluidic channel. A microfluidic device assembly may be configured to hold a microfluidic device and to receive the light beam. A detector may be configured to receive the light beam passed through the microfluidic device. A controller coupled to the detector may be configured to receive signal data corresponding to the light beam received by the detector and generate analyte data using the signal data. One or more analytes of the biofluid may be identified by the controller using the analyte data. The one or more analytes may include at least one of red blood cells, white blood cells, white blood cell clumps, hyaline casts, pathological casts, squamous epithelial cells, non-squamous epithelial cells, bacteria, yeast, crystals, calcium-oxalate monohydrate, calcium-oxalate, dehydrate, uric acid, triple photosphate, mucus, and sperm. The biofluids described herein may include any biological fluid as described herein including, but not limited to urine, blood, serum, semen, combinations thereof, and the like.

Figure 10A:
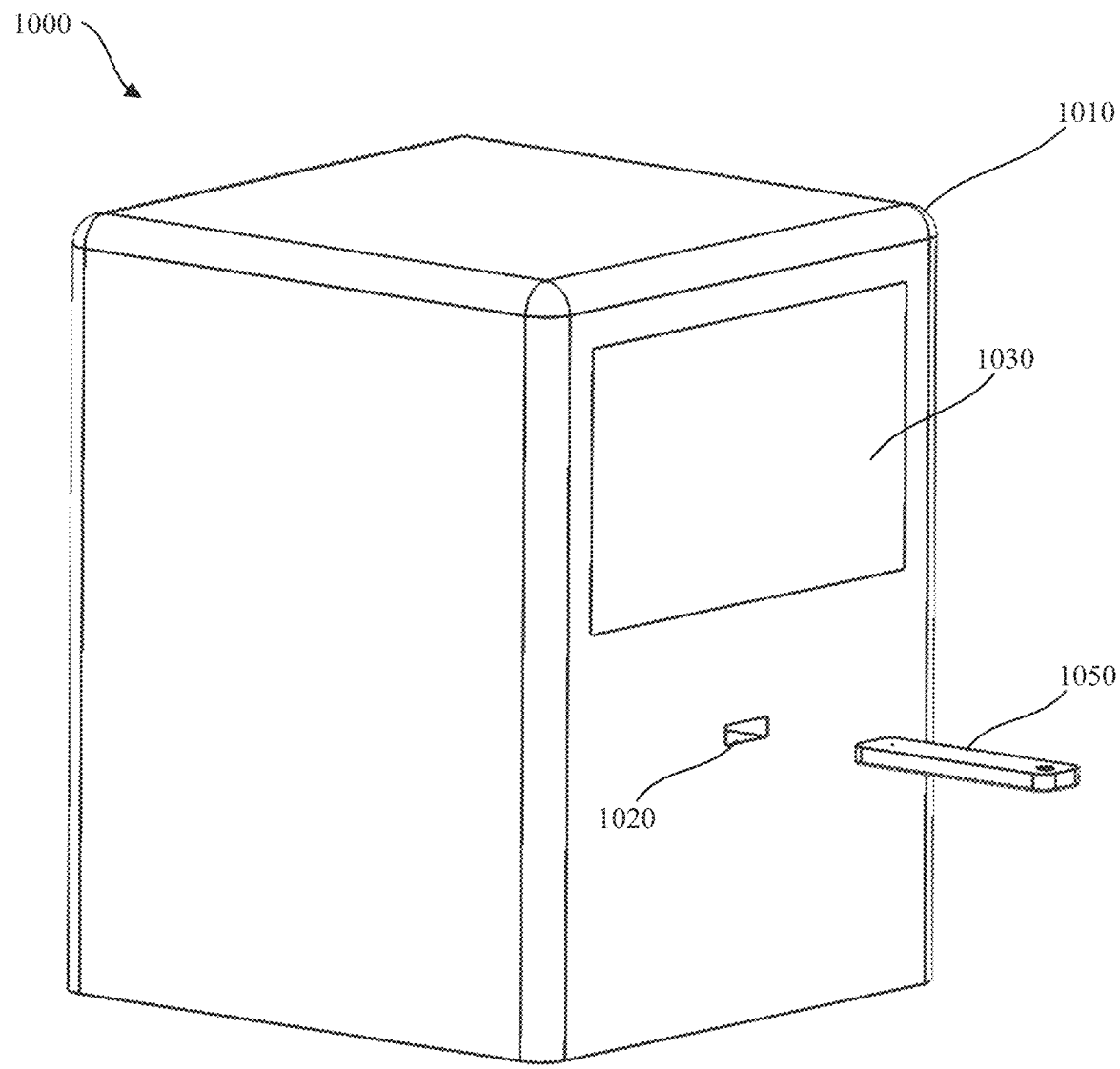
FIGS. 10A-10B are illustrative views of an analysis system, according to embodiments.
Figure 10B:
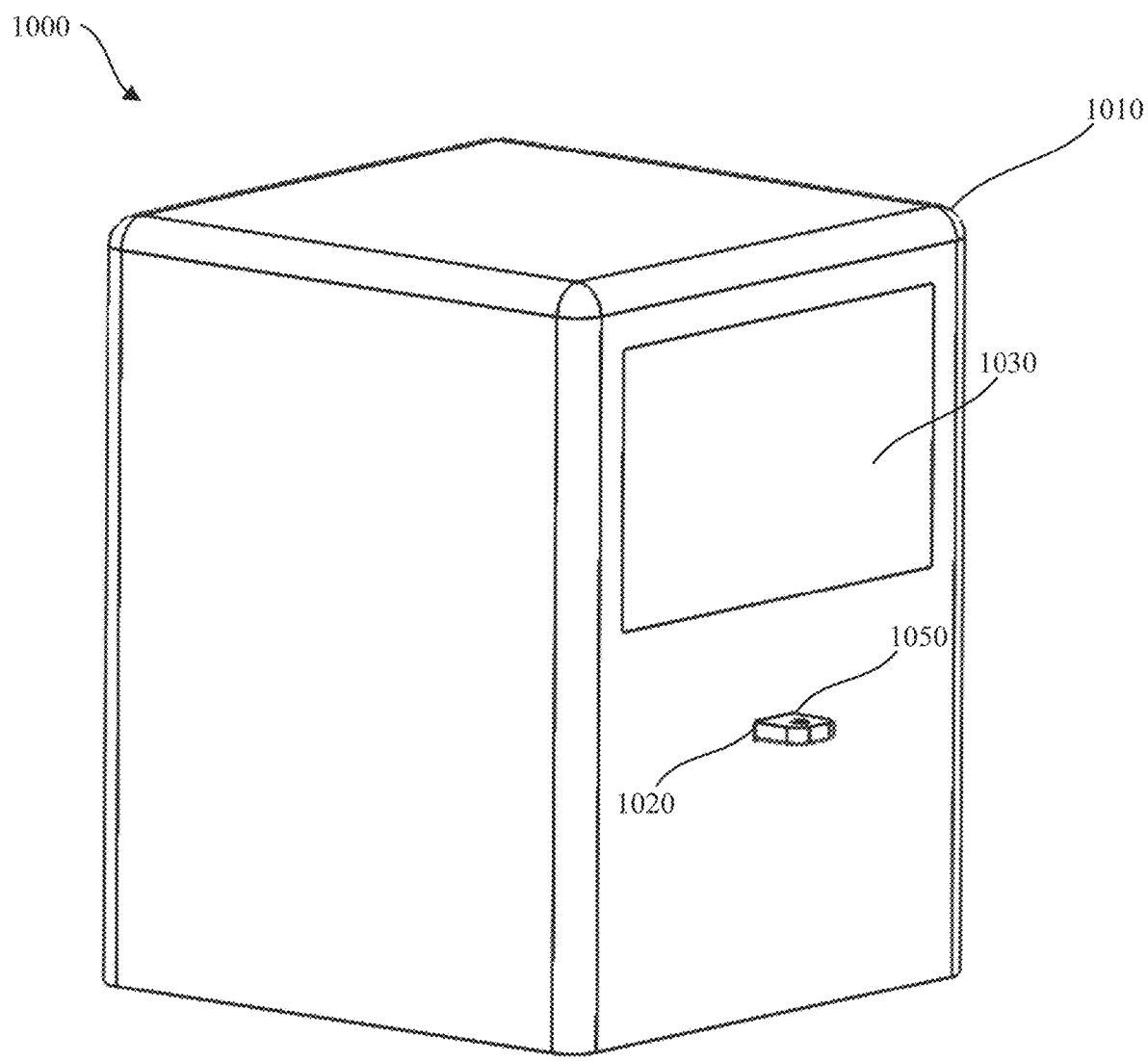

FIGS. 10A-10B are exterior perspective views of an analysis system (1000). In some embodiments, a system (1100) may include an external housing (1010), a sample input opening (1020) (e.g., entry hole) configured to receive a microfluidic device (1050) and/or microfluidic device case as described in detail herein, and an output device (1030) (e.g., display device). For example, a microfluidic device (1050) may be advanced into the system (1000) through the sample input opening (1020). The system (1000) may be placed (e.g., mounted) on a table, desk, in a cart, floor, sidewall, or other suitable support surface. In some embodiments, the system (1000) may process one or more microfluidic devices configured to receive a light beam for a detector to generate signal data useful in identifying one or more analytes from a fluid sample. FIG. 10A illustrates the microfluidic device (1050) external to the system (1000) and FIG. 10B illustrates the microfluidic device (1050) partially inserted into the input opening (1020). The internal components of system (1000) (e.g., radiation source, microfluidic device assembly, detector, control device, etc.) are described in more detail with respect to FIGS. 11A-11B.

Figure 11A:
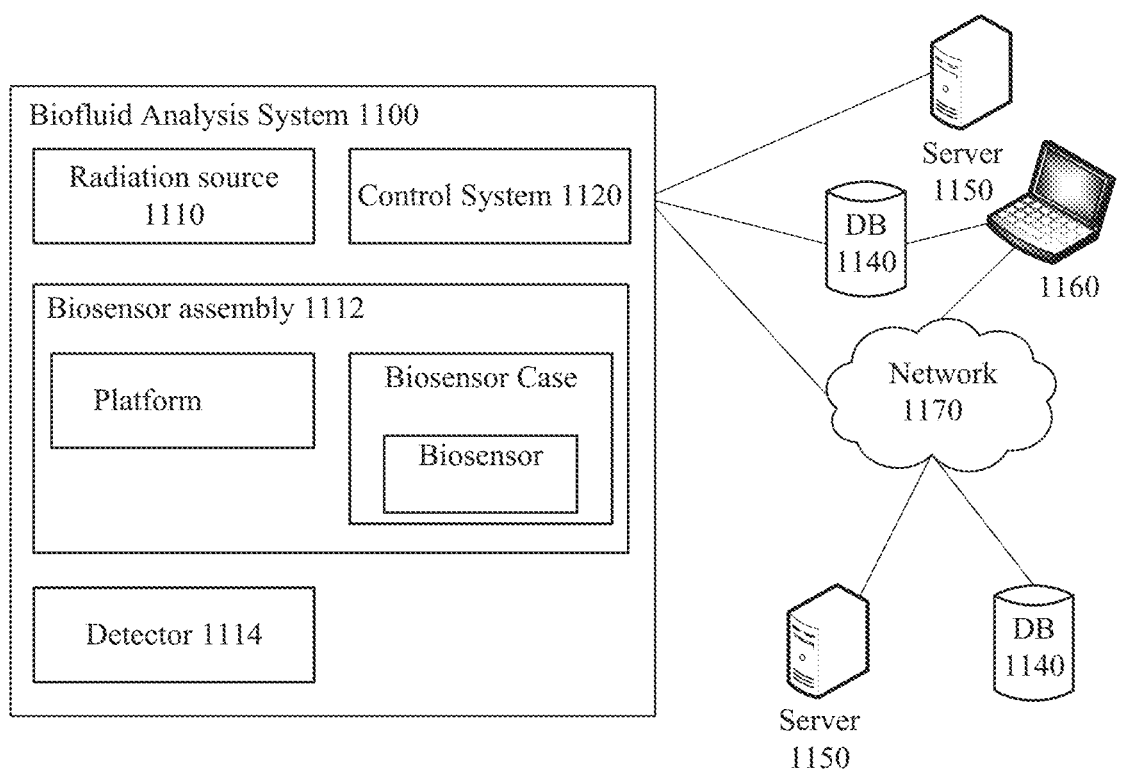
FIGS. 11A-11B are block diagrams of an analysis system, according to other embodiments.
Figure 11B:
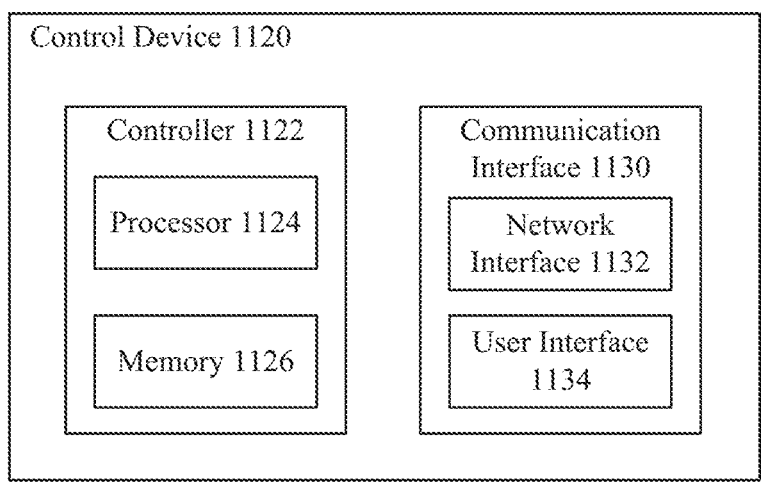

FIGS. 11A-11B are block diagrams of a biofluid analysis system (1100) according to some embodiments. The system (1100) may include a control device (1120) configured to control one or more of a radiation source (1110), microfluidic device assembly (1112), and detector (1114). FIGS. 12A-12B are perspective views of an illustrative variation of a biofluid analysis system. As shown in FIG. 12A, the system (1200) may include a microfluidic device input (1220) (e.g., entry port) configured to receive a microfluidic device (1250). For example, the microfluidic device (1250) may be advanced into and/or retracted from the system (1200) using the microfluidic device input (1220). The system (1200) may further include a display (1230) and a user interface. For example, the user interface may be a capacitive touch-screen integrated with the display (1230). The system (1200) may be placed (e.g., mounted) on a table, desk, in a cart, floor, sidewall, or other suitable support surface. In some embodiments, the system (1200) may process one or more microfluidic devices to generate signal data corresponding to analyte data useful in identifying one or more analytes from a sample.

Radiation Source

The biofluid analysis systems as described herein may include a radiation source configured to emit a first light signal directed at the microfluidic device. The radiation source may be configured to generate the light beam in the UV, visible, and/or near-IR wavelengths. A detector as described herein may be configured to receive a second light beam from the microfluidic device. The second light signal may be generated in response to the illumination of the microfluidic channel using the first light signal. The second light signal may be used to generate analyte data for analysis. In some embodiments, the radiation source may include one or more of a light emitting diode, laser, microscope, optical sensor, lens, and flash lamp.

Microfluidic Device Assembly

A microfluidic device assembly of a biofluid analysis system may be used to aid manipulation and positioning of a microfluidic device relative to other components of a biofluid analysis system such as the radiation source and detector. For example, a user may place the microfluidic device (1050) that may be structurally and/or functionally similar to any of the ablation devices (100, 200, 300, 400, 500, 600, 700, 800, 900) described herein on a translatable platform of the microfluidic device assembly through a microfluidic device input (1020) (e.g., entry hole) in a housing (1010) of the system (1000). The microfluidic device assembly may hold (e.g., secure) the microfluidic device in place relative to the platform during biofluid analysis. The platform may then retract into the system to position the microfluidic device for illumination by the radiation source and analysis. The platform may include a translation mechanism having at least one degree of freedom (e.g., translate along the X-axis and/or Y-axis using a moveable XY stage) in response to a calibration procedure to align the radiation source to the microfluidic device. In some embodiments, the microfluidic device assembly may include a micropump configured to fluidically couple to a set of first openings of a microfluidic device. The micropump may provide a continuous flow of biofluid through the microfluidic channels. This permits a greater volume of sample to be analyzed, thereby allowing analysis of sediments having relatively smaller concentrations. The set of second openings may be coupled to a corresponding set of fluid outlets.

Microfluidic Device and Microfluidic Device Case

Any of the microfluidic devices (100, 200, 300, 400, 500, 600, 700, 800, 900, 1000, 1100) as described herein may be used with the biofluid analysis systems as described herein. In some embodiments, a microfluidic device may be removably held within a microfluidic device case (e.g., consumable, disposable, holder, portable housing) to aid in handling, functionalization, processing, and identification of a sample applied to the microfluidic device. The microfluidic device case having the microfluidic device may be placed by a user into a biofluid analysis system for automated processing of the sample. The microfluidic device case may be useful in providing physical support and protection to the microfluidic device. The microfluidic device may be configured to hold the microfluidic device at a fixed position relative to the housing. In some embodiments, the microfluidic device case may include one or more fiducials (e.g., colored/opaque points, ruler, slits, landmarks, markers) and one or more identifiers such as a barcode, QR code, combinations thereof, and the like.

Detector

Generally, the biofluid analysis systems described herein may include a detector used to receive light signals (e.g., light beams) that pass through a sample within a transparent microfluidic channel of a microfluidic device. The received light may be used to generate signal data that may be processed by a processor and memory to generate analyte data. The detector may be disposed on a side of the microfluidic device opposite that of a radiation source such that the detector receives a light beam (e.g., second light signal) from the radiation source that has passed through the transparent portions of the microfluidic device. The detector may further be configured to image one or more fiducials (e.g., colored/opaque points, ruler, slits, landmarks, markers) and identifiers of the microfluidic device. In some embodiments, the detector may include one or more of a lens, camera, and measurement optics.

Control Device

The biofluid analysis systems as described herein may couple to one or more control devices (e.g., computer systems) and/or networks. FIG. 11B is a block diagram of the control device (1120). The control device (1120) may include a controller (1122) including a processor (1124) and a memory (1126). In some embodiments, the control device (1120) may further include a communication interface (1130). The controller (1122) may be coupled to the communication interface (1130) to permit a user to remotely control the control device (1120), radiation source (1110), microfluidic device assembly (1112), detector (1114), and any other component of the system (1100). The communication interface (1130) may include a network interface (1132) configured to connect the control device (1120) to another system (e.g., Internet, remote server, database) over a wired and/or wireless network. The communication interface (1130) may further include a user interface (1134) configured to permit a user to directly control the control device (1120).

Controller

Generally, the biofluid analysis systems described herein may include a microfluidic device and corresponding control device coupled to a radiation source and detector. In some embodiments, a detector may be configured to generate signal data. The signal data may be received by a controller and used to generate analyte data corresponding to one or more analytes of a sample. The control device may accordingly identify and/or characterize one or more analytes of a sample. As described in more detail herein, the controller (1122) may be coupled to one or more networks using a network interface (1132). The controller (1122) may include a processor (1124) and memory (1126) coupled to a communication interface (1130) including a user interface (1134). The controller (1122) may automatically perform one or more steps of microfluidic device calibration, indexing, image analysis, and analyte analysis, and thus improve one or more of specificity, sensitivity, and speed of biofluid analysis.

The controller (1122) may include computer instructions for operation thereon to cause the processor (1124) to perform one or more of the steps described herein. In some embodiments, the computer instructions may be configured to cause the processor to receive signal data from the detector, generate analyte data using the signal data, and identify one or more analytes of the biofluid using the analyte data. In some embodiments, the computer instructions may be configured to cause the controller to set imaging data parameters. The computer instructions may be configured to cause the controller to generate the analyte data. Signal data and analysis may be saved for each microfluidic channel of each microfluidic device.

A control device (1120), as depicted in FIG. 11B, may include a controller (1122) in communication with the biofluid analysis system (1100) (e.g., radiation source (1110), microfluidic device assembly (1112), and detector (1114)). The controller (1122) may include one or more processors (1124) and one or more machine-readable memories (1126) in communication with the one or more processors (1124). The processor (1124) may incorporate data received from memory (1126) and user input to control the system (1100). The memory (1126) may further store instructions to cause the processor (1124) to execute modules, processes, and/or functions associated with the system (1100). The controller (1122) may be connected to and control one or more of a radiation source (1110), microfluidic device assembly (1112), detector (1114), communication interface (1130), and the like by wired and/or wireless communication channels.

The controller (1122) may be implemented consistent with numerous general purpose or special purpose computing systems or configurations. Various exemplary computing systems, environments, and/or configurations that may be suitable for use with the systems and devices disclosed herein may include, but are not limited to software or other components within or embodied on a server or server computing devices such as routing/connectivity components, multiprocessor systems, microprocessor-based systems, distributed computing networks, personal computing devices, network appliances, portable (e.g., hand-held) or laptop devices. Examples of portable computing devices include smartphones, personal digital assistants (PDAs), cell phones, tablet PCs, wearable computers taking the form of smartwatches and the like, and portable or wearable augmented reality devices that interface with the patient's environment through sensors and may use head-mounted displays for visualization, eye gaze tracking, and user input.

Processor

The processor (1124) may be any suitable processing device configured to run and/or execute a set of instructions or code and may include one or more data processors, image processors, graphics processing units, physics processing units, digital signal processors, and/or central processing units. The processor (1124) may be, for example, a general purpose processor, Field Programmable Gate Array (FPGA), an Application Specific Integrated Circuit (ASIC), combinations thereof, and the like. The processor (1124) may be configured to run and/or execute application processes and/or other modules, processes and/or functions associated with the system and/or a network associated therewith. The underlying device technologies may be provided in a variety of component types including metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, combinations thereof, and the like.

Memory

In some embodiments, the memory (1126) may include a database (not shown) and may be, for example, a random access memory (RAM), a memory buffer, a hard drive, an erasable programmable read-only memory (EPROM), an electrically erasable read-only memory (EEPROM), a read-only memory (ROM), Flash memory, combinations thereof, and the like. As used herein, database refers to a data storage resource. The memory (1126) may store instructions to cause the processor (1124) to execute modules, processes, and/or functions associated with the control device (1120), such as calibration, indexing, microfluidic device signal processing, image analysis, analyte analysis, notification, communication, authentication, user settings, combinations thereof, and the like. In some embodiments, storage may be network-based and accessible for one or more authorized users. Network-based storage may be referred to as remote data storage or cloud data storage. Signal data and analysis stored in cloud data storage (e.g., database) may be accessible to authorized users via a network, such as the Internet. In some embodiments, database (1140) may be a cloud-based FPGA.

Some embodiments described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for a specific purpose or purposes.

Examples of non-transitory computer-readable media include, but are not limited to, magnetic storage media such as hard disks, floppy disks, and magnetic tape; optical storage media such as Compact Disc/Digital Video Discs (CD/DVDs); Compact Disc-Read Only Memories (CD-ROMs); holographic devices; magneto-optical storage media such as optical disks; solid state storage devices such as a solid state drive (SSD) and a solid state hybrid drive (SSHD); carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices. Other embodiments described herein relate to a computer program product, which may include, for example, the instructions and/or computer code disclosed herein.

The systems, devices, and methods described herein may be performed by software (executed on hardware), hardware, or a combination thereof. Hardware modules may include, for example, a general-purpose processor (or microprocessor or microcontroller), a field programmable gate array (FPGA), an application specific integrated circuit (ASIC), combinations thereof, and the like. Software modules (executed on hardware) may be expressed in a variety of software languages (e.g., computer code), including C, C++, Java®, Python, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Communication Interface

The communication interface (1130) may permit a user to interact with and/or control the system (1100) directly and/or remotely. For example, a user interface (1134) of the system (1100) may include an input device for a user to input commands and an output device for a user and/or other users (e.g., technicians) to receive output (e.g., view sample data on a display device) related to operation of the system (1100). In some embodiments, a network interface (1132) may permit the control device (1120) to communicate with one or more of a network (1170) (e.g., Internet), remote server (1150), and database (1140) as described in more detail herein.

User Interface

User interface (1134) may serve as a communication interface between a user (e.g., operator) and the control device (1120). In some embodiments, the user interface (1134) may include an input device and output device (e.g., touch screen and display) and be configured to receive input data and output data from one or more sensors, input device, output device, network (1170), database (1140), and server (1150). For example, signal data generated by a detector may be processed by processor (1124) and memory (1126), and output visually by one or more output devices (e.g., display). Signal data, image data, and/or analyte data may be received by user interface (1134) and output visually, audibly, and/or through haptic feedback through one or more output devices. As another example, user control of an input device (e.g., joystick, keyboard, touch screen) may be received by user interface (1134) and then processed by processor (1124) and memory (1126) for user interface (1134) to output a control signal to one or more components of the biofluid analysis system (1100). In some embodiments, the user interface (1134) may function as both an input and output device (e.g., a handheld controller configured to generate a control signal while also providing haptic feedback to a user).

Output Device

An output device of a user interface (1134) may output image data and/or analyte data corresponding to a sample and/or system (1100), and may include one or more of a display device, audio device, and haptic device. The display device may be configured to display a graphical user interface (GUI). The user console (1160) may include an integrated display and/or video output that may be connected to output to one or more generic displays, including remote displays accessible via the internet or network. The output data may also be encrypted to ensure privacy and all or portions of the output data may be saved to a server or electronic healthcare record system. A display device may permit a user to view signal data, calibration data, functionalization data, image data, analyte data, system data, biofluid data, patient data, and/or other data processed by the controller (1122). In some embodiments, an output device may include a display device including at least one of a light emitting diode (LED), liquid crystal display (LCD), electroluminescent display (ELD), plasma display panel (PDP), thin film transistor (TFT), organic light emitting diodes (OLED), electronic paper/e-ink display, laser display, holographic display, combinations thereof, and the like.

An audio device may audibly output patient data, biofluid data, image data, analyte data, system data, alarms and/or warnings. For example, the audio device may output an audible warning when improper insertion of the microfluidic device into the microfluidic device assembly occurs. In some embodiments, an audio device may include at least one of a speaker, piezoelectric audio device, magnetostrictive speaker, and/or digital speaker. In some embodiments, a user may communicate with other users using the audio device and a communication channel.

A haptic device may be incorporated into one or more of the input and output devices to provide additional sensory output (e.g., force feedback) to the user. For example, a haptic device may generate a tactile response (e.g., vibration) to confirm user input to an input device (e.g., joystick, keyboard, touch surface). In some embodiments, the haptic device may include a vibrational motor configured to provide haptic tactile feedback to a user. Haptic feedback may in some embodiments confirm initiation and completion of microfluidic device processing. Additionally or alternatively, haptic feedback may notify a user of an error such as improper placement and/or insertion of the microfluidic device into a microfluidic device assembly. This may prevent potential harm to the system.

Input Device

Some embodiments of an input device may include at least one switch configured to generate a control signal. For example, the input device may be configured to control movement of the microfluidic device assembly. In some embodiments, the input device may include a wired and/or wireless transmitter configured to transmit a control signal to a wired and/or wireless receiver of a controller (1122). For example, an input device may include a touch surface for a user to provide input (e.g., finger contact to the touch surface) corresponding to a control signal. An input device including a touch surface may be configured to detect contact and movement on the touch surface using any of a plurality of touch sensitivity technologies including capacitive, resistive, infrared, optical imaging, dispersive signal, acoustic pulse recognition, and surface acoustic wave technologies. In embodiments of an input device including at least one switch, a switch may include, for example, at least one of a button (e.g., hard key, soft key), touch surface, keyboard, analog stick (e.g., joystick), directional pad, pointing device (e.g., mouse), trackball, jog dial, step switch, rocker switch, pointer device (e.g., stylus), motion sensor, image sensor, and microphone. A motion sensor may receive user movement data from an optical sensor and classify a user gesture as a control signal. A microphone may receive audio and recognize a user voice as a control signal.

Network Interface

As depicted in FIG. 11A, a control device (1120) described herein may communicate with one or more networks (1170) and computer systems (1150) through a network interface (1132). In some embodiments, the control device (1120) may be in communication with other devices via one or more wired and/or wireless networks. The network interface (1132) may facilitate communication with other devices over one or more external ports (e.g., Universal Serial Bus (USB), multi-pin connector) configured to couple directly to other devices or indirectly over a network (e.g., the Internet, wireless LAN).

In some embodiments, the network interface (1132) may include a radiofrequency receiver, transmitter, and/or optical (e.g., infrared) receiver and transmitter configured to communicate with one or more devices and/or networks. The network interface (1132) may communicate by wires and/or wirelessly with one or more of the sensors, user interface (1134), network (1170), database (1140), and server (1150).

In some embodiments, the network interface (1132) may include radiofrequency (RF) circuitry (e.g., RF transceiver) including one or more of a receiver, transmitter, and/or optical (e.g., infrared) receiver and transmitter configured to communicate with one or more devices and/or networks. RF circuitry may receive and transmit RF signals (e.g., electromagnetic signals). The RF circuitry converts electrical signals to/from electromagnetic signals and communicates with communications networks and other communications devices via the electromagnetic signals. The RF circuitry may include one or more of an antenna system, an RF transceiver, one or more amplifiers, a tuner, one or more oscillators, a digital signal processor, a CODEC chipset, a subscriber identity module (SIM) card, memory, and the like. A wireless network may refer to any type of digital network that is not connected by cables of any kind.

Examples of wireless communication in a wireless network include, but are not limited to cellular, radio, satellite, and microwave communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, near-field communication (NFC), radio-frequency identification (RFID), Wireless Fidelity (Wi-Fi) (e.g., IEEE 802.11a, IEEE 802.11b, IEEE 802.11g, IEEE 802.11n), Voice over Internet Protocol (VoIP), Wi-MAX, a protocol for email (e.g., Internet Message Access Protocol (IMAP), Post Office Protocol (POP)), instant messaging (e.g., eXtensible Messaging and Presence Protocol (XMPP), Session Initiation Protocol for Instant Messaging, Presence Leveraging Extensions (SIMPLE), Instant Messaging and Presence Service (IMPS)), Short Message Service (SMS), or any other suitable communication protocol. Some wireless network deployments combine networks from multiple cellular networks or use a mix of cellular, Wi-Fi, and satellite communication.

In some embodiments, a wireless network may connect to a wired network in order to interface with the Internet, other carrier voice and data networks, business networks, and personal networks. A wired network is typically carried over copper twisted pair, coaxial cable, and/or fiber optic cables. There are many different types of wired networks including wide area networks (WAN), metropolitan area networks (MAN), local area networks (LAN), Internet area networks (IAN), campus area networks (CAN), global area networks (GAN), like the Internet, wireless personal area networks (PAN) (e.g., Bluetooth, Bluetooth Low Energy), and virtual private networks (VPN). As used herein, network refers to any combination of wireless, wired, public, and private data networks that are typically interconnected through the Internet, to provide a unified networking and information access system.

III. Methods

Described herein are embodiments corresponding to methods for analyzing a biofluid such as urine and manufacturing a microfluidic device. These methods may identify and/or characterize a sample and in some embodiments, may be used with the systems and devices described. For example, a biofluid analysis system may analyze and characterize a urine sample placed on a microfluidic device and identify one or more analytes. A microfluidic device may be functionalized by the addition of one or more substances (reagents) in order to aid sample analysis.

Biofluid Preparation

In some embodiments, a sample may be preprocessed prior to application on a microfluidic device and processing by a biofluid analysis system. The sample may include, for example, urine, plasma from blood, serum from blood, mucus, semen, combinations thereof, and the like. The biofluid analysis system may be configured to identify and characterize a wide range of analytes. In some embodiments, one or more substances (e.g., wet or dry reagents) may be added to the sample. For example, a reagent may be added to the sample prior to being input to a microfluidic device and/or a reagent may be disposed within a microfluidic channel of a microfluidic device. Reagents may perform a variety of functions, including but not limited to preferential lysis of certain components, preferential staining of certain components, modification of specific gravity of the liquid phase to promote or retard sedimentation, modification of osmotic pressure, modification of specific gravity of the liquid phase to promote or retard flotation of particulate matter, and chemical characterization of the liquid phase.

Biofluid Analysis

Methods for analyzing a biofluid in some embodiments may use a biofluid analysis system and/or microfluidic device as described herein. The methods described here may quickly identify analytes from a biofluid using a small amount of sample. Generally, the methods described here may include applying a sample to a microfluidic device and inserting the microfluidic device into a biofluid analysis system.

Figure 12:
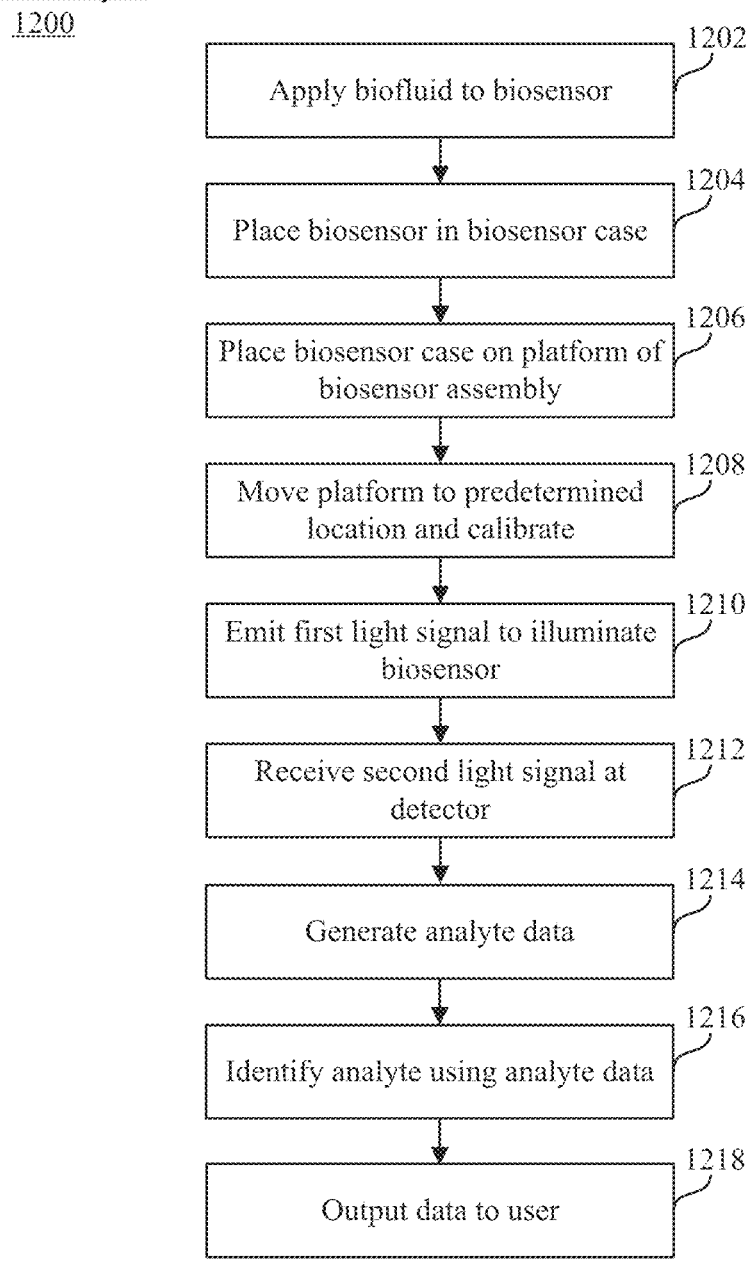
FIG. 12 is an illustrative flowchart of a method of fluid analysis, according to embodiments.
Figure 13:
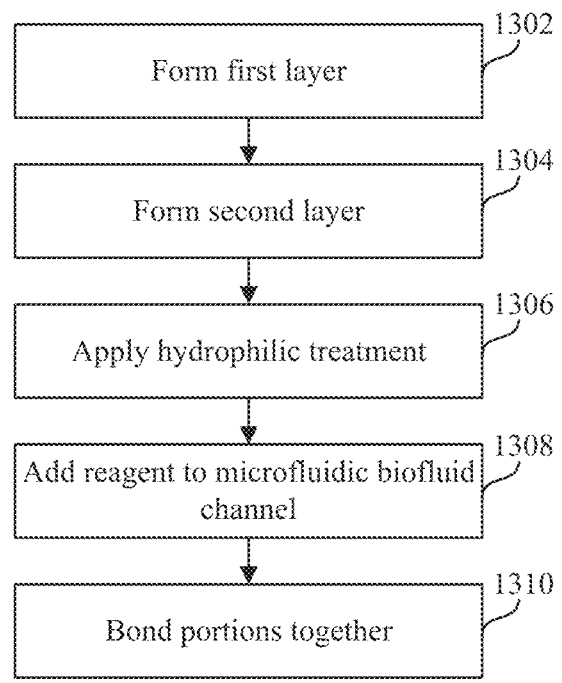
FIG. 13 is an illustrative flowchart of a method of manufacturing a microfluidic device, according to embodiments.

FIG. 12 is a flowchart that generally describes a method of analyzing a biofluid (1200). The process (1200) may begin at step 1202 by applying a sample to the microfluidic device. For example, a sample such as urine, may be input into a first opening of the microfluidic device. In some embodiments, one or more of the microfluidic channels may include one or more substances (e.g., reagents) prior to applying the sample to the microfluidic device. For example, the reagents may include lysing agents and/or contrast agents. Lysing agents may lyse specific cell types such as red blood cells. Contrast agents (e.g., staining agents) may include nuclear, cytoplasm, and mitochondria (e.g., antibody and antibody conjugates including fluorescent dyes) corresponding to specific cellular antigens.

In some embodiments, a first opening and/or second opening of the microfluidic device may be plugged and/or otherwise sealed after applying the sample to the microfluidic device. In this manner, the microfluidic device may be centrifuged to concentrate particulate matter in one or more regions of the microfluidic channel of the microfluidic device. In some embodiments, the microfluidic device may be incubated at one or more temperatures (e.g., room temperature and/or an elevated temperature) prior to biofluid analysis. At step 1204, the microfluidic device may be placed in a microfluidic device case (e.g., consumable, disposable, palette, cartridge, holder, and/or the like). The microfluidic device case may be used to aid in one or more of handling, tracking, and identification of a sample applied to the microfluidic device. For example, the microfluidic device case may include a grip portion for a user to grasp without touching the microfluidic device and potentially affecting the optical qualities of the microfluidic device. The microfluidic device case may be configured to hold the microfluidic device at a fixed position relative to the microfluidic device case.

At step 1206, the microfluidic device case having the microfluidic device disposed thereon may be inserted into a biofluid analysis system and placed onto a platform (e.g., microfluidic device assembly). For example, the microfluidic device case may be inserted onto a platform through a microfluidic device input (1220) of the biofluid analysis system (1200) as shown in FIG. 12B. At step 1208, the platform may be moved to a predetermined position (e.g., under an output of a radiation source) and calibrated. The position of the microfluidic device and its set of microfluidic channels may be calibrated relative to the light beam (e.g., first light signal) emitted by the radiation source and the detector. That is, locations of the microfluidic channels may be identified and indexed. The indexing data may include locations corresponding to fiducials and identifiers of the microfluidic device and/or microfluidic device case. In some variations, the microfluidic device may be arranged parallel to a horizontal plane (e.g., XY plane) or a vertical plane (Z plane).

At step 1210, a set of the microfluidic channels may be illuminated by a first light signal of a radiation source sequentially or all at once. The microfluidic device may be analyzed using one or more of imaging, tomography, microscopy, fluorescence spectroscopy, confocal laser scanning microscopy, spectrophotometry, and electrochemistry. At step 1212, a second light signal may be received at a detector for each microfluidic channel and stored in memory. The detector may be provided opposite to the radiation source. The detector may generate signal data using the received second light signal. At step 1214, analyte data may be generated using by a controller (e.g., processor and memory) using the received signal data.

As described in detail herein, the microfluidic device may be imaged at one or more regions. In some embodiments, imaging of the microfluidic device may occur in a variety of sample states. For example, imaging may be performed in a number of sample states which may depend upon factors such as a density of the liquid phase, the gravitational field, and the orientation of the microfluidic device during use. For example, the sample may be analyzed after sediment (e.g., particulate) matter has dispersed uniformly throughout the set of microfluidic channels, after settling onto a bottom surface, after floating to the top of a channel, before and after settling. The microfluidic device may be analyzed at any predetermined temperature such as room temperature, above room temperature (e.g., 37° C.), and below room temperature.

In some embodiments, the sample in the microfluidic device may be imaged in a suspended state. Re-suspension of the sample may reduce coincident particulate matter during analysis. The microfluidic device assembly may be configured to suspend sediments in the sample by one or more of rocking, inverting, and shaking the microfluidic device. In some embodiments, the microfluidic device assembly may include an ultrasonic transducer configured to suspend sediments in the sample using ultrasonic waves.

At step 1214, a controller may be configured to generate analyte data using the signal data from the detector. At step 1216, a controller may be configured to identify one or more biofluid characteristics and/or analytes using the analyte data. For example, the biofluid characteristics may include refractive index and osmolality, and the one or more identified analytes in a biofluid may include red blood cells, white blood cells, white blood cell clumps, hyaline casts, pathological casts, squamous epithelial cells, non-squamous epithelial cells, bacteria, yeast, crystals, calcium-oxalate monohydrate, calcium-oxalate dehydrate, uric acid, triple photosphate, mucus, and sperm. At step 1218, at least one of the analyte data and biofluid analysis may be output to a user.

Manufacturing a Microfluidic Device

Also described herein are embodiments corresponding to methods for manufacturing a microfluidic device that may be used in some embodiments with the biofluid analysis system embodiments as disclosed herein. The methods described here may manufacture a microfluidic device including a housing defining a set of openings and a set of microfluidic channels. The microfluidic devices manufactured as described herein may be processed to generate analyte data corresponding to biofluid characteristics.

Generally, the methods described here include forming each of a set of layers of a housing, applying a hydrophilic treatment and/or reagent, and attaching the layers together to form a unitary structure. At step 1302, a first layer (e.g., top, cover) may be formed by die cutting, laser cutting extruded film, and injection molding. The extruded film may be formed using one or more of acrylic, polycarbonate, and polyester polymers. Additives such as carbon black and laser absorbing dyes may be added to facilitate laser welding. The additives may be compounded into plastic and/or may be coated prior to welding. For example, between about 0.01% to about 1.0% by weight of at least one of carbon black and a laser absorbing dye may be added to the first portion. For example, the first portion may include between about 0.1% to about 1.0% by weight or between about 0.2% to about 0.3% by weight of at least one of carbon black and a laser absorbing dye. A set of first openings and a set of second openings may be formed in the first layer.

At step 1304, a second layer (e.g., channel layer) may be formed by die cutting, laser cutting extruded film, and injection molding. The extruded film may be formed using one or more of acrylic, polycarbonate, and polyester polymers. An additive such as between about 0.01% to about 1.0% by weight of at least one of carbon black and a laser absorbing dye may be added to the second portion. For example, the second portion may include between about 0.1% to about 1.0% by weight or between about 0.2% to about 0.3% by weight of at least one of carbon black and a laser absorbing dye. A set of microfluidic channels may be formed in the second portion. Additionally, a third layer (e.g., bottom, base) may be optionally formed by die cutting, laser cutting extruded film, and injection molding. The extruded film may be formed using one or more of acrylic, polycarbonate, and polyester polymers. An additive such as between about 0.01% to about 1.0% by weight of at least one of carbon black and a laser absorbing dye may be added to the third portion. For example, the third portion may include between about 0.1% to about 1.0% by weight or between about 0.2% to about 0.3% by weight of at least one of carbon black and a laser absorbing dye. At step 1306, a hydrophilic treatment may be applied to one or more of the layers. Additionally or alternatively, a hydrophobic and scratch-resistant coating may be applied to one or more of the layers. At step 1308, a set of reagents may be coupled to a side of a microfluidic channel. At step 1310, each of the layers may be attached (e.g., bonded, welded) to each other to form a unitary structure. For example, about 0.5% by weight of laser absorbing dye may be added to PMMA or polycarbonate injection molded parts, and welded using about 940 nm laser diode light.

In some embodiments, one or more of the portions may be welded using ultrasonic welding. An energy director may be configured to focus ultrasonic energy and generate an ultrasonic weld. In some embodiments, ultrasonic welding may be performed between about 15 kHz and about 40 kHz. For example, ultrasonic welding may be performed at about 15 kHz, 20 kHz, 30 kHz, 35 kHz, and about 40 kHz.

Additionally or alternatively, the portions may be attached (e.g., bonded) using adhesive bonding. Adhesive bonding may be configured for high volume, low cost, continuous web manufacturing. For example, double-sided tape may be used between the first and second layers, and the second and third layers. Double-sided tape may include a substrate coated on both sides with pressure sensitive acrylic or silicone adhesives. In some embodiments, double-sided tape may vary in thickness between about 25 microns and about 1000 microns.

In some embodiments, the microfluidic device may be packaged in an impermeable foil pouch, and may further include a package of desiccant. Desiccant may minimize the impact of moisture on a reagent disposed within the microfluidic device.

As used herein, the terms "about" and/or "approximately" when used in conjunction with numerical values and/or ranges generally refer to those numerical values and/or ranges near to a recited numerical value and/or range. In some instances, the terms "about" and "approximately" may mean within ±10% of the recited value. For example, in some instances, "about 100 [units]" may mean within ±10% of 100 (e.g., from 90 to 110). The terms "about" and "approximately" may be used interchangeably.

The foregoing description, for purposes of explanation, used specific nomenclature to provide a thorough understanding of various inventions and embodiments disclosed herein. However, it will be apparent to one skilled in the art that specific details are not required in order to practice the disclosed inventions and embodiments. Thus, the foregoing descriptions of specific embodiments of the inventions and corresponding embodiments thereof are presented for purposes of illustration and description. They are not intended to be exhaustive or to limit the invention to the precise forms disclosed; obviously, many modifications and embodiments are possible in view of the above teachings. The embodiments were chosen and described in order to best explain the principles of the inventions, the corresponding embodiments thereof, and practical applications, so as to enable others skilled in the art to best utilize the invention and various implementations with various modifications as are suited to the particular use contemplated. It is intended that the following claims and their equivalents define the scope of the invention.

In addition, any combination of two or more such features, structure, systems, articles, materials, kits, steps and/or methods, disclosed herein, if such features, structure, systems, articles, materials, kits, steps and/or methods are not mutually inconsistent, is included within the inventive scope of the present disclosure. Moreover, some embodiments of the various inventions disclosed herein may be distinguishable from the prior art for specifically lacking one or more features/elements/functionality found in a reference or combination of references (i.e., claims directed to such embodiments may include negative limitations).

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The invention claimed is:

1. An apparatus, comprising:
a first layer defining a first opening, a second opening, and a microfluidic channel that establishes a fluid communication path between the first opening and the second opening, the first layer being substantially transparent;
a second layer coupled to the first layer, and the second layer being partially opaque,
wherein the first layer is a top portion of the apparatus and the second layer is a bottom portion of the apparatus;
wherein the first opening is larger than the second opening and is configured to receive a fluid, and the second opening is configured to vent air out of the apparatus as the microfluidic channel is filled with the fluid;
wherein a height of the microfluidic channel decreases continuously from the first opening to the second opening, or a side of the microfluidic channel formed in the first layer defines a set of steps such that a height of the microfluidic channel decreases in a step-wise manner from the first opening to the second opening; and
wherein reagents including at least one of lysing agents and contrast agents are disposed throughout a length of the microfluidic channel.

2. The apparatus of claim 1, wherein the first layer is substantially transparent to at least one of ultraviolet light, visible light, and near-infrared light.

3. The apparatus of claim 1, wherein the microfluidic channel is linear relative to a longitudinal axis of the apparatus.

4. The apparatus of claim 1, wherein the microfluidic channel is curved relative to a longitudinal axis of the apparatus.

5. The apparatus of claim 1, wherein the microfluidic channel is parallel and offset from a central longitudinal plane of the apparatus.

6. The apparatus of claim 1, wherein the microfluidic channel is defined along a central longitudinal plane of the apparatus.

7. The apparatus of claim 1, wherein a height of each step of the set of steps of the microfluidic channel is from about 0.1 mm to about 0.9 mm.

8. The apparatus of claim 7, wherein at least one step of the set of steps of the microfluidic channel is configured to separate one or more components from the fluid.

9. The apparatus of claim 7, wherein each step of the set of steps of the microfluidic channel is configured to separate one or more components from the fluid.

10. The apparatus of claim 1, further comprising a reagent coupled to a side of the microfluidic channel.

11. The apparatus of claim 1, wherein the microfluidic channel is composed of a hydrophilic material.

12. The apparatus of claim 1, wherein the microfluidic channel comprises a hydrophilic coating.

13. The apparatus of claim 1, wherein the microfluidic channel includes a filter configured to separate one or more components from a fluid received in the microfluidic channel.

14. The apparatus of claim 1, wherein the microfluidic channel is a first channel of a set of channels.

15. The apparatus of claim 1, wherein the second opening is one opening of a set of openings.

16. The apparatus of claim 1, wherein the first opening is at a proximal end of the first layer and the second opening is at a distal end of the first layer.

17. The apparatus of claim 1, wherein the second layer includes 0.5% by weight of at least one of carbon black and a laser absorbing dye.

18. The apparatus of claim 1, wherein the apparatus includes one or more fiducials configured to indicate a position of the microfluidic channel.

* * * * *